United States Patent
Cheon et al.

(10) Patent No.: US 9,909,801 B2
(45) Date of Patent: Mar. 6, 2018

(54) DISPLAY DEVICE AND REFRIGERATOR HAVING THE SAME

(71) Applicant: LG ELECTRONICS INC., Seoul (KR)

(72) Inventors: Kangwoon Cheon, Changwon-si (KR); Daejong Kang, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 299 days.

(21) Appl. No.: 14/731,575

(22) Filed: Jun. 5, 2015

(65) Prior Publication Data

US 2015/0267960 A1    Sep. 24, 2015

Related U.S. Application Data

(62) Division of application No. 13/445,247, filed on Apr. 12, 2012, now Pat. No. 9,074,806.

(Continued)

(30) Foreign Application Priority Data

Apr. 12, 2011    (KR) .................. 10-2011-0033810

(51) Int. Cl.
*F25D 29/00*    (2006.01)
*F25D 11/02*    (2006.01)
*F25D 23/02*    (2006.01)

(52) U.S. Cl.
CPC ............ *F25D 29/005* (2013.01); *F25D 11/02* (2013.01); *F25D 23/028* (2013.01); *F25D 29/00* (2013.01);

(Continued)

(58) Field of Classification Search
CPC ........ F25D 11/02; F25D 23/028; F25D 29/00; F25D 29/005; F25D 2400/36; F25D 2400/361; F25D 2500/06; F25D 2700/06
See application file for complete search history.

(56) References Cited

U.S. PATENT DOCUMENTS

2007/0227913 A1* 10/2007 Shoenfeld ........... E05B 47/0012
                                                                 206/1.5
2008/0195944 A1*  8/2008 Lee ........................ F25D 29/00
                                                                 715/706

(Continued)

FOREIGN PATENT DOCUMENTS

CA         2 761 467        11/2010
EP         2 184 571         5/2010

(Continued)

OTHER PUBLICATIONS

Mashable reporter Christina Warren speaks with LG product insight manager Patrick Steinkuhl about LG's new refrigerator with "ThinQ" technology, http://www.mashable.com: "LG Fridge Demo at CES 2011"; Jan. 10, 2011; 1min 10sec in length; retrieved from the Internet: URL: https://www.youtube.com/watch?v=Y4cLDLEXXTU.

(Continued)

*Primary Examiner* — Marc Norman
(74) *Attorney, Agent, or Firm* — Ked & Associates, LLP

(57)    ABSTRACT

A refrigerator having a display is disclosed herein. The display may display contents of the refrigerator, display recommended recipes based on the contents, and display an operational state of the refrigerator. The refrigerator may include a body, at least one door, at least one storage area, a display for displaying a GUI having a first region for displaying an image of the at least one storage area and a second region for displaying a control interface, a memory having information for contents of the at least one storage area, a communication interface, and a controller for controlling the display. The controller may control a display of at least one icon for a type of food in the second region of the GUI and may control a display of one of the at least one (Continued)

icon in the first region of the GUI based on an input at the display.

16 Claims, 140 Drawing Sheets

Related U.S. Application Data

(60) Provisional application No. 61/583,625, filed on Jan. 6, 2012.

(52) U.S. Cl.
CPC .... *F25D 2400/361* (2013.01); *F25D 2500/06* (2013.01); *F25D 2700/06* (2013.01)

(56) References Cited

U.S. PATENT DOCUMENTS

| | | | |
|---|---|---|---|
| 2010/0014227 A1* | 1/2010 | Kobayashi | H04N 5/2252 361/679.01 |
| 2011/0214440 A1 | 9/2011 | Kueny et al. | |
| 2012/0116577 A1 | 5/2012 | Ottomanelli | |
| 2012/0265348 A1 | 10/2012 | Kim et al. | |
| 2014/0304126 A1 | 10/2014 | Kim et al. | |
| 2014/0358287 A1 | 12/2014 | Lee et al. | |

FOREIGN PATENT DOCUMENTS

| | | |
|---|---|---|
| JP | 04-169773 | 6/1992 |
| JP | H7-6669 | 1/1995 |
| JP | 11-030472 | 2/1999 |
| JP | 2002-039673 | 2/2002 |
| JP | 2002-092308 | 3/2002 |
| JP | U3095497 | 5/2003 |
| JP | 2003-222460 | 8/2003 |
| JP | 2003-336959 | 11/2003 |
| JP | 2006-093596 | 4/2006 |
| JP | 2009-129443 | 6/2009 |
| KR | 10-2006-0120800 | 11/2006 |
| KR | 10-2008-0105926 | 12/2008 |
| KR | 10-2009-0090518 | 8/2009 |
| KR | 10-2010-0050190 | 5/2010 |
| KR | 10-2010-0122028 | 11/2010 |
| WO | WO 03/064945 | 8/2003 |
| WO | WO 2009/025531 | 2/2009 |

OTHER PUBLICATIONS

U.S. Office Action issued in co-pending U.S. Appl. No. 13/445,247 dated Dec. 12, 2014.
U.S. Notice of Allowance issued in co-pending U.S. Appl. No. 13/445,247 dated Mar. 3, 2015.
European Search Report dated Nov. 2, 2017 issued in Application No. 12161196.6.

* cited by examiner (b)

FIG. 33
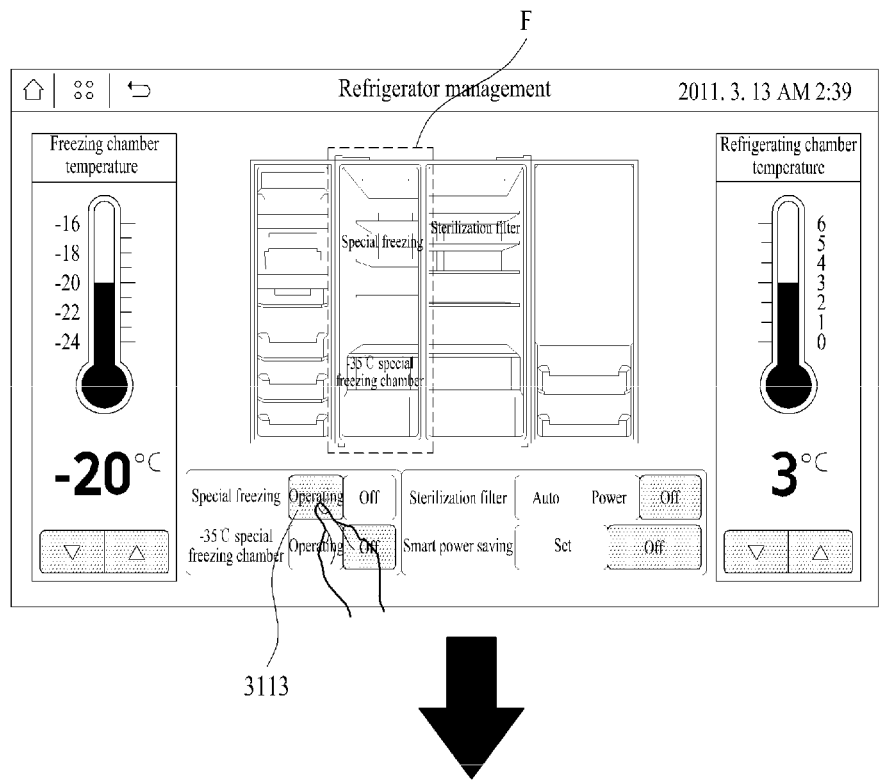
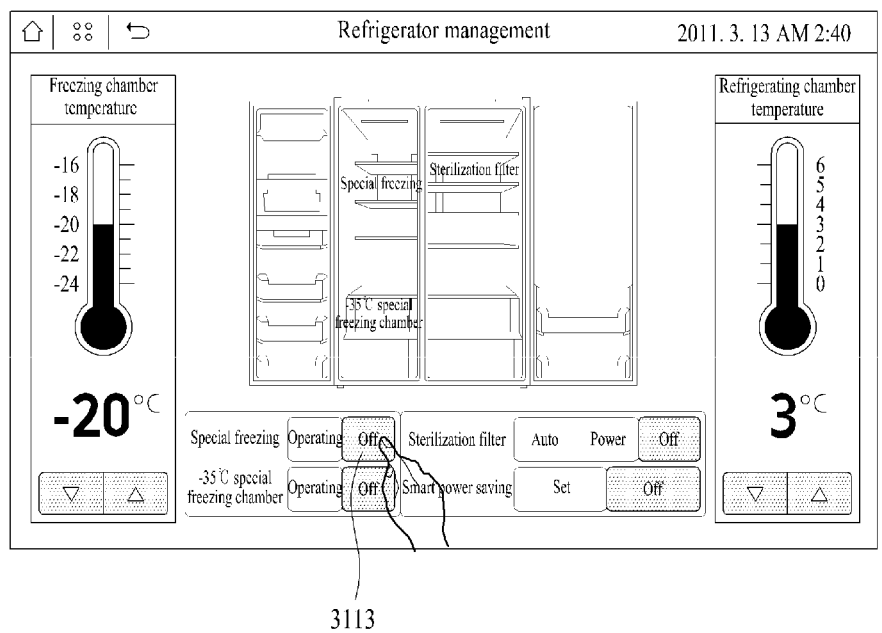

FIG. 40
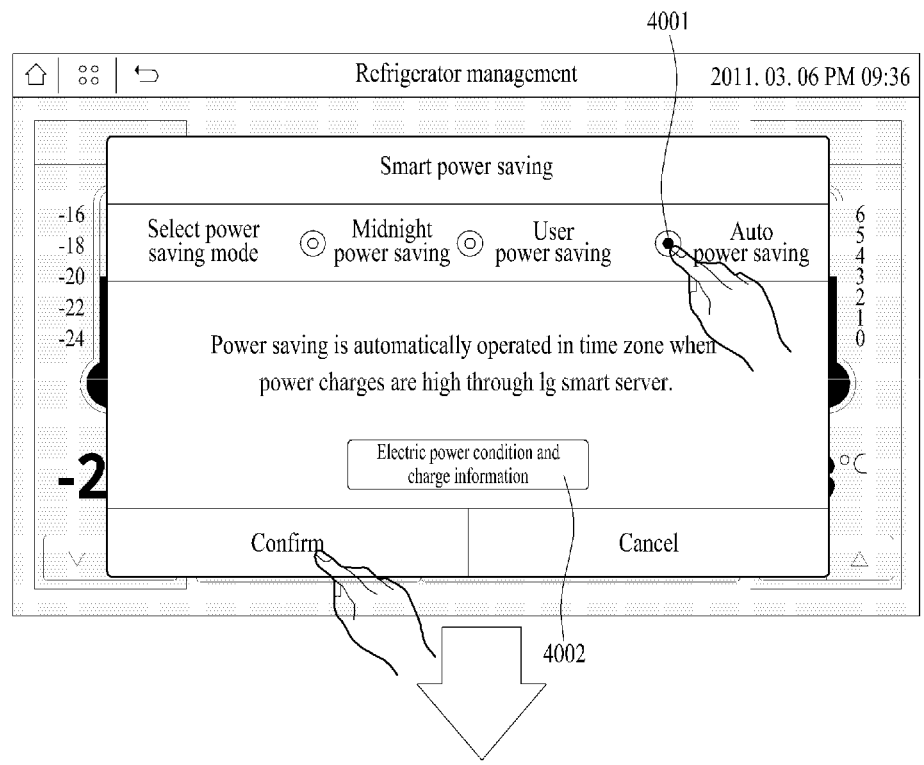
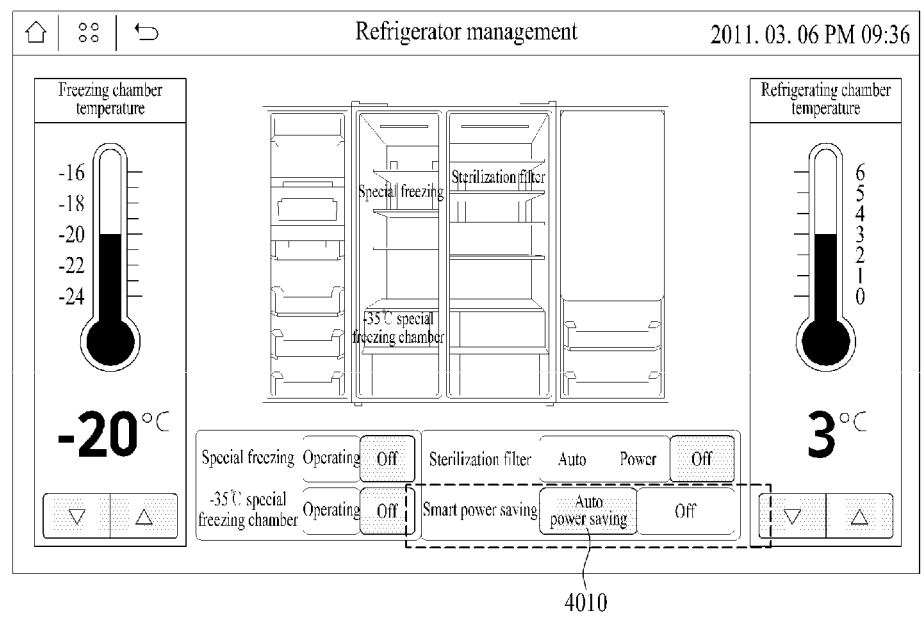

FIG. 49A
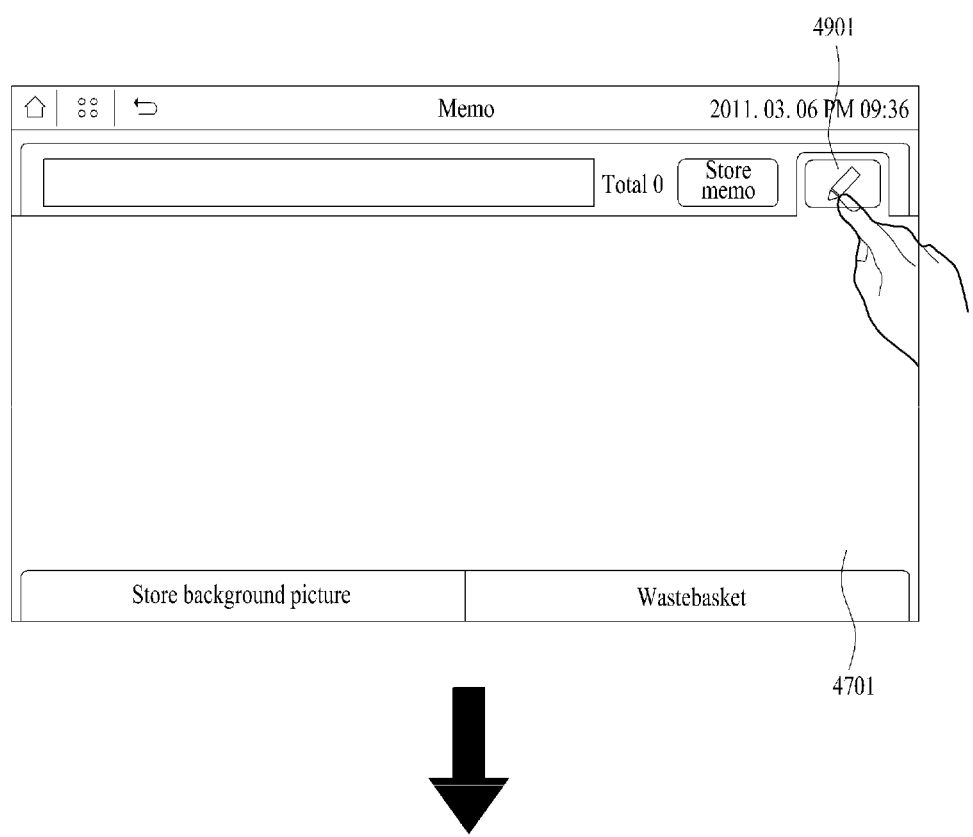
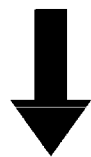
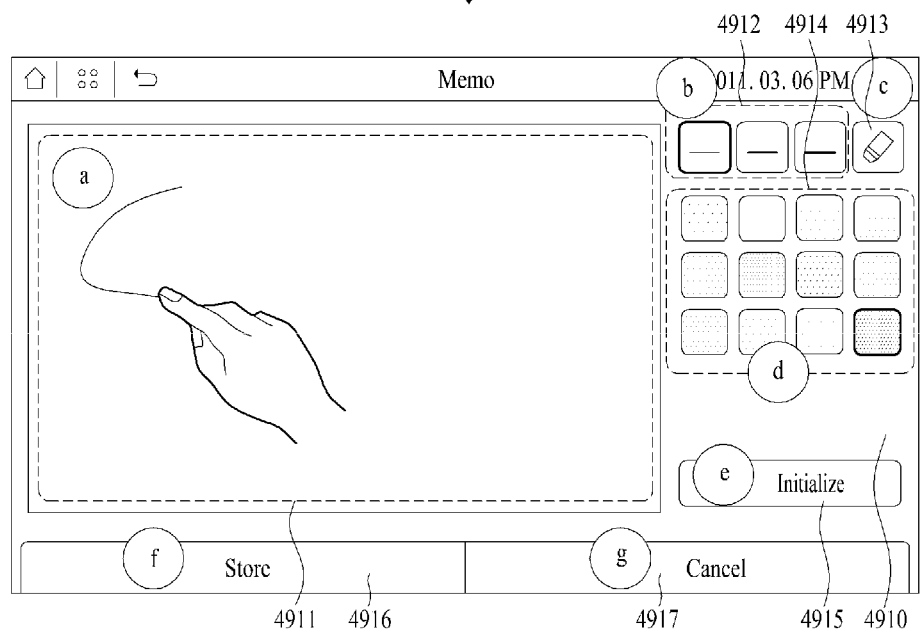

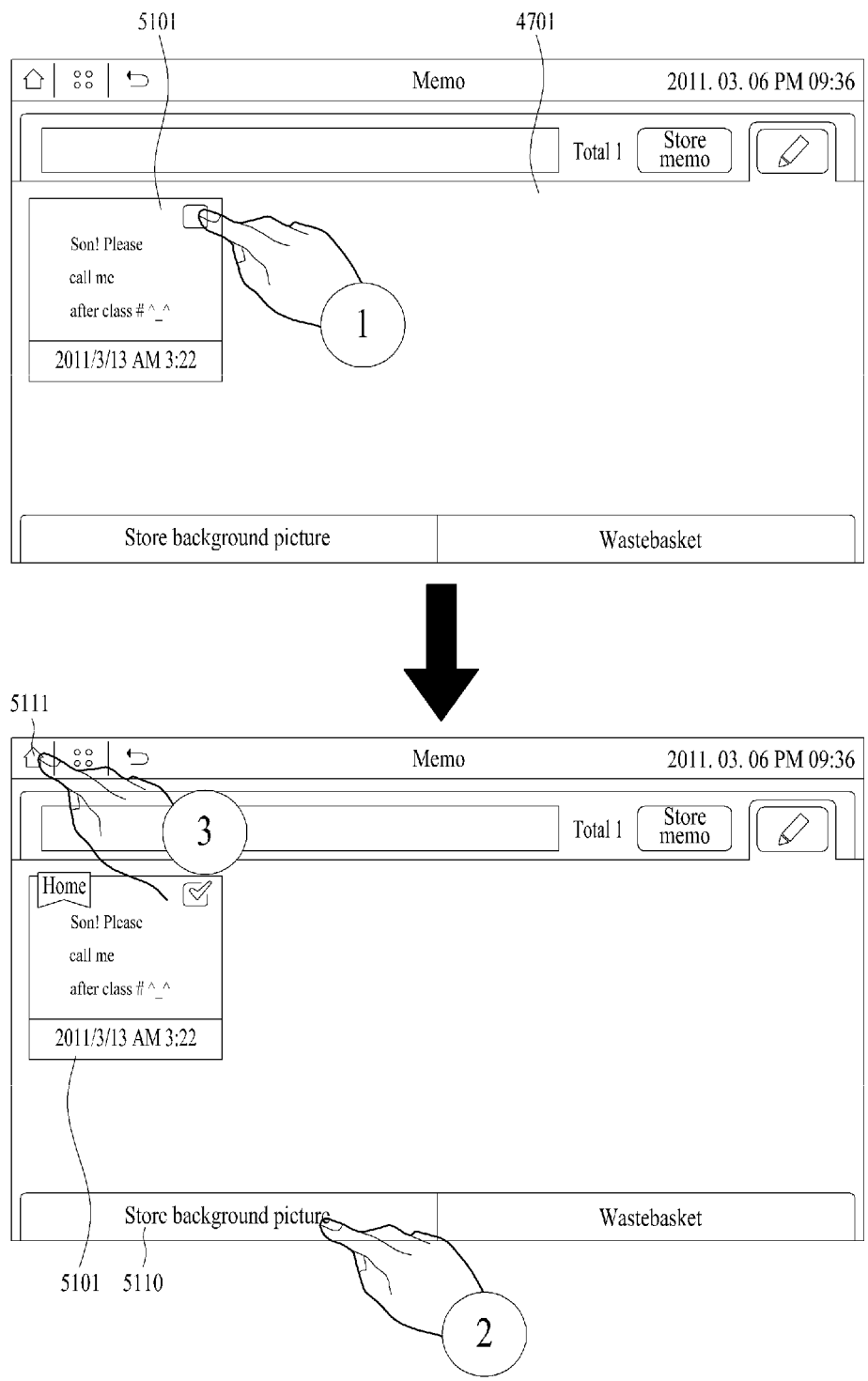

FIG. 56

|  |  | 241 |  | 5420 |  |
|---|---|---|---|---|---|

| ⌂ \| 88 \| ↰ | SETTING OF WIRELESS NETWORK | 2011. 03. 06 PM 09:36 |
|---|---|---|
| Wi-Fi | Wi-Fi ON | ☑ |
| Wi-Fi NETWORK | | |
| KT_WLAN | SECURE WITH WEP | 📶 |
| KT_WLAN | SECURE WITH WEP | 📶 |
| BUFFALO-G-WEP | SECURE WITH WEP | 📶 |
| AndroidAP | CONNECTED ● | 📶 |
| taehui | SECURE WITH WEP | 📶 |

WIRELESS NETWORK CONNECTION COMPLETED STATE

DISPLAY DEVICE AND REFRIGERATOR HAVING THE SAME

CROSS-REFERENCE TO RELATED APPLICATION(S)

This application is a divisional of co-pending application Ser. No. 13/445,247 filed on Apr. 12, 2012, which claims the priority benefit of U.S. Provisional Application No. 61/583,625, filed on Jan. 6, 2012 and Korean Application No. 10-2011-0033810 filed in Korea on Apr. 12, 2011, whose entire disclosures are hereby incorporated by reference.

BACKGROUND

1. Field

A display device and a refrigerator having the same are disclosed herein.

2. Background

Display devices and refrigerators having the same are known. However, they suffer from various disadvantages.

BRIEF DESCRIPTION OF THE DRAWINGS

The embodiments will be described in detail with reference to the following drawings in which like reference numerals refer to like elements wherein:

FIG. 33 is a view illustrating setting of special freezing operation on the display in accordance with the present disclosure;

FIGS. 37 to 40 are views illustrating setting of a power saving mode on the display in accordance with the present disclosure;

FIGS. 47 to 52B are views illustrating execution of memo management on the display in accordance with the present disclosure;

FIGS. 55A to 57B are views illustrating configuration of a wireless network on the display in accordance with the present disclosure;

DETAILED DESCRIPTION

Figure 1:
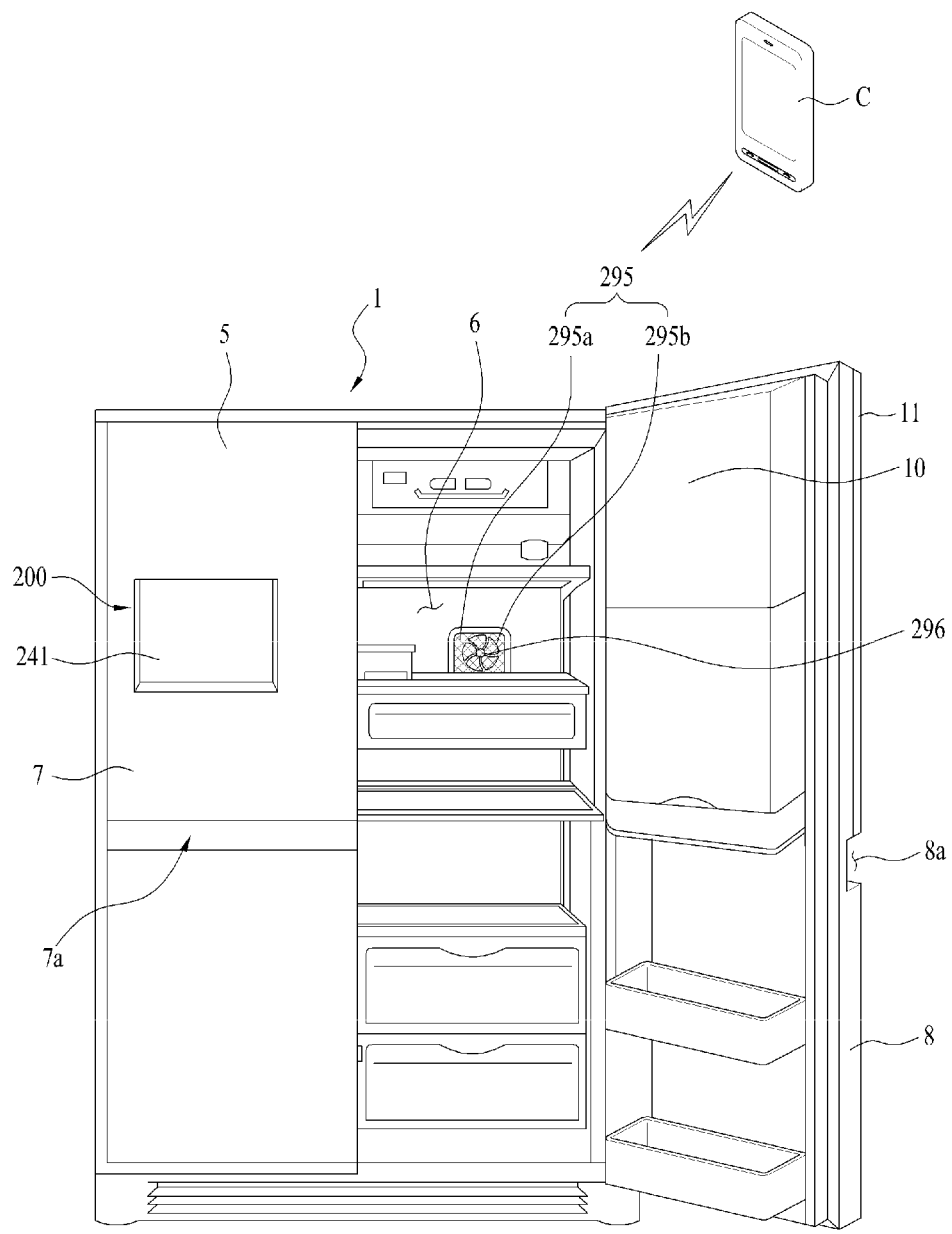
FIG. 1 is a perspective view of a refrigerator in accordance with the present disclosure.

A refrigerator is an electric home appliance which stores food and other items in a cold state or a frozen state using a refrigerating cycle, and includes a main body provided with storage chambers and doors provided on the main body to open and close the storage chambers, and compressors, condensers, expansion devices and evaporators are provided at the inside of the main body.

In general, a main purpose of the refrigerator is to keep the storage state of food or other perishables without damage while remarkably increasing the storage period of the items. Recently, the necessity for smart electric home appliances which may provide various pieces of information to users in addition to original purposes of the electric home appliances is on the rise. According to the trend toward smart electric home appliances, the necessity for a refrigerator which may visually provide information as to a product itself and other information required in life to users and raise user's information accessibility has been proposed.

Further, the necessity for a refrigerator which may implement a bidirectional information flow system enabling a user to process specific information and then to input the processed information and enabling the input information to be reflected on operation of the refrigerator or practical, other than a unidirectional information system, has been proposed. Accordingly, the present disclosure is directed to a display device and a refrigerator having the same that substantially obviate one or more problems due to limitations and disadvantages of the related art.

An object of the present disclosure is to provide a refrigerator which may provide various pieces of information to users or process useful information. Another object of the present disclosure is to provide a refrigerator which may provide a convenient user interface to users. Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a refrigerator may include a display unit to display the inner shape of the refrigerator including a plurality of storage spaces, in a first area, a memory having storage information on items stored in each of the plurality of storage spaces, and a controller to display icons indicating at least one of kinds and the numbers of the items stored in each of the plurality of storage spaces of the inner shape of the refrigerator according to the storage information.

In another aspect of the present disclosure, a refrigerator may include a main body including storage chambers to store items, doors to open and close the main body, a display device installed on one of the doors, and provided with an insertion slot into which a designated storage device is inserted and a display unit to visually display designated information, and a cover member detachably provided on the one of the doors to selectively cover one side surface of the display device provided with the insertion slot.

Reference will now be made in detail to the preferred embodiments of the present disclosure, examples of which are illustrated in the accompanying drawings. Wherever possible, the same reference numbers will be used throughout the drawings to refer to the same or like parts.

As shown in FIG. 1, a refrigerator in accordance with the present disclosure may include a main body 1, provided with storage chambers and doors to open and close the storage chambers, and a display device 200 which may provide information to users or receive information is provided on one of the doors. The storage chambers include a freezing chamber 5 and a refrigerating chamber 6. Although FIG. 1 illustrates the freezing chamber 5 and the refrigerating chamber 6 as being arranged in parallel, the freezing chamber 5 and the refrigerating chamber 6 may be arranged vertically.

A special freezing chamber may be provided within the freezing chamber 5 that maintains a significantly lower temperature than the temperature in the freezing chamber 5. The special freezing chamber may allow rapid freezing of a relatively small amount of meat or fish for long term storage.

The doors may include a freezing chamber door 7 to open and close the freezing chamber 5 and a refrigerating chamber door 8 to open and close the refrigerating chamber 6. A sub-storage chamber 10 divided from the refrigerating chamber 5 may be provided on the refrigerating chamber door 8, and a sub-door 11 to open and close the sub-storage chamber 10 may be provided in front of the refrigerating chamber door 8. Handles 7a and 8a may be provided on the freezing chamber door 7 and the refrigerating chamber door 8, respectively.

A filter device 295 to purify and sterilize air within the freezing chamber 5 and/or the refrigerating chamber 6 may be provided within the freezing chamber 5 or the refrigerating chamber 6. Such a filter device 295 may include a filter unit 295a and a fan unit 295b to filter contaminants from the air. The filter device 295 may be provided on the rear wall of the freezing chamber 5 or the refrigerating chamber 6, and may thus absorb air within the freezing chamber 5 or the refrigerating chamber 6 to remove foreign substances and bacteria from the absorbed air. A lighting device 296 that indicates the operation of the filter device 295 may be provided around the filter device 295.

Although FIG. 1 illustrates the display device 200 as being exposed from the front surface of the freezing chamber door 7, the display device 200 may be provided on the refrigerating chamber door 8. Moreover, although they will be described later, various pieces of information may be stored in a memory in the display device 200. These pieces of information may be provided to users through the display device 200. A user may also input a designated piece of information using the display device 200 for storage therein.

Further, such information may include information regarding operation of the refrigerator, information regarding items stored in the freezing chamber 5 or the refrigerating chamber 7, recipe information regarding dishes which may be made using designated food materials, user memos, or other appropriate type of information. Further, the display device 200 may be provided to be communicable with a wireless terminal C, such as an external PDA or smart phone, and may be connected thereto in terms of flow of information. That is, information processed through the display device 200 may be displayed on the wireless terminal C through a wireless communication network. Otherwise, information processed through the wireless terminal C may be reflected on the display device 200.

The refrigerator may track contents of the refrigerator using various methods. For example, the refrigerator may also include RFID sensors, or the like, for tracking and maintaining the contents of the refrigerator. Examples of refrigerators having RFID sensors for tracking food content is disclosed in U.S. Patent Application Publication No. US 2009/0282859 A1, which is hereby incorporated by reference. RFID may be used in conjunction with a food management menu as disclosed hereinafter for tracking and maintaining a list of food or other perishable items stored in a refrigerator.

Figure 2:
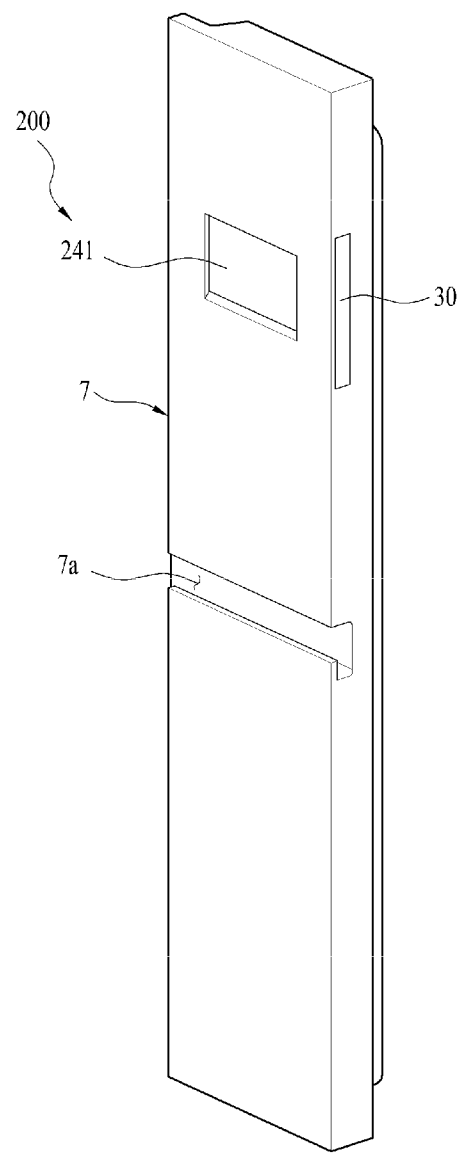
FIG. 2 is a perspective view of a door in accordance with the present disclosure.

FIG. 2 is a perspective view illustrating the door 7 and the display device 200 (also display assembly) provided on the door 7. Here, the display device 200 may include a display unit 241 (also display or display screen) constituting a screen. The display unit 241 may be provided at the upper portion of the front surface of the door 7 so as to be exposed to the outside.

A cover member 30 may be detachably provided on one side surface of the door 7. The cover member 30 serves to selectively cover an insertion slot 245 (with reference to FIG. 3) into which a storage device (for example, an SD memory card or a USB storage device) may be inserted, as described in further detail hereinafter.

Figure 3:
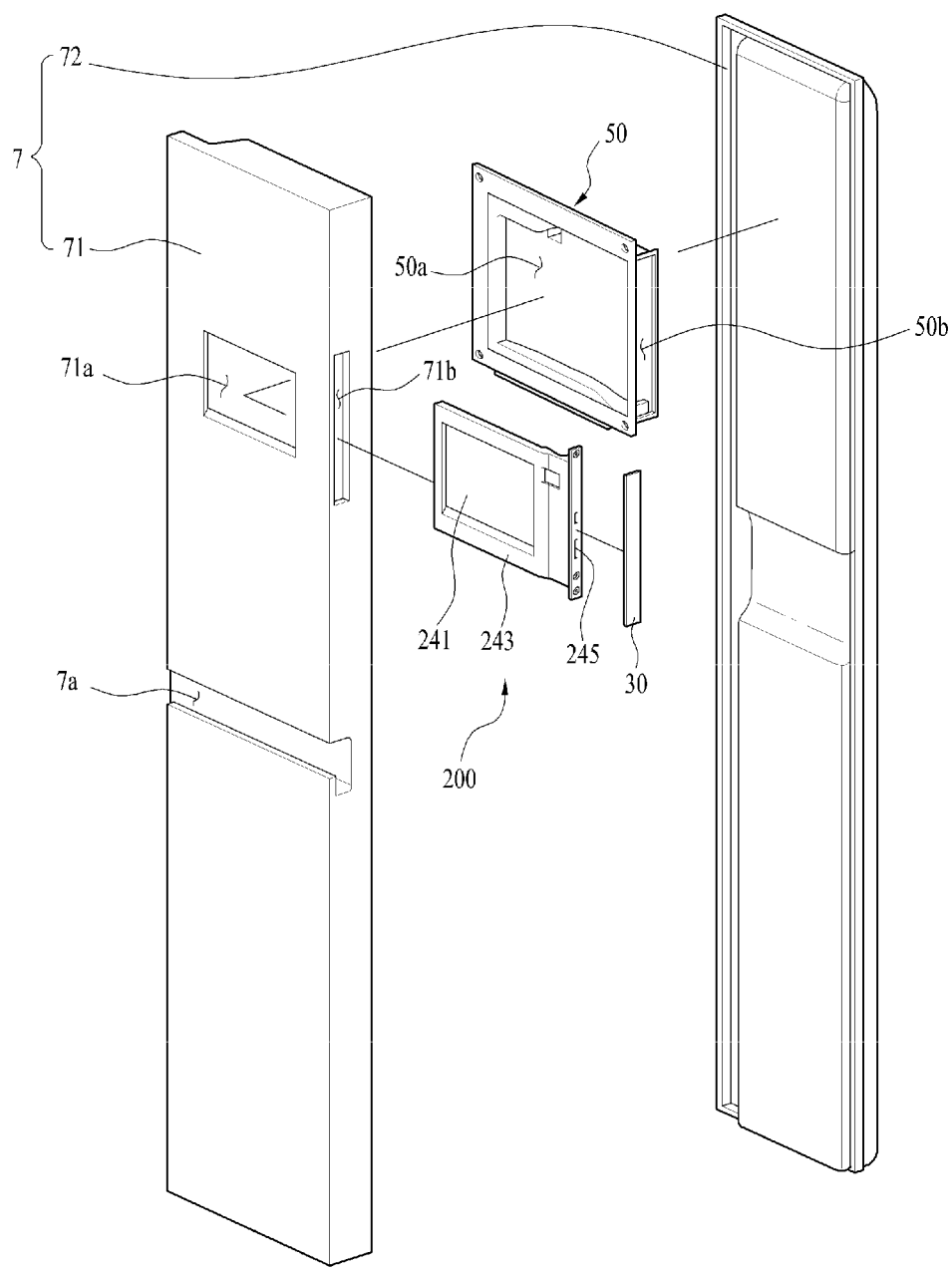
FIG. 3 is an exploded perspective view of the door and a display device in accordance with the present disclosure.

As shown in FIG. 3, the door 7 may include a front door part 71 serving as a front member of the door 7 and a rear door part 72 serving as a rear member of the door 7. The display device 200 may be provided between the front door part 71 and the rear door part 72.

The display device 200 may include the display unit 241, a housing 243 surrounding the display unit 241, and the insertion slot 245 provided on one side surface of the housing unit 243. The display device 200 may be accommodated in a frame unit 50, and the frame unit 50 may have an accommodation space 50a to accommodate the display device 200 and may be provided at the inside of the rear door part 72 and the front door part 71.

A front surface opening 71a that exposes the display unit 241 to the front may be provided on the front surface of the front door part 71. Further, side openings 71b and 50b that exposes the insertion slot 245 may be provided on one side surface of the front door part 71 and one side surface of the frame unit 50. The cover 30 may be detachably provided at the side openings 71*b* and 50*b*.

Figure 4:
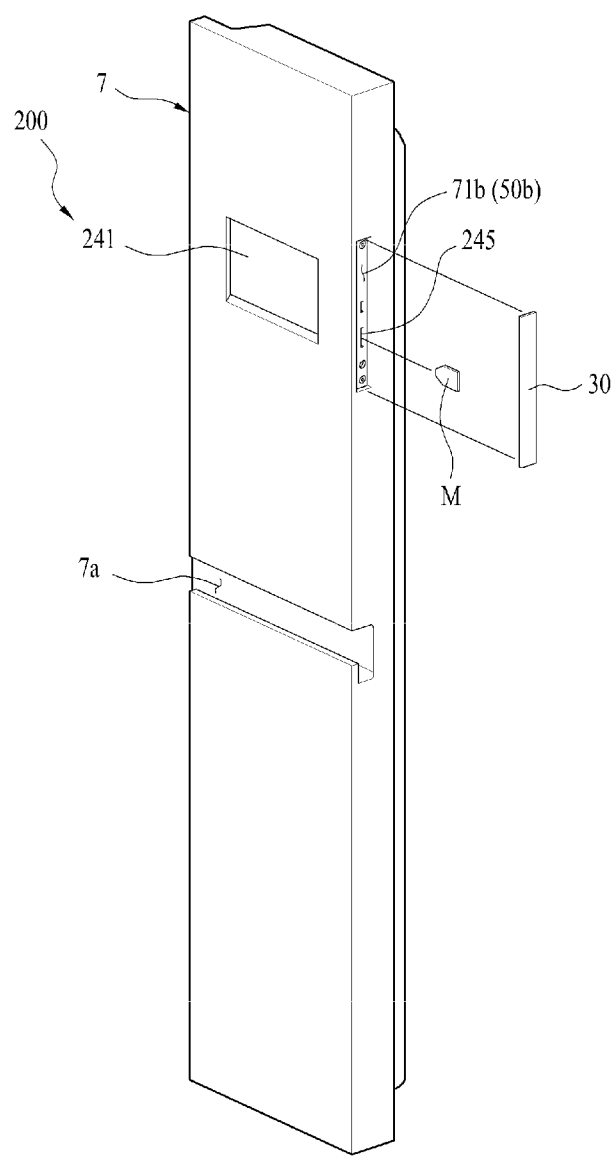
FIG. 4 is a perspective view illustrating insertion of a storage device into an insertion slot of the display device in accordance with the present disclosure.

As shown in FIG. 4, if the storage device M is inserted into the insertion slot 245 to supply information to the display device 200, or to update firmware or other pieces of information, the insertion slot 245 may be exposed by separating the cover member 30 from the side opening 71*b* and 50*b*. Then, when update or supply of information has been completed, the cover member 30 may be replaced on the side openings 71*b* and 50*b* to protect the insertion slot 245 from exposure to the outside.

FIGS. 1 to 4 illustrate the display device 200 as being provided on the freezing chamber door 7 from among the doors. In this case, the side surface of the freezing chamber door 7 on which the insertion slot 245 is formed may be provided so as to be opposite one side surface of the refrigerating chamber door 8 arranged in parallel with the freezing chamber door 7. It should be appreciated that the position of the display device 200 is not limited to the freezing chamber door 7 as disclosed, but may be provided at any appropriate location on the refrigerator, for example, on the refrigeration chamber door 8.

Figure 5:
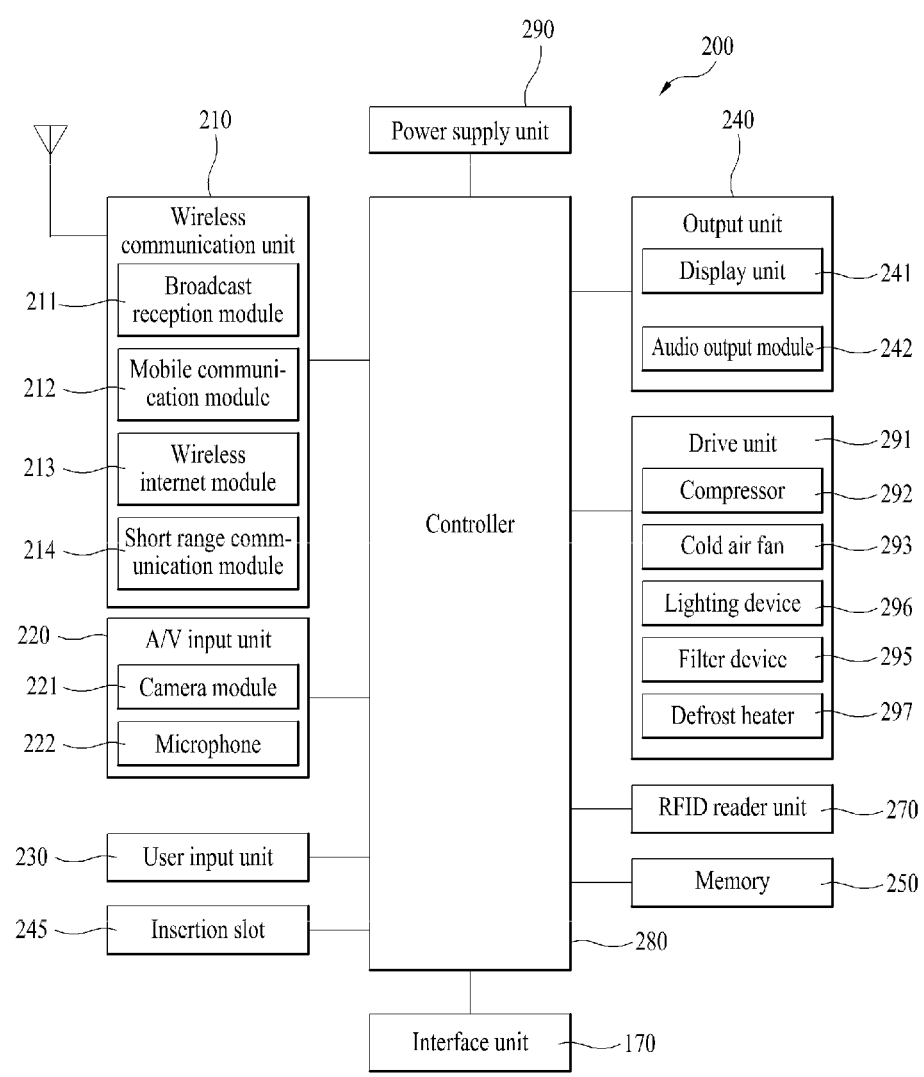
FIG. 5 is a control block diagram in accordance with the present disclosure.

FIG. 5 is a control block diagram in accordance with the present disclosure. The display device 200 of the refrigerator in accordance with the present disclosure may include a communication unit 210, an audio/video (A/V) input unit 220, a user input unit 230, an output unit 240, a memory 250, an interface unit 260, an RFID reader unit 270, a controller 280, a power supply unit 290 and the insertion slot 245.

The communication unit 210 may include at least one module which enables a data connection between the display device 200 and a remote device over a wired or wireless communication system or through an Internet network. For example, the communication unit 210 may include a broadcast reception module 211, a mobile communication module 212, an Internet module 213, a short range communication module 214, etc.

The broadcast reception module 211 receives a broadcast signal and/or information regarding broadcast from an external broadcast management server through a broadcast channel under control of the controller 280, and reproduces such information through the display unit 241.

The mobile communication module 212 transmits/receives a signal with at least one of a base station, an external terminal or a server through a mobile communication network. Such a signal may include an audio signal, a video communication signal or data in various configuration according the type of text/multimedia messages which are transmitted/received.

The internet module 213 refers to a module for wired/wireless internet connection, and wireless LAN (WLAN; Wi-Fi), wireless broadband (WiBro), world interoperability for microwave access (WiMax) or high speed downlink packet access (HSDPA) which may be used as a wireless Internet technique.

The short range communication module 214 refers to a module for short range communication. Bluetooth, radio frequency identification (RFID), infrared data association (IrDA), ultra wideband (UWB) or ZigBee may be used as a short range communication technique.

The A/V input unit 220 may enable input of an audio signal or a video signal. The A/V input unit 220 may include a camera module 221 and a microphone 222. The camera module 221 processes image data, such as a still image or a moving image, obtained by an image sensor in a video communication mode or a photographing mode. The processed image data may be displayed on the display unit 241.

The image data processed by the camera module 221 may be stored in the memory 250 or be transmitted to an external device through the communication unit 210. Two or more camera modules 221 may be provided according to usage environments. The microphone 222 may receive an external audio signal in a communication mode, a recording mode or a voice recognition mode, and may process the audio signal into electrical voice data.

The user input unit 230 may generate input data to allow a user to control operation of a terminal for refrigerators, i.e., the display device 200. The user input unit 230 may include a key-pad, a direction key, a dome switch, a touch-pad (constant pressure type/capacitive type), a jog wheel, a jog switch, etc.

The output unit 240 may generate video or audio output, and may include the display unit 241 and an audio output module 242. Here, the audio output module 242 may include a speaker. The display unit 241 displays (outputs) information processed by the display device 200. For example, if the display device 200 displays information regarding the refrigerator, the display unit 241 displays the information regarding the refrigerator as a user interface (UI) or a graphical user interface (GUI) in the form of a widget or an icon.

The above-described display unit 241 may include at least one of a liquid crystal display (LCD), a thin film transistor liquid crystal display (TFT LCD), an organic light emitting diode (OLED), a flexible display or a 3D display.

If the display unit 241 and a sensor sensing a touch operation (hereinafter, referred to as a 'touch sensor') form a layered structure (hereinafter, referred to as a 'touch screen'), the display unit 241 may be used as an input device in addition to the output device. The touch sensor may have a type, for example, a touch film, a touch sheet or a touch-pad. The touch sensor may be configured to convert change of pressure applied to a specific region of the display unit 241 or capacitance generated at a specific region of the display unit 241 into an electrical input signal. The touch sensor may be configured to detect pressure during touch as well as the position and area of a touch point.

If there is touch input with respect to the touch sensor, a signal(s) corresponding to the touch input may be transmitted to a touch controller. The touch controller processes the signal(s) and then transmits corresponding data to the controller 280. Thereby, the controller 280 may detect which region of the display unit 241 is touched.

The audio output module 242 outputs data including audio stored in the memory 250, or outputs audio informing a user of an operating state regarding the refrigerator. Such an audio output module 242 may include a receiver, a speaker, a buzzer, etc.

The memory 250 may store programs to execute processing and control of the controller 280, and store information regarding operation of the refrigerator. Further, the memory 250 in accordance with the present disclosure may receive and store power information in real time.

Here, the power information may include information regarding change in power rates or costs according to time, general power consumption amounts in homes according to time (e.g., peak usage times and low consumption times), reference power rates or costs, etc. This power information may be provided by an electric power company or an electric power service company. Such power information may be obtained from an external service server or web server through the communication unit 210, or obtained from an external device through the interface unit 260. Further, the memory 250 may store graphic data which provides such power information to a user through various visual effects.

The above-described memory 250 may include at least one type of storage media from among flash memory, hard disc, multimedia card and micro card type memories (for example, an SD or XD memory), random access memory (RAM), a static random access memory (SRAM), read-only memory (ROM), electrically erasable programmable read-only memory (EEPROM), programmable read-only memory (PROM), magnetic memory, a magnetic disc, an optical disc, or another appropriate type of storage device.

The interface unit 260 may serve as a channel for all external devices connected to the terminal 200 for refrigerators. The interface unit 260 may receive data from an external device, receive power and transmit the power to the respective elements within the terminal 200 for the refrigerator, or transmit data within the terminal 200 for the refrigerator to an external device. For example, the interface unit 260 may include a wired/wireless headset port, an external charger port, a wired/wireless data port, a memory card port, a port to which a device provided with an identification module is connected, an audio input/output (I/O) port, a video input/output (I/O) port, an earphone port, etc.

The controller 280 may control an overall operation of the display device 200. Here, the controller 280 may be a microprocessor within the refrigerator 100. The power supply unit 290 may directly receive power for the refrigerator 100 or receive external power supplied through the interface unit 260 and then supplies power required for operation of the respective elements, under control of the controller 280.

Various embodiments described herein may be implemented in recording media readable by a computer or a device similar thereto, for example, using software, hardware or a combination thereof. In the case of implementation using hardware, the embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors or other types of electrical units to execute various functions.

In some cases, the embodiments described herein may be implemented by the controller 280 alone. In the case of implementation using software, the embodiments described herein, such as procedures and functions, may be implemented using separate software modules. Each of the software modules may execute at least one function and operation described herein. A software code may be implemented by a software application written in a suitable program language. Such a software code may be stored in the memory 250, and be executed by the controller 280.

A drive unit 291 to drive a compressor 292, a cold air fan 293, a lighting device 296, a filter device 295 and a defrost heater 297 which are provided in the refrigerator main body may be connected to the controller 280. These elements may be operated according to a command from the controller 280.

Hereinafter, a user interface implemented on the display unit 241 of the refrigerator 100 having the above-described structure will be described.

Figure 6:
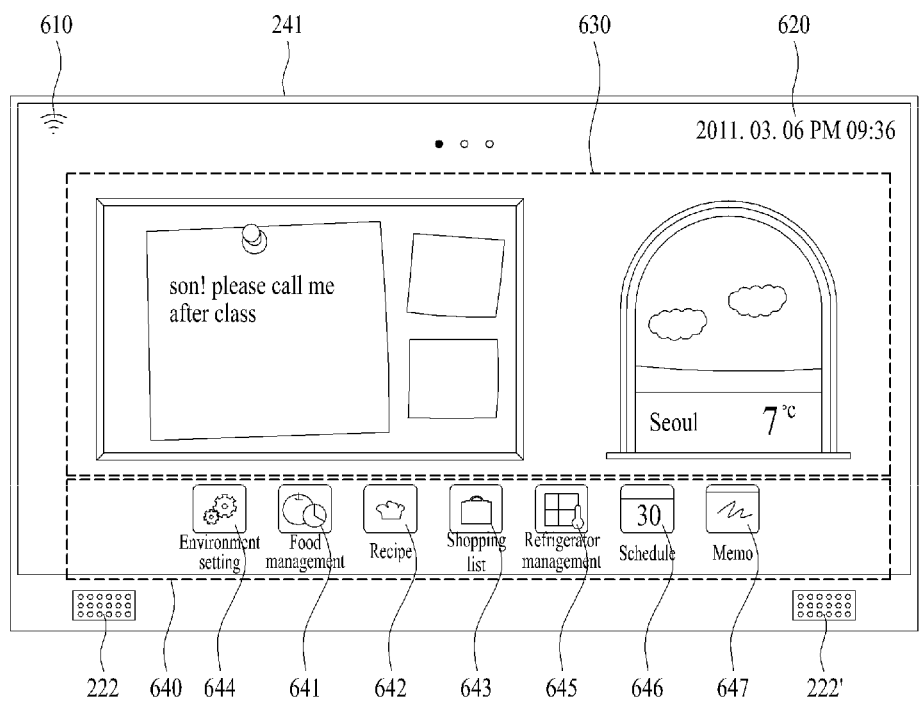
FIG. 6 is a view illustrating one example of a home screen displayed on a display of a refrigerator in accordance with one embodiment of the present disclosure.

FIG. 6 is a view illustrating one example of a home screen (initial picture arrangement) displayed on the display of the refrigerator in accordance with one embodiment of the present disclosure. The home screen may be initially displayed after power has been applied to the refrigerator and then booting of an operating system (OS) has been completed, or may be displayed if an event in which the display unit 241 is turned off and back on (for example, operation of the user input unit, opening of the storage chamber, etc.).

An indicator 610 indicating Wi-Fi signal strength may be displayed at the upper left portion of the display unit 241, and current time 620 may be displayed at the upper right portion of the display unit 241. The shape of the indicator 610 may be changed according to the currently activated wireless interface. Moreover, microphones 222 and 222' that convert a voice command of a user into electrical signals may be arranged at the lower end of the touch screen 241.

Various widgets may be displayed at a middle region 630. Widgets may be application programs that provide a particular function or information, such as a memo pad or weather. Icons corresponding to various menus which are executable through the touch screen may be arranged at a lower region 640. In more detail, at least one of a food management icon 641, a recipe icon 642, a shopping list icon 643, an environment setting icon 644, a refrigerator management icon 645, a schedule icon 646 or a memo icon 647 may be displayed at the lower region 640.

It should be appreciated that the arrangement/positions/kinds of the menu icons, the indicator 610 and the widgets shown in FIG. 6 are exemplary, and the present disclosure is not limited thereto. Hereinafter, the functions corresponding to the respective menu icons will be described in more detail.

Food Management Menu

The food management menu will be described with reference to FIGS. 7A to 19. FIGS. It should be appreciated that while this disclosure refers to maintaining and tracking food stored in the refrigerator, this disclosure is not limited thereto and may be applicable to various types of perishable items or any object that requires refrigeration.

7A and 7B are views illustrating one example of a food management menu displayed on the display 241 of the refrigerator 100 in accordance with an embodiment of the present disclosure. The food management menu has a function of newly registering information on items stored in the storage chambers (e.g., contents of the refrigerator) or confirming/amending/deleting information associated with the registered items. The food management menu may be displayed by selecting the food management icon 641 at the lower portion 640 of the home screen of FIG. 6.

Figure 7A:
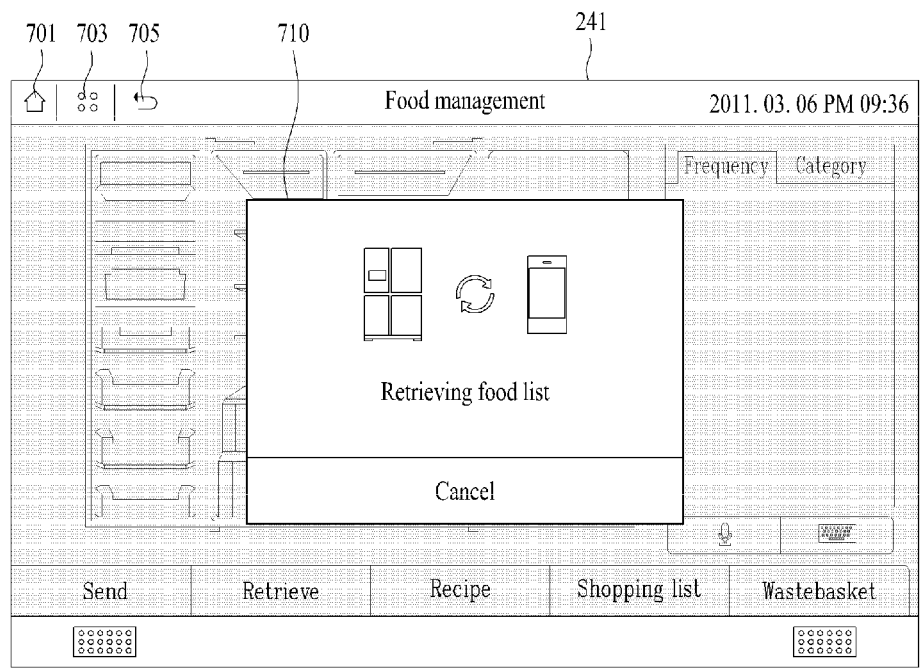
FIGS. 7A and 7B are views illustrating one example of a food management menu displayed on the display of the refrigerator in accordance with an embodiment of the present disclosure.
Figure 7B:
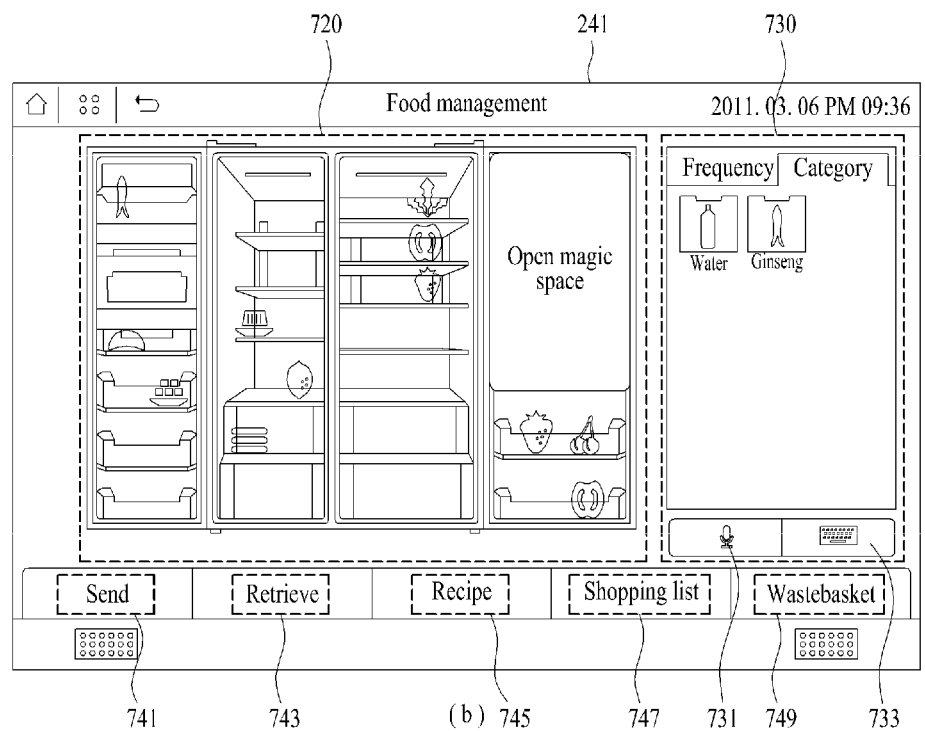

When the food management menu is accessed, the touch screen 241 switches from the home screen of FIG. 6 to the food management menu of FIGS. 7A and 7B. If information for the contents of the refrigerator is stored in advance, a popup window 710 may be displayed to indicate that the stored food list information is being updated. The information being updated may include contents of the refrigerator including a type, quantity, location, expiration date, etc. of food stored in the refrigerator. The information on the stored food list may be stored locally in memory 250 or remotely on the wireless device C or a remote server.

During the update, a food library may also be downloaded or updated. The food library may include food objects and associated information related to the food objects. The information associated with each food object may include an icon, name, type or category, frequency of use, associated recipes, or another appropriate type of information. The food library may be stored locally and updated periodically from the server or using a memory card, or the like.

A home button 701, a menu button 703 and a back button 705 may be displayed at the upper end of the left portion. If the home button 701 is selected, the home screen may be displayed, and if the menu button 703 is selected, a format of the food management menu may be changed or a submenu may be displayed. If the back button 705 is selected, a previously displayed menu or image may be displayed. The above-described home button 701, menu button 703 and back button 705 may be displayed in other menus, such as the recipe menu or the shopping list menu, in the same or similar manner as well as the food management menu. The functions of these buttons may be different according to the menus in which they are displayed.

If loading of the information on the food objects from the memory 250 has been completed, an image 720 of the refrigerator may be displayed. The image 720 may be a graphical likeness of the refrigerator including the storage chambers, e.g., a picture of the refrigerator. The icons for food stored in each storage chamber of the refrigerator may be displayed on the image 720.

A food object selection area 730 may be displayed which includes icons corresponding to various foods for selection therefrom. A microphone icon 731 for inputting commands through voice recognition and a keyboard icon 733 to access a virtual touch keyboard may be displayed in the food object selection area 730. The keyboard may be used to input names of the food objects.

Sub-menu icons 741 to 749 of the food management menu may be displayed under the inner space graphic 720 and the food object selection area 730, as shown in FIG. 7B. If the expiration dates of the storage period of a food object in each of the storage chamber is near, visual effects, such as change of color of the corresponding storage chamber, may be exhibited.

FIGS. 8A to 8D are views illustrating one example of inputting information for food stored in the refrigerator according to frequency through the display in accordance with an embodiment of the present disclosure. When a particular food is added to the refrigerator, a corresponding icon for the food object may be selected and placed in the image of the refrigerator using the food management menu. The food management menu may be used to quickly track and view the contents of the refrigerator. Moreover, food icons may be sorted based on frequency or category in the food object selection area.

Figure 8A:
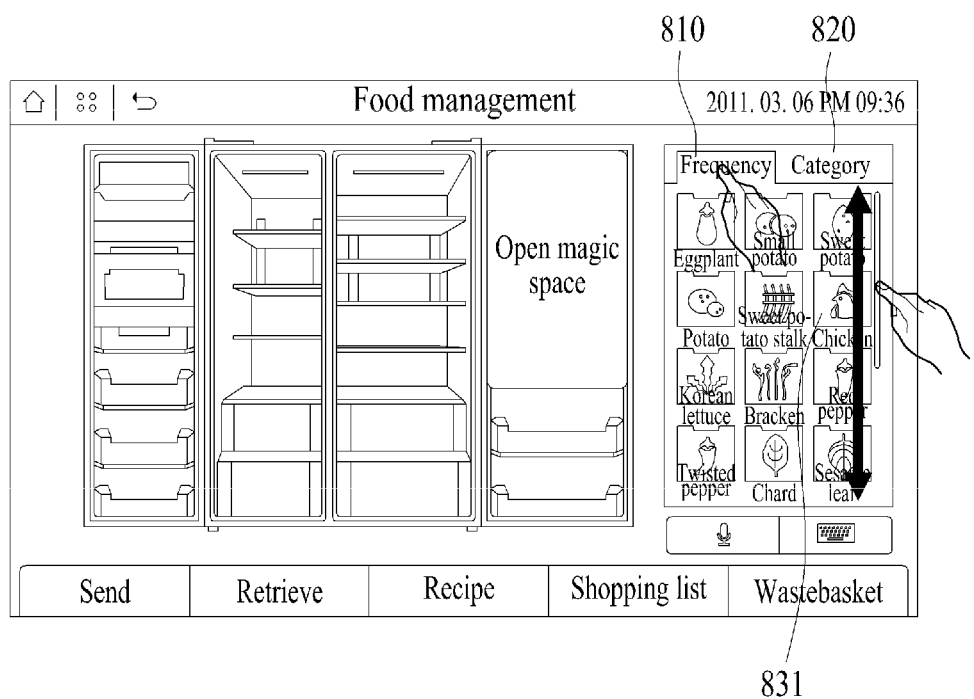
FIGS. 8A to 8D are views illustrating one example of inputting information for food stored in the refrigerator through the display of the refrigerator in accordance with an embodiment of the present disclosure.

A frequency tab 810 and a category tab 820 may be displayed at the upper end of the food object selection area, as shown in FIG. 8A. If the frequency tab 810 is selected, icons of food objects are sorted in order of decreasing input frequency at in the food object selection area. That is, an icon corresponding to a food object which is frequently stored by a user may be displayed at the upper end. Here, a color of a selected food object icon 831 may be changed or otherwise highlighted when selected, e.g., touched. The list of stored item icons may be scrolled in the vertical direction using, for example, a flick or drag input. The frequency of use may be based on overall frequency of use, based on a particular user or on information received from a server. For example, the frequency of use may be tracked for a particular user or it may be based on frequency of use by a community of users.

Figure 8B:
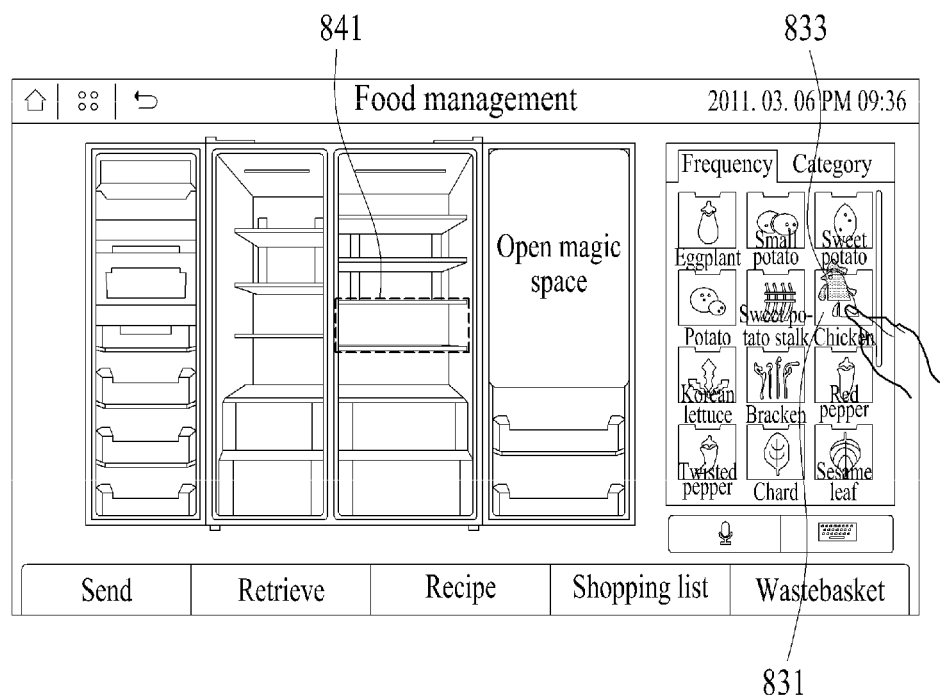

If an item to be stored is chicken, for example, in order to input information that the item is stored in a specific compartment 841 of a storage chamber, the chicken icon 831 may be activated by maintaining a touched state of the chicken icon 831 in the food object selection area for a designated time, as illustrated in FIG. 8B, and thus a movable icon 833, separate from the chicken icon 831, may be displayed.

Figure 8C:
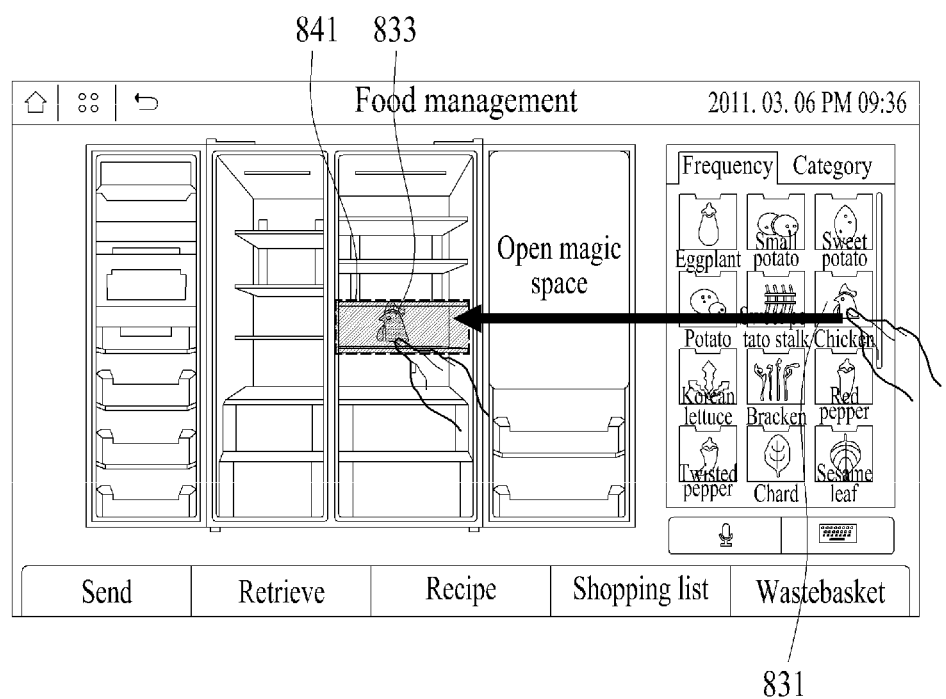
Figure 8D:
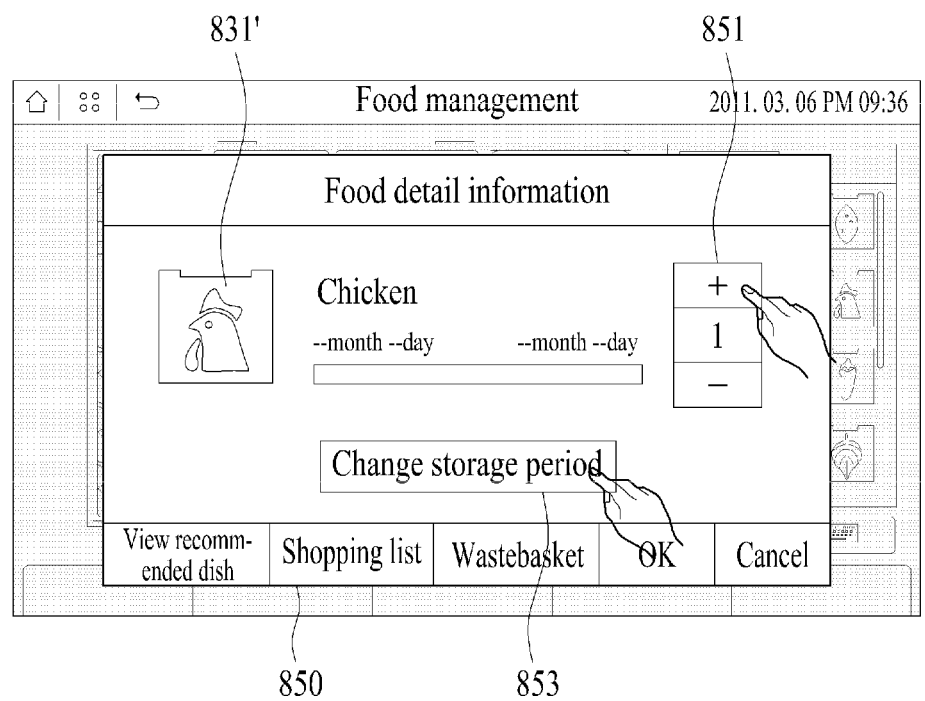

Thereafter, when the separated icon 833 is dragged from the position of the original icon 831 to a desired storage chamber, as shown in FIG. 8C, and then touch of the icon 833 is released, a detailed information popup window 850 may be displayed, as shown in FIG. 8D. In more detail, the icon 831' corresponding to the food object, +/− buttons 851 to adjust the quantity of the food object, and a storage period change button 853 may be displayed on the popup window 850.

Figure 9:
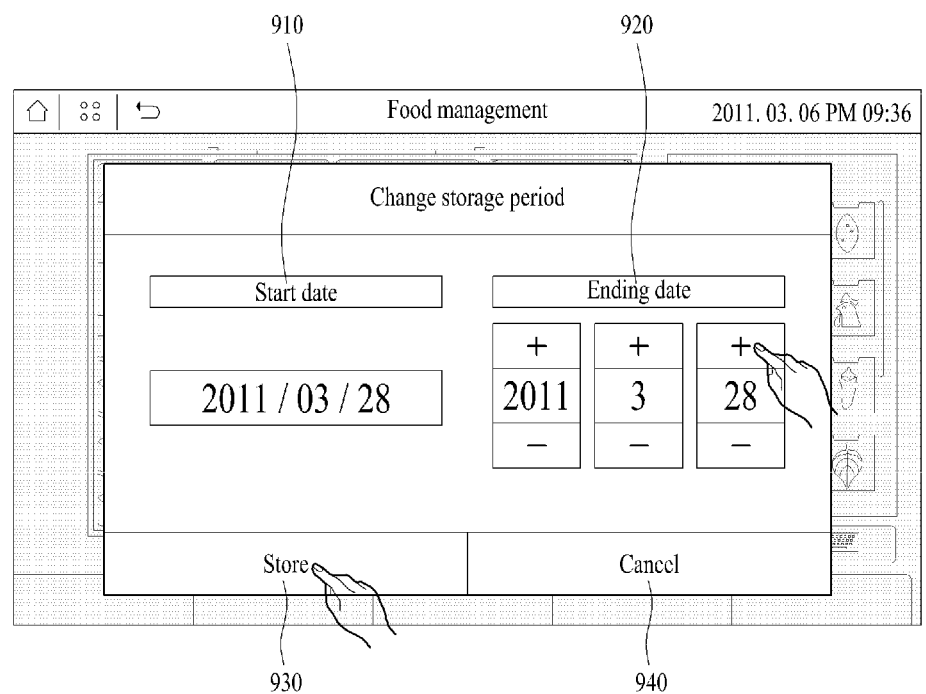
FIG. 9 is a view illustrating one example of setting a storage period for food stored in the refrigerator through the display of the refrigerator in accordance with an embodiment of the present disclosure.

FIG. 9 is a view illustrating one example of setting of a storage period from among information on a food object through the display of the refrigerator in accordance with an embodiment of the present disclosure. The storage period for each food object may be stored. If the storage period change button 853 of FIG. 8 is selected, a period change popup window is displayed, as shown in FIG. 9. On the popup window, a storage starting date 910 and a storage ending date 920 (e.g., expiration date) may be changed by manipulating +/− buttons. An expiration date may also be set automatically using default values.

If change has been completed, a user may select a store button 930 to store the changed storage period, or select a cancel button 940 to cancel change of the storage period. Storage periods of food objects set in the above-described manner may be displayed on a storage period notification widget, which will be described later, in the order that the storage period expiration dates of the food objects are near.

Figure 10A:
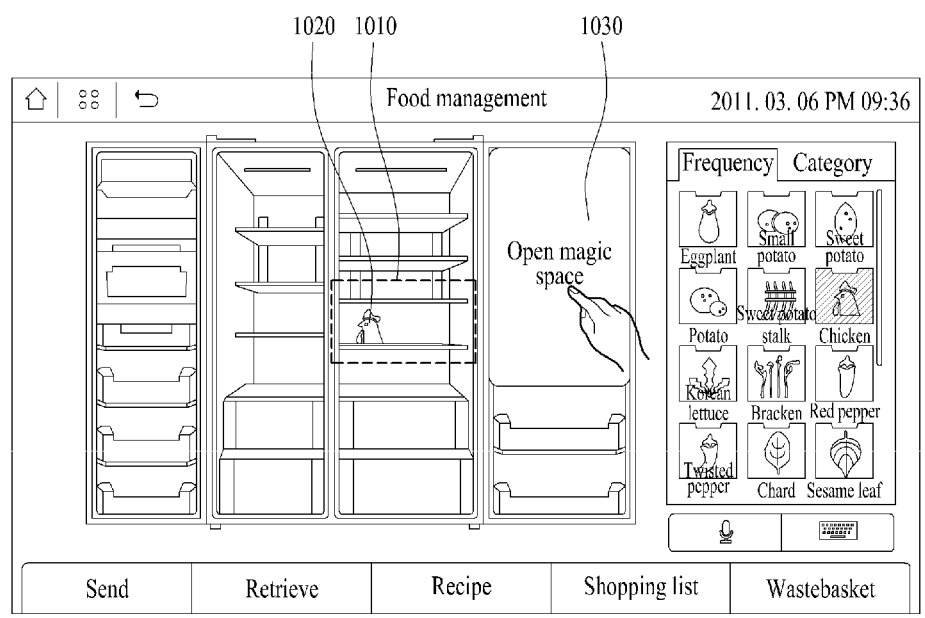
FIGS. 10A and 10B are views illustrating one example of selecting storage chambers through the display of the refrigerator in accordance with an embodiment of the present disclosure.
Figure 10B:
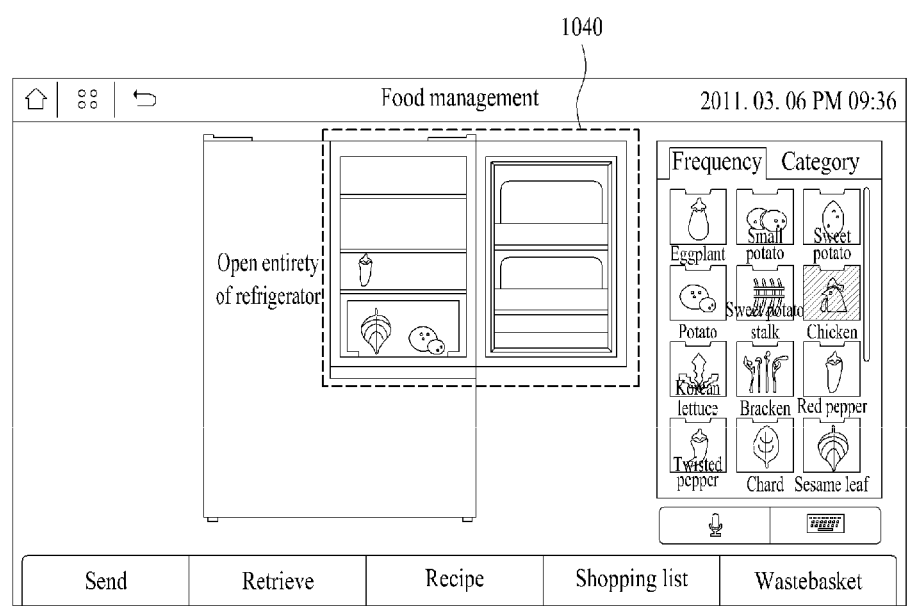

FIGS. 10A and 10B are views illustrating one example of selecting various storage chambers of the refrigerator through the display in accordance with the embodiment of the present disclosure. It is assumed that FIGS. 10A and 10B illustrate a state after storage of the information on chicken has been completed through the process shown in FIGS. 8A to 8D and FIG. 9. Hence, in FIG. 10A a chicken icon 1020 is displayed in area 1010 of a storage chamber, indicating that chicken is stored at the corresponding position of the refrigerator 100.

Storage chamber 1030 may be a separate compartment of the refrigeration chamber which may be opened from the outside without opening the refrigerator door 8. The storage chamber 1030 may be closed to the main refrigeration chamber such that opening the storage chamber 1030 does not affect the cold air in the main refrigeration chamber. For example, frequently accessed items may be stored in the storage chamber 1030 to conserve energy. Storage chamber 1030 may be referred to as a "magic space" or "magic compartment" and may have a separate temperature control than the main refrigeration chamber or the freezing chamber.

If the storage chamber 1030 is selected from the image of the interior of the refrigerator, the displayed image may be changed to show the interior of the storage chamber 1030. Here, the image of the remaining portions of the refrigerator may be illustrated as being closed to highlight the storage chamber 1030 as well as to provide a physically accurate and aesthetically pleasing graphical user interface, as shown in FIG. 10B. A process of adding food objects and associated information into the magic space is the same as the previously described process for the main storage chambers within the refrigerator, and a detailed description thereof will thus be omitted. Further, a selection of the image of the refrigerator outside the magic space may revert the image to the interior image of the main storage chambers.

Figure 11A:
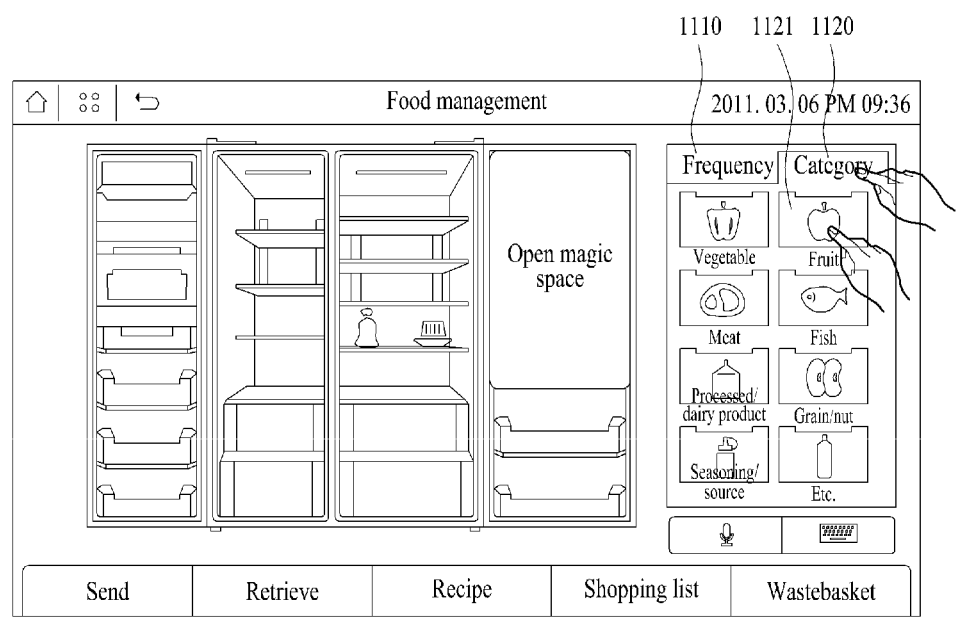
FIGS. 11A and 11B are views illustrating one example of inputting information for food stored in the refrigerator according to category through the display of the refrigerator in accordance with an embodiment of the present disclosure.
Figure 11B:
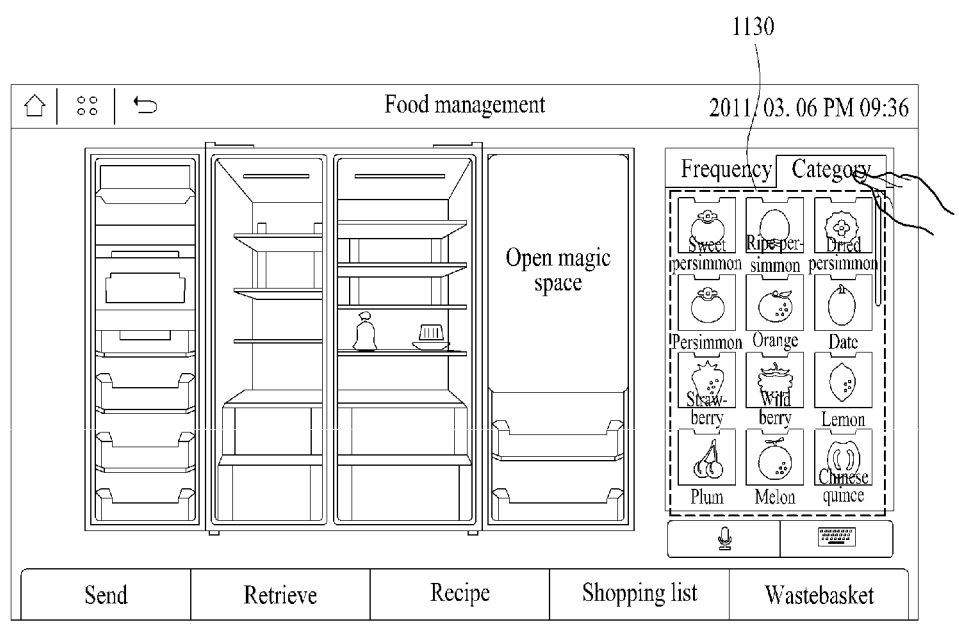

Next, selection of food objects according to category will be described with reference to FIGS. 11A and 11B. FIGS. 11A and 11B are views illustrating one example of inputting of information for stored food according to category through the display of the refrigerator in accordance with an embodiment of the present disclosure.

First, if a category tab 1120 provided at the upper end of the food object selection area is selected, icons corresponding to categories of food objects are displayed under the category tab 1120, as shown in FIG. 11A. Then, if a fruit icon 1121 is selected, icons 1130 corresponding respective fruits are displayed below the tab 1120, as shown in FIG. 11B. If a user desires to input storage information on a specific fruit, one of the fruit icons is activated and is then dragged and dropped to one area of the storage chamber. Detailed information associated with the specific fruit may be confirmed/amended through the detailed information popup window which will be displayed later, in the above-described manner with reference to FIGS. 8A to 8D.

Figure 12A:
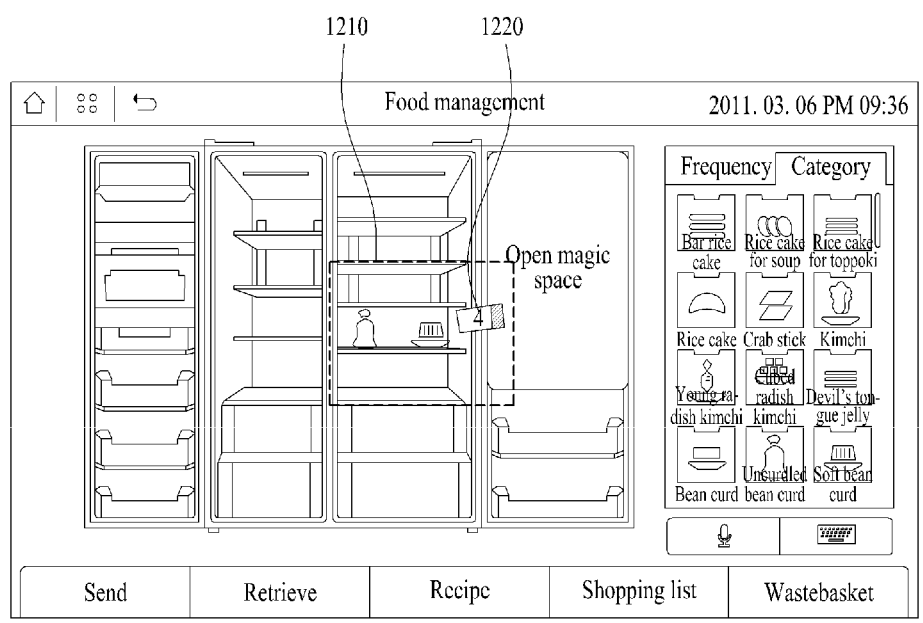
FIGS. 12A and 12B are views illustrating one example of displaying information for food stored in a storage chamber through the display of the refrigerator in accordance with an embodiment of the present disclosure.
Figure 12B:
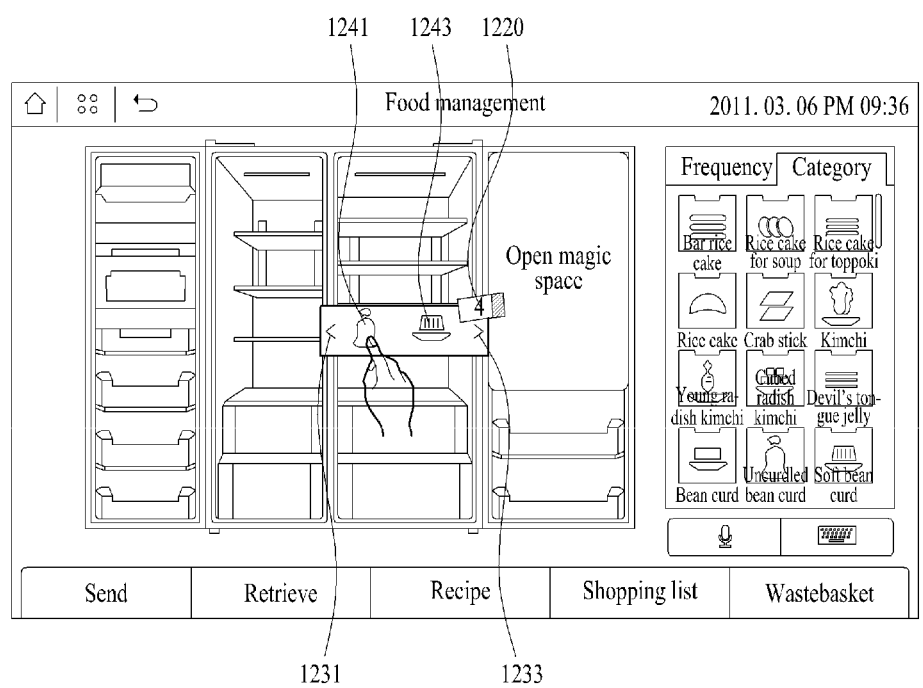

FIGS. 12A and 12B are views illustrating one example viewing information for food stored in a storage chamber through the display of the refrigerator in accordance with an embodiment of the present disclosure. In this example, it is assumed that FIGS. 12A and 12B illustrate a state in which storage information on 4 kinds of food objects in one storage chamber have been previously input. Further, it is assumed that only icons corresponding to 2 kinds of food objects which were most recently stored in each storage chamber are displayed.

With reference to FIG. 12A, an indicator 1220 may be displayed together with the food icons to indicate the number of types of items stored in a specific storage chamber 1210. The indicator 1220 may be configured to be displayed only when the number of types of the food objects in the corresponding storage chamber exceeds a prescribed number (e.g., 2), or the indicator 1220 may be displayed at all times. Further, the numeral displayed on the indicator 1220 may indicate the number of different types of food objects, or the indicator 1220 may indicate the quantity of a particular food object. That is, when the same food object is input twice, if the numeral displayed on the indicator 1220 indicates the number of kinds of food objects, the indicator 1220 displays 1. Alternatively, if the numeral displayed on the indicator 1220 is configured to indicate the quantity, the indicator 1220 displays 2. In this case, each food icon may have a separate indicator 1220 positioned adjacent thereto.

Here, if a user selects the corresponding storage chamber, an area corresponding to the storage chamber may be activated and magnified at a designated rate, as shown in FIG. 12B. Simultaneously, under icons 1241 and 1243 of 2 kinds of food objects, the names of the food objects may be displayed. Scroll buttons 1231 and 1233 may be provided to view other food objects positioned to the left and right of the icons 1241 and 1243.

Figure 13A:
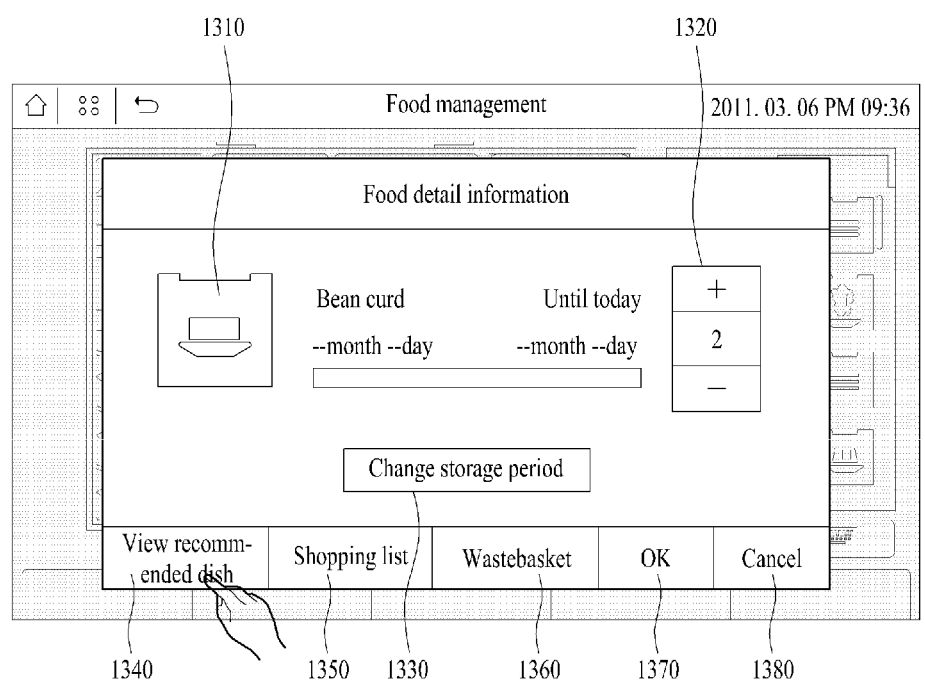
FIGS. 13A and 13B are views illustrating one example of managing detailed information for a food stored in the storage chamber through the display of the refrigerator in accordance with an embodiment of the present disclosure.
Figure 13B:
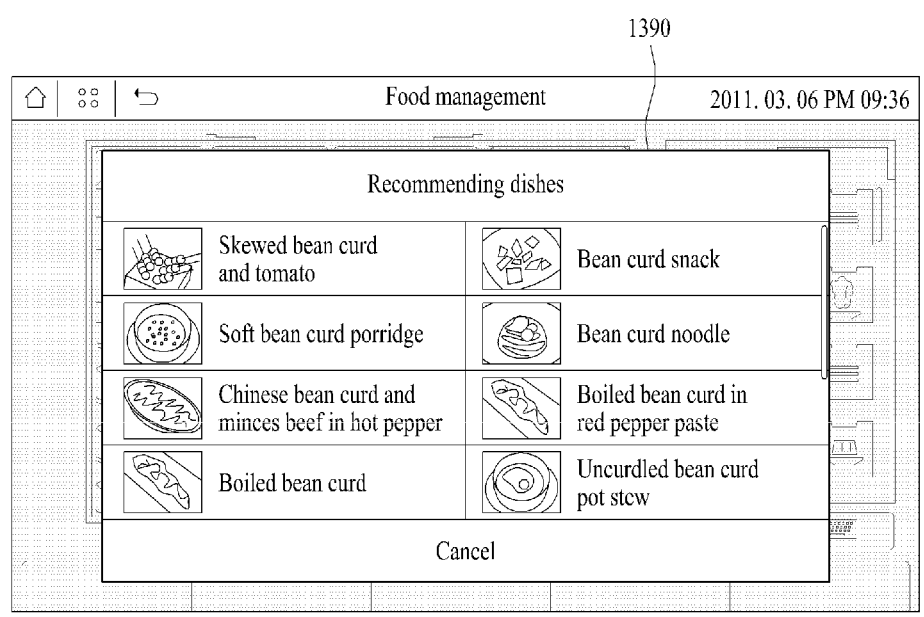

The case in which a bean curd icon 1243 is selected in FIG. 12B will be described with reference to FIGS. 13A and 13B. FIGS. 13A and 13B are views illustrating one example of viewing and editing detailed information for a food object in the storage chamber through the display of the refrigerator in accordance with an embodiment of the present disclosure.

When the bean curd icon 1243 is selected, as shown in FIG. 12B, a popup window to confirm/change detailed information on bean curd may be displayed, as shown in FIG. 13A. Here, the shape and configuration of the popup window may be similar to that of FIG. 8D. That is, an icon 1310 corresponding to the food object, +/− buttons 1320 to adjust the quantity of the food object, and a storage period change button 1330 may be displayed in the popup window 850.

Further, a recommended dish view icon 1340, an icon 1350 to add the corresponding food object to the shopping list, a wastebasket icon 1360 to delete storage information on the corresponding food object, and a confirmation icon 1360 and a cancellation icon 1370 may be displayed. However, the popup window of FIG. 13A differs from the popup window of FIG. 8D in that the popup window of FIG. 13A displays the detailed information for a food object which was previously added and FIG. 8D is provided to add a food object. Moreover, when the recommended dish view icon 1340 is selected, a popup window 1390 including recommended dishes using the corresponding food object as a material may be displayed, as shown in FIG. 13B.

Figure 14A:
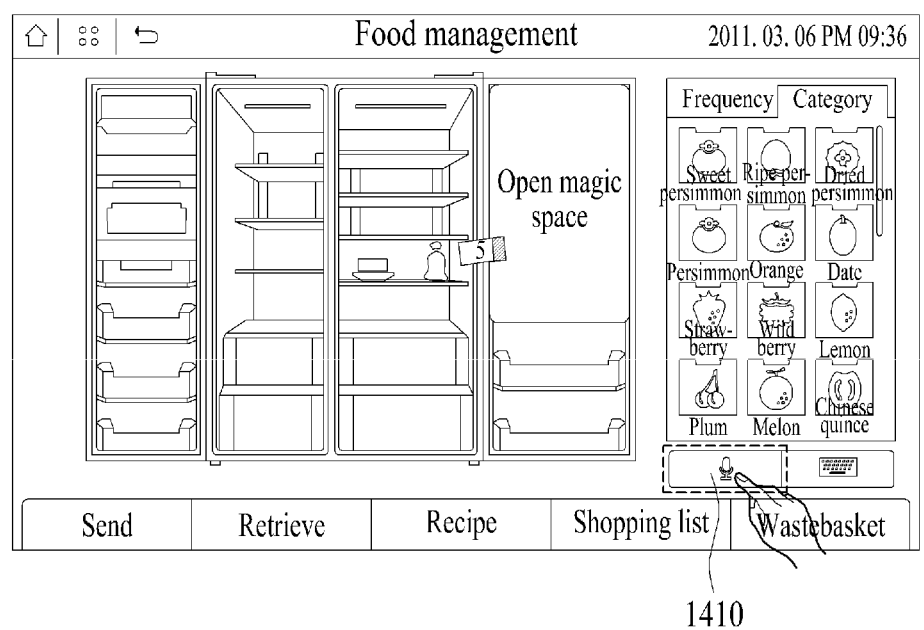
FIGS. 14A to 14D are views illustrating one example of selecting a food object using a voice command in accordance with an embodiment of the present disclosure.
Figure 14B:
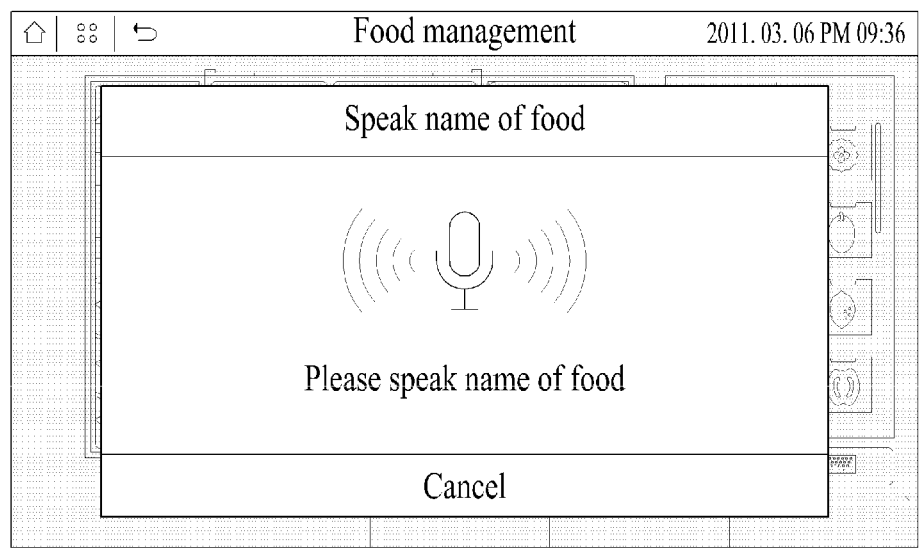
Figure 14C:
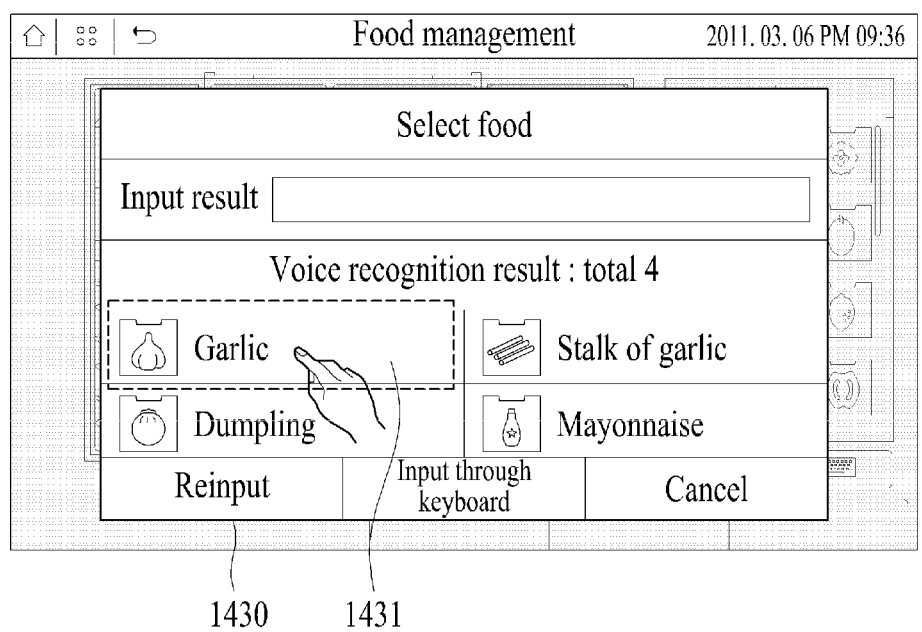

FIGS. 14A to 14D are views illustrating one example of selection of a food object through a voice command in the refrigerator in accordance with the embodiment of the present disclosure. When a microphone icon 1410 at the lower end of the food object selection area is selected, as shown in FIG. 14A, the controller 280 activates the microphone 222, and when preparation to input a voice has been completed, a popup window 1420 to instruct a user to input a voice may be displayed, as shown in FIG. 14B. When the input voice is recognized, a popup window 1420 including an icon of a food object according to a result of recognition may be displayed, as shown in FIG. 14C.

Figure 14D:
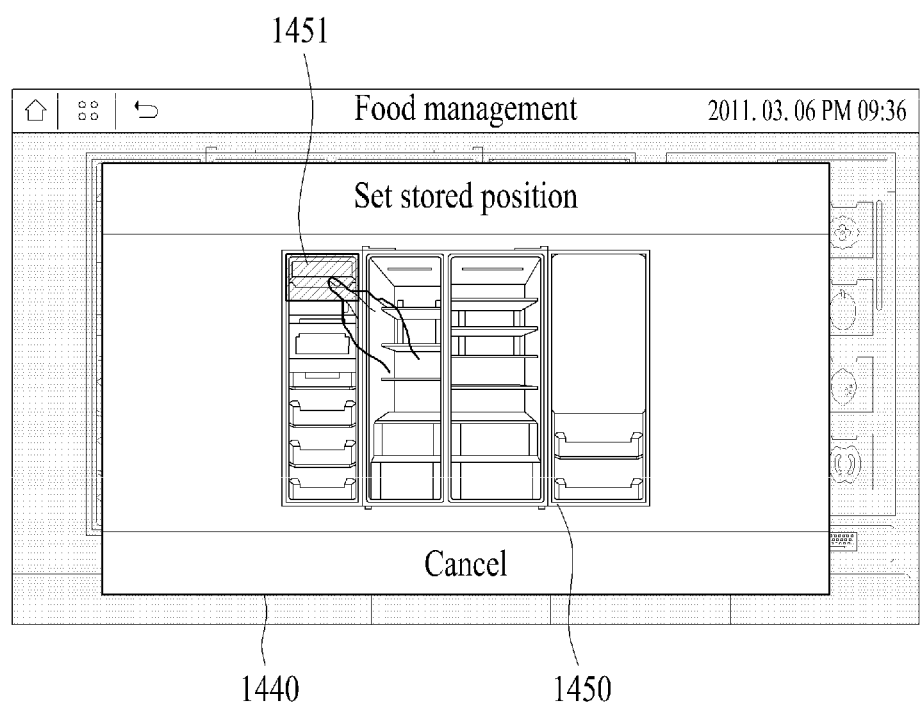

If a food object desired by a user through a voice command is garlic, the user selects an icon 1431 corresponding to garlic, and thus, a window 1440 including an inner space graphic 1450 of the refrigerator may be displayed, as shown in FIG. 14D. When a storage chamber 1451 within the inner space graphic 1450 of the refrigerator is selected, detailed information for the food object may be entered. The subsequent process to enter the detailed information is the same as or similar to the process of the above-described detailed information popup window shown in FIGS. 8A to 8D, and a detailed description thereof will thus be omitted. If recognition of voice input is failed, information notifying recognition failure and requiring the user to re-input a voice may be additionally displayed.

Figure 15A:
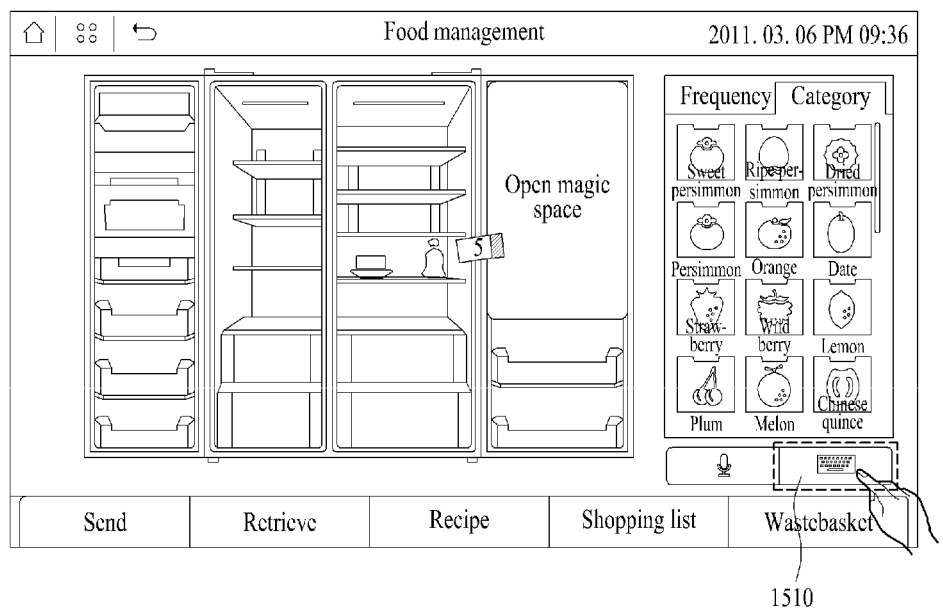
FIGS. 15A and 15B are views illustrating one example of selecting a food object using a virtual keyboard in accordance with an embodiment of the present disclosure.
Figure 15B:
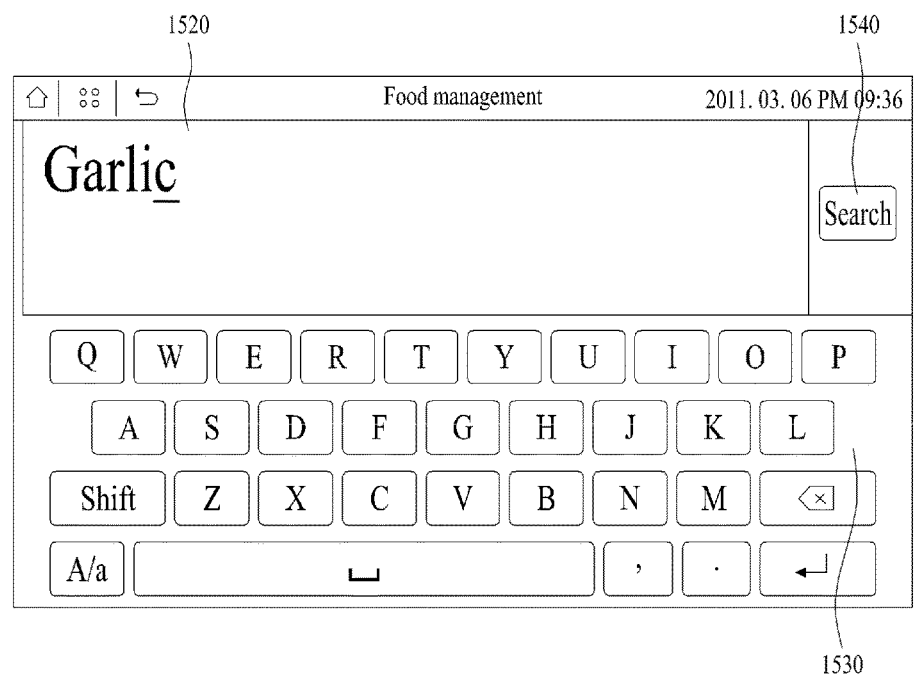

FIGS. 15A and 15B are views illustrating one example of selection of a food object through a virtual keyboard in the refrigerator in accordance with the embodiment of the present disclosure. When a keyboard icon 1410 at the lower end of the food object selection area is selected, as shown in FIG. 15A, a virtual keyboard 1530 may be displayed, as shown in FIG. 15B. Text input through the virtual keyboard 1530 may be displayed in an upper area 1520, and when input of a desired search word has been completed, a user may select a search button 1540.

In one embodiment, the voice command and virtual keyboard functions may be used to find a specific food object which was previously added to the refrigerator. For example, if a large number of food objects have been entered using the food management menu, it may be difficult to locate a particular food object in the refrigerator. In this case, the voice command or virtual keyboard may be used to input the name of the desired food to search the refrigerator for that item.

Next, a process of storing a new food object which is not found in the food library will be described with reference to FIGS. 16A to 16D. FIGS. 16A to 16D are views illustrating one example of registration and storage of a new food object through the virtual keyboard in the refrigerator in accordance with the embodiment of the present disclosure. In FIGS. 16A to 16D, it is assumed that information regarding to an item "potato snack" is not stored in the memory 250 and an icon according to frequency and an icon according to category corresponding thereto are not present.

Figure 16A:
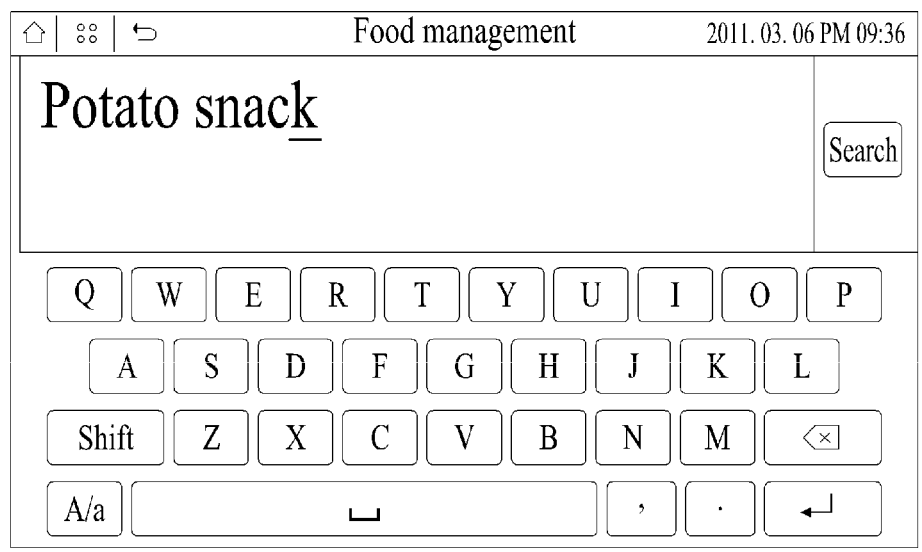
FIGS. 16A to 16D are views illustrating one example of registering and storing a new food object through the virtual keyboard in accordance with an embodiment of the present disclosure.
Figure 16B:
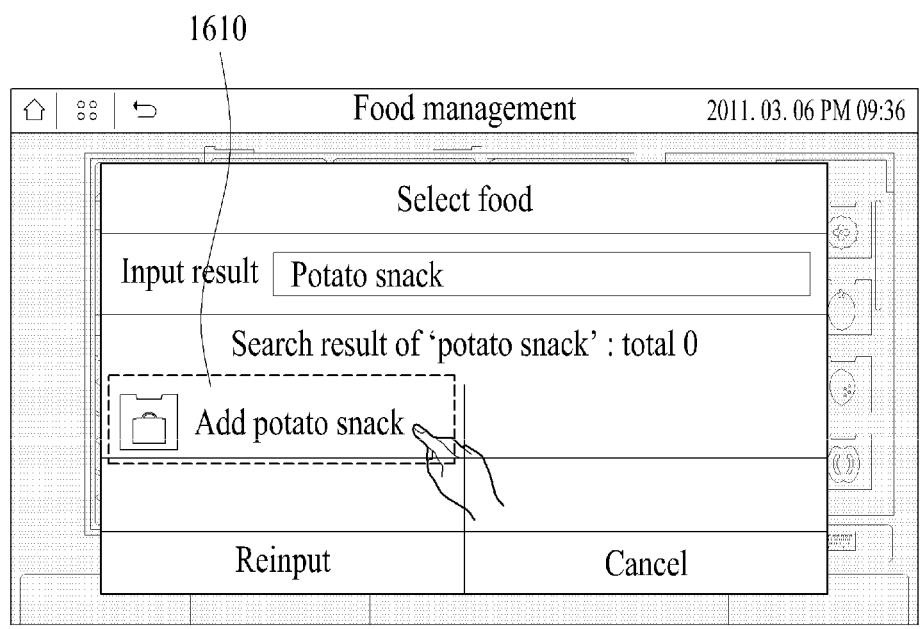
Figure 16C:
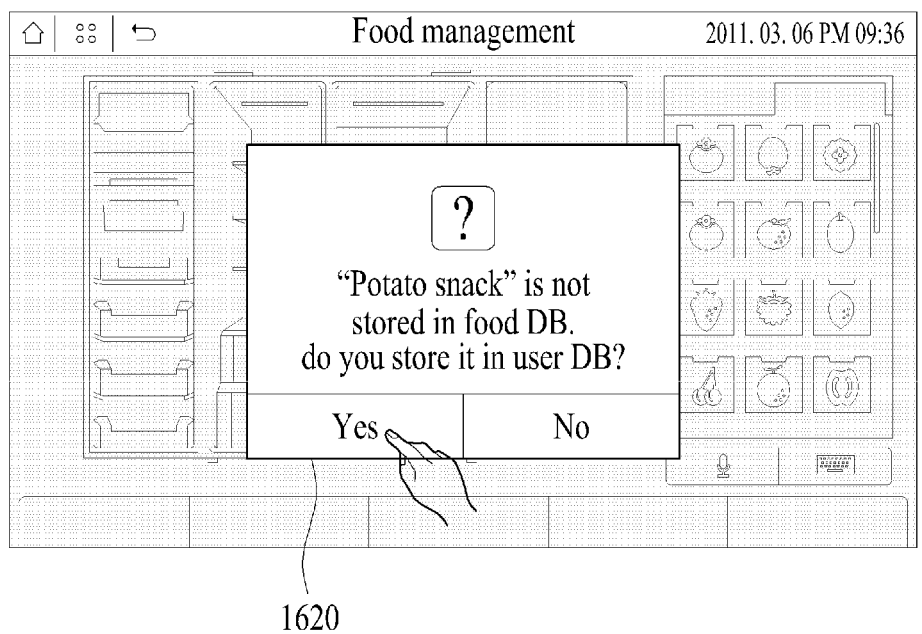
Figure 16D:
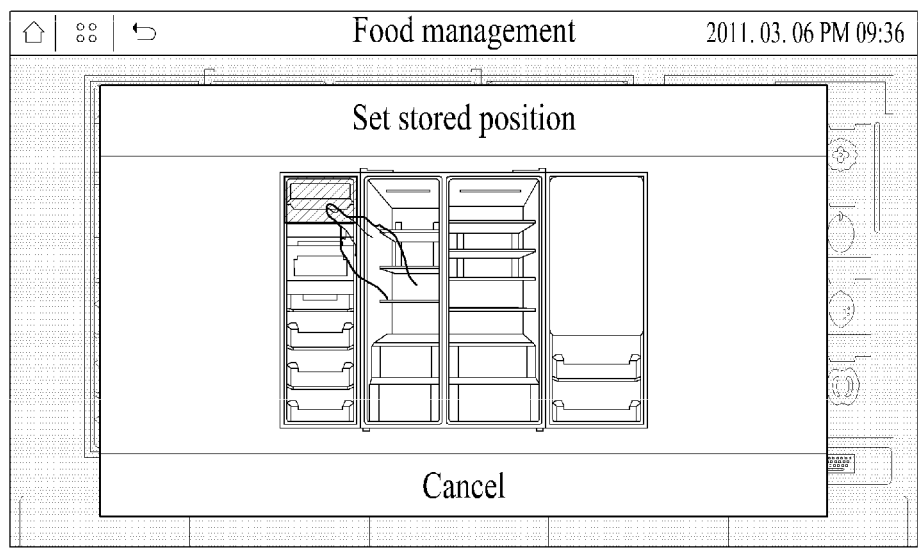

First, a user inputs a word "potato snack" through the virtual keyboard and executes search, as shown in FIG. 16A. However, since information regarding to the item "potato snack" is not stored in the memory 250, a menu 1610 to add a kind of food object called "potato snack" is displayed, as shown in FIG. 16B. When the food object kind addition menu 1610 is selected, a popup window 1620 to confirm whether or not the corresponding food object is added to a user database may be displayed, as shown in FIG. 16C. If "yes" to add the corresponding food object is selected within the popup window 1620, a window including the inner space graphic of the refrigerator may be displayed, as shown in FIG. 16D. A subsequent process including setting of detailed information after a storage position has been selected is the same as the above-described process.

Storage information on the above-described food object may be transmitted to an external device, or information stored in the external device may be called to the refrigerator. Here, the external device may be a mobile terminal, such as a smart phone, or a server. Connection with the external device may be executed through the wireless communication unit 210. For this purpose, a method of inputting a command will be described with reference to FIGS. 17A to 17D.

Figure 17A:
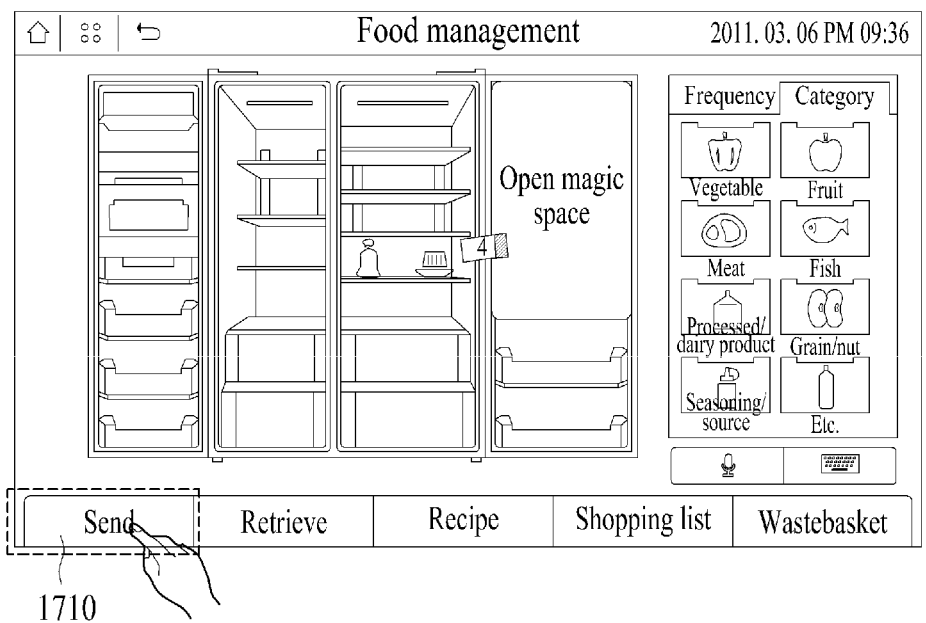
FIGS. 17A to 17D are views illustrating one example of communicating with an external device in accordance with an embodiment of the present disclosure.
Figure 17B:
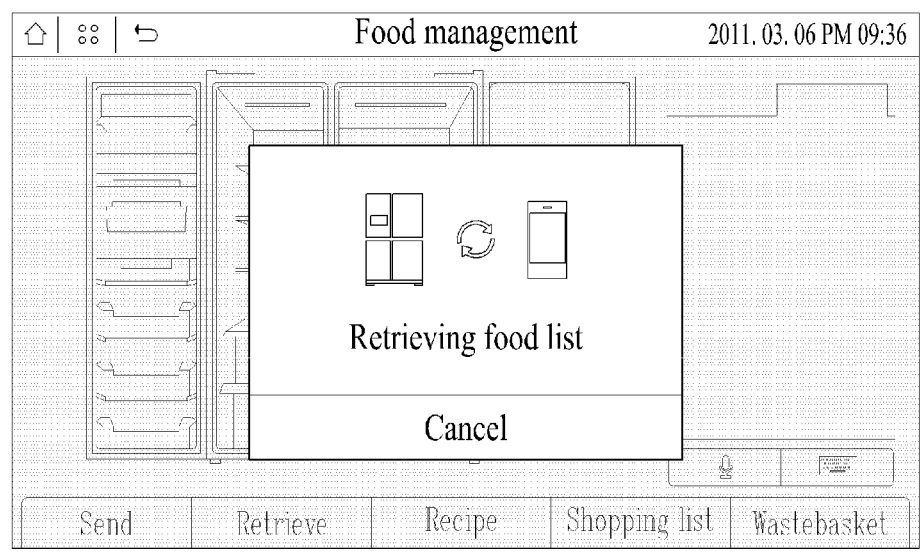
Figure 17C:
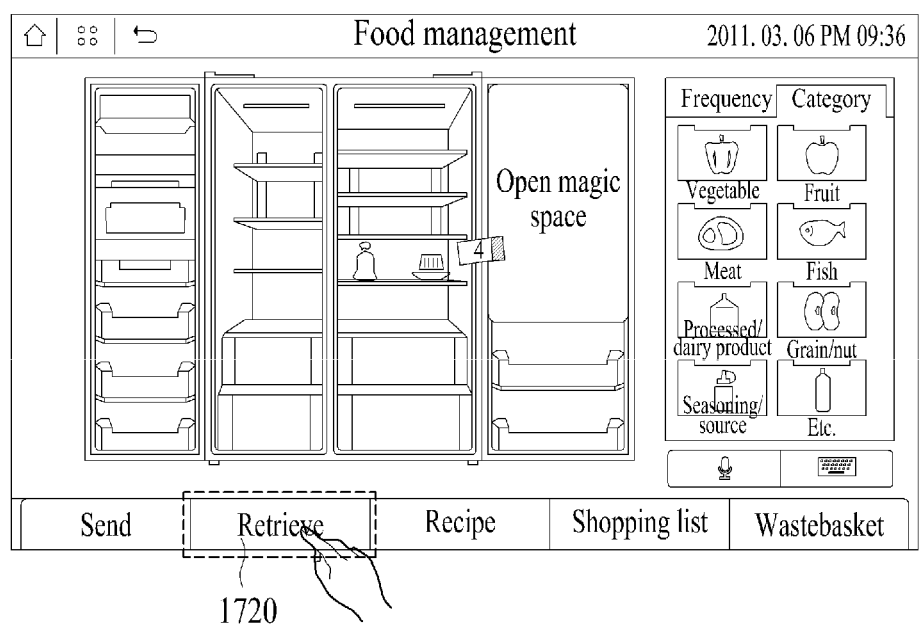
Figure 17D:
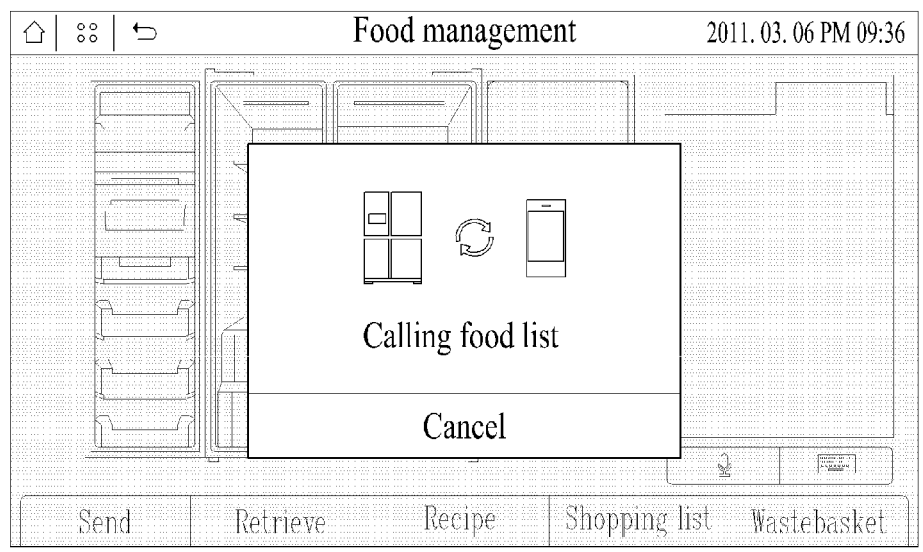

FIGS. 17A to 17D are views illustrating one example of execution of input of a command to communicate with an external device in the display of the refrigerator in accordance with the embodiment of the present disclosure. First, if storage information on a food object currently stored in the memory 250 is desired to be sent to an external server, a user may select a sending button 1710 at the lower end of the food management menu, as shown in FIG. 17A. Thereby, a popup window indicating a sending state may be displayed, as shown in FIG. 17B. On the other hand, if storage information on a food object stored in an external device is desired to be downloaded, the user may select a retrieve button 1720 (calling button) at the lower end of the food management menu, as shown in FIG. 17C. Thereby, a popup window indicating a retrieving state (calling state) may be displayed, as shown in FIG. 17D.

Further, an icon displayed on a storage chamber in the refrigerator inner space graphic may be added to the recipe or the shopping list. FIGS. 18A to 18D are views illustrating one example of addition of a food object displayed on the display to another menu in the refrigerator in accordance with an embodiment of the present disclosure.

Figure 18A:
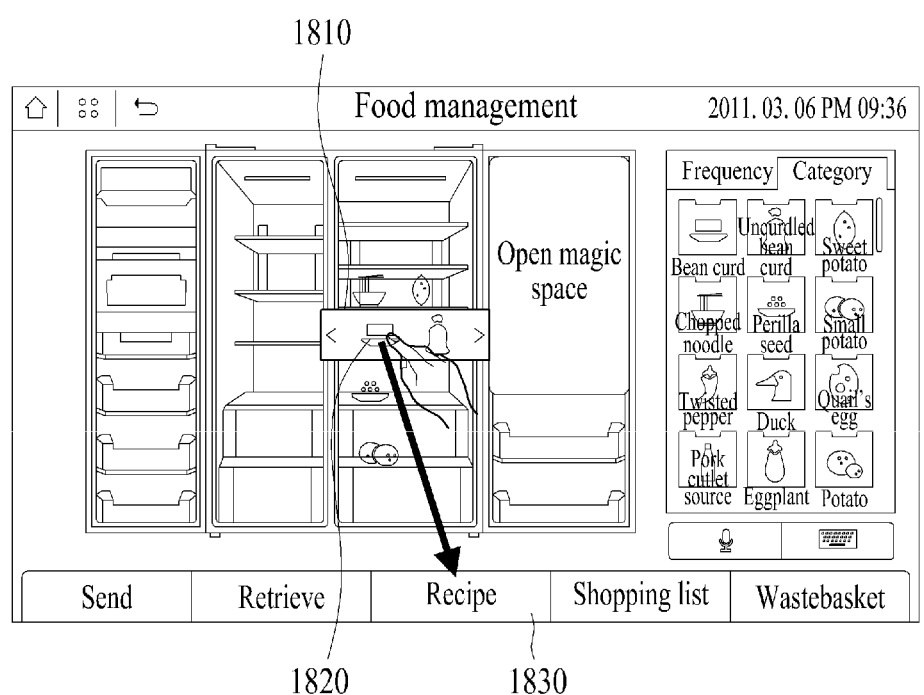
FIGS. 18A to 18D are views illustrating one example of addition of a food object displayed on the display to another menu in the refrigerator in accordance with an embodiment of the present disclosure.
Figure 18B:
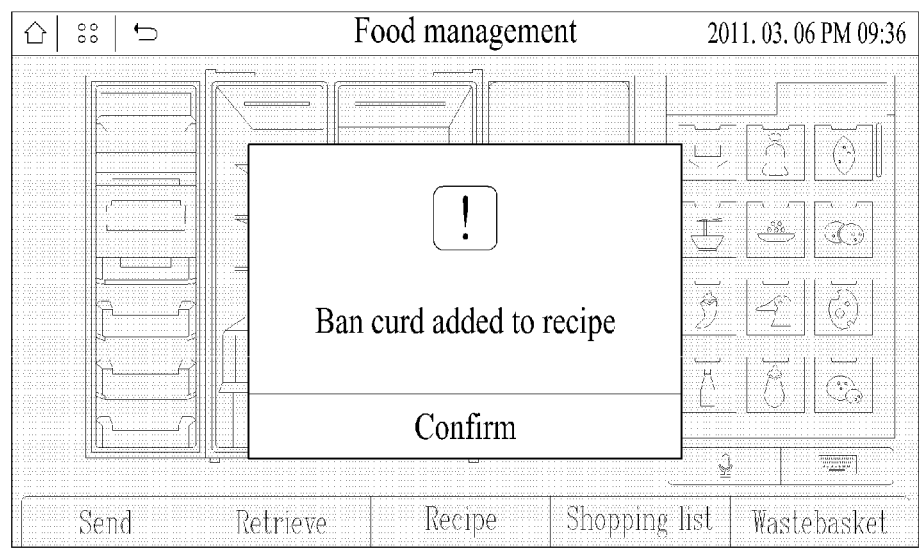

First, a user may select a storage chamber 1810, in which a food object to be added to the recipe is stored, to activate the corresponding storage chamber 1810. Once the storage chamber 1810 has been selected, an icon 1820 of the food object to be added may be dragged to the recipe menu 1830 provided at the lower end of the food management menu, as illustrated in FIG. 18A. A popup window notifying a result of addition may be displayed, as shown in FIG. 18B.

Figure 18C:
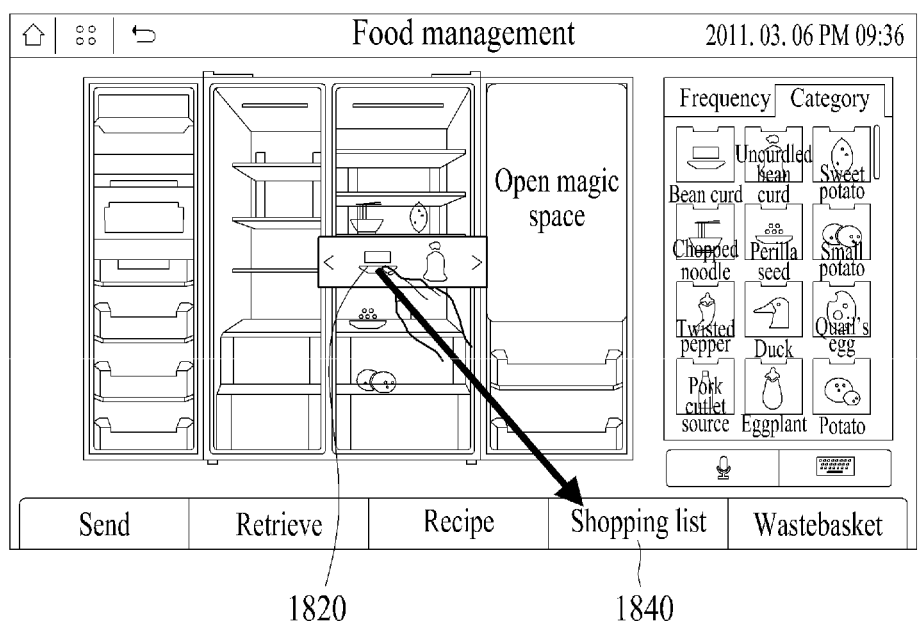
Figure 18D:
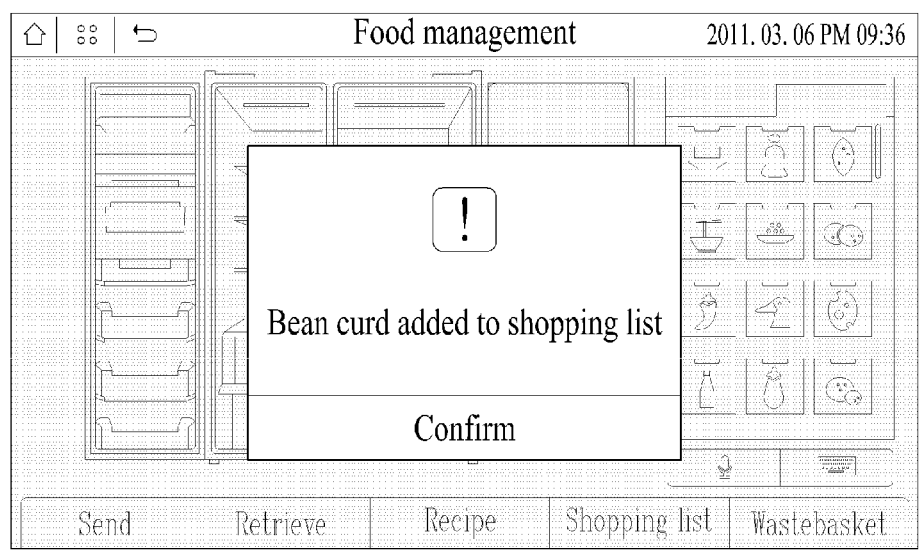

Further, the user may select the storage chamber 1810, in which a food object to be added to the shopping list is stored, to activate the corresponding storage chamber 1810, and drag an icon 1820 of the food object to be added to a shopping list menu 1840 provided at the lower end of the menu, as illustrated in FIG. 18C. A popup window notifying a result of addition of the food object to the shopping list may be displayed, as shown in FIG. 18D.

An icon displayed on a storage chamber on the refrigerator inner space graphic may be deleted. FIGS. 19A to 19D are views illustrating one example of deletion of a food object displayed on the display of the refrigerator in accordance with the embodiment of the present disclosure.

Figure 19A:
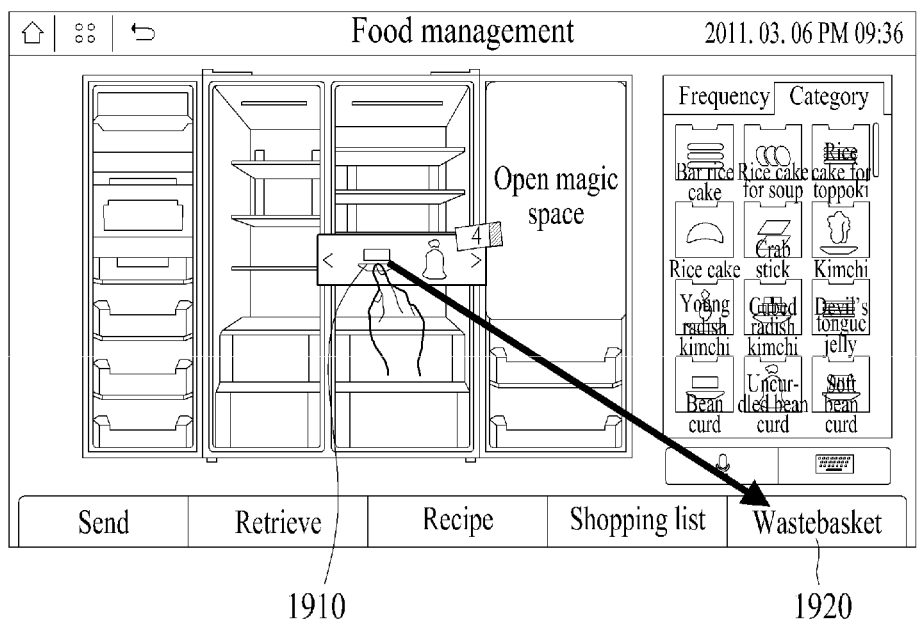
FIGS. 19A to 19D are views illustrating one example of deletion of a food object displayed on the display of the refrigerator in accordance with an embodiment of the present disclosure.
Figure 19B:
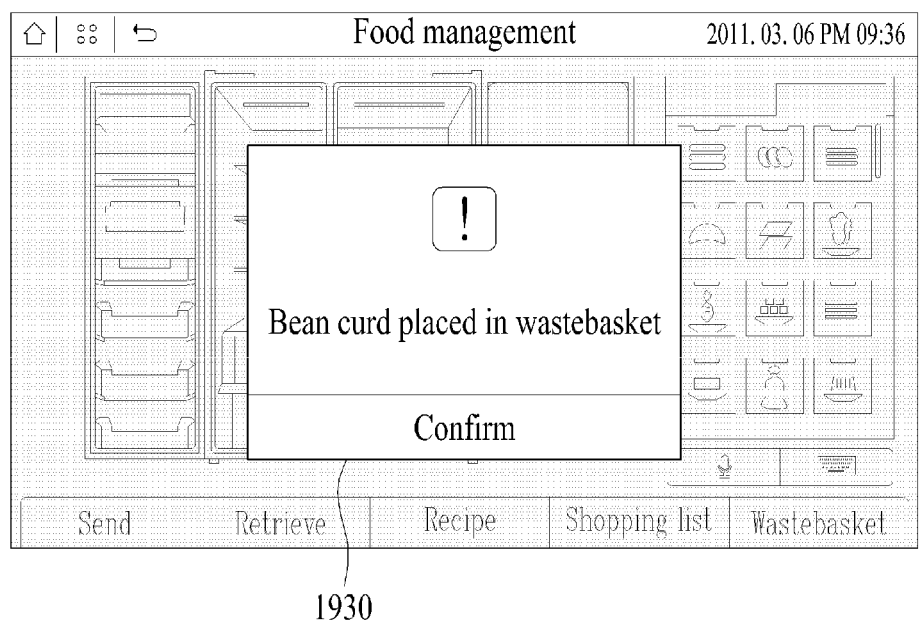

First, a food object may be deleted by activating a storage chamber in which the food object is stored and then dragging an icon 1910 of the food object desired to be deleted to a wastebasket 1920, as illustrated in FIG. 19A. Here, deletion of the food object may not only delete the icon displayed on the storage chamber, but also delete storage information for the food object corresponding to the deleted icon (e.g., quantity and expiration date information). A popup window 1930 notifying that the corresponding food object has been placed in the wastebasket 1920 may be displayed, as shown in FIG. 19B.

Figure 19C:
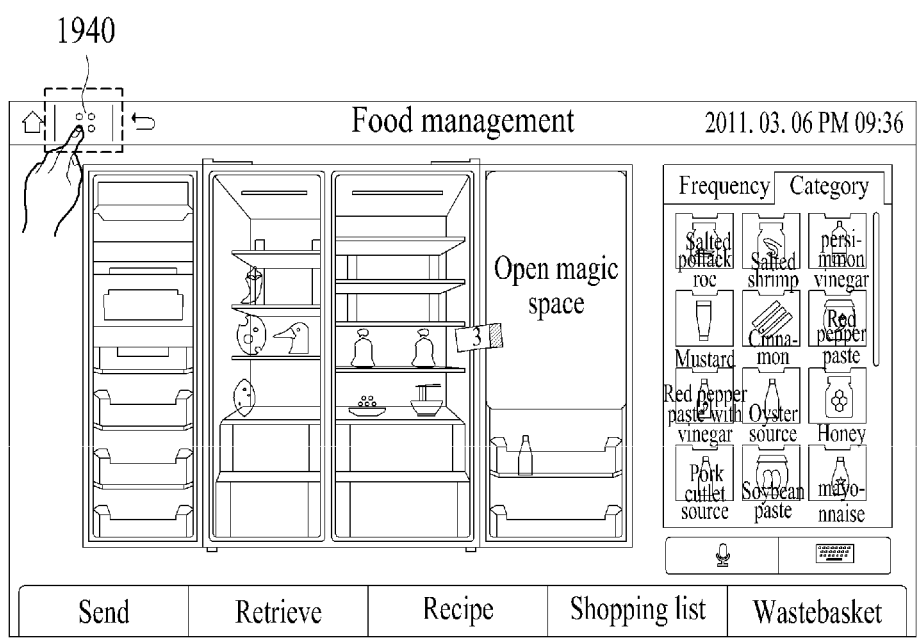
Figure 19D:
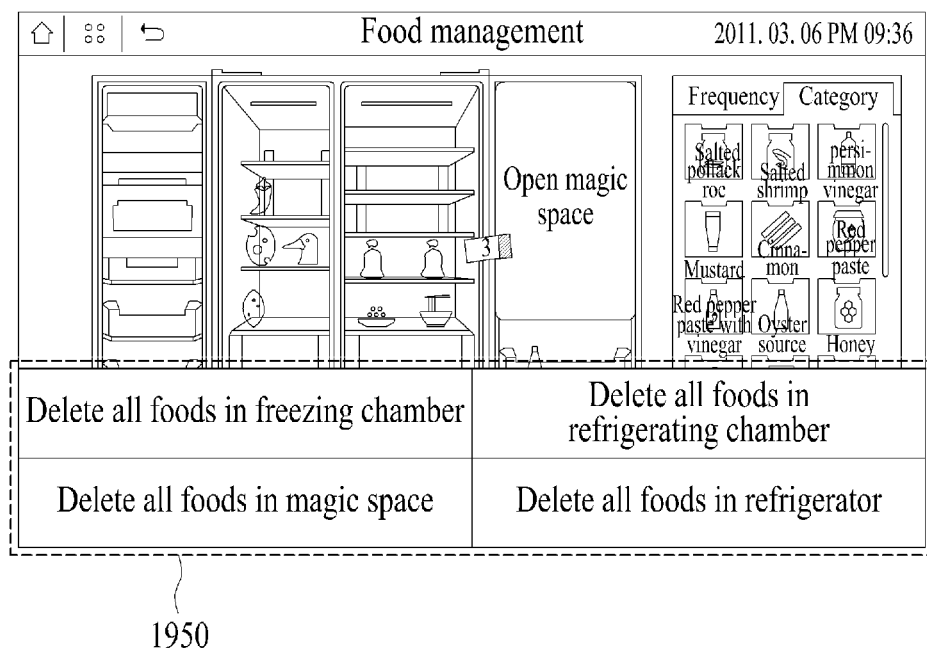

Further, deletion of a designated range is possible. Specifically, when a menu button 1940 provided at the upper end is selected, as illustrated in FIG. 19C, a menu 1950 may be displayed at the lower region which allows a selection of deletion ranges, as shown in FIG. 19D. That is, deletion of a designated range, such as deletion of the entirety of the freezing chamber, deletion of the entirety of the refrigerating chamber, deletion of the entirety of the magic space or deletion of the entirety of the refrigerator may be specified. When the range is specified, information associated with food objects stored in the corresponding range may be deleted at the same time.

In one embodiment, when a food object is deleted from a storage chamber (or moved to a recipe), the food object may be automatically added to the shopping list. For example, when an item is dragged into the wastebasket icon 1920, this may indicate that the particular item has been consumed by the user. Hence, a popup window may be provided to inquire whether the consumed food object should be placed in the shopping list to replenish supply of the consumed food object. In one embodiment, deleted food objects may be placed in the shopping list based on its frequency of use. For example, the refrigerator may track the frequency of use of food objects, and food objects which are accessed frequently may be automatically placed in the shopping list while food objects which are not accessed regularly may not be automatically added to the shopping list. A list of food objects for automatic addition to the shopping list may be stored in the memory with user preference settings.

In one embodiment, the food management menu may be used in conjunction other types of systems for tracking contents of a refrigerator. For example, the food management menu may be used together with a RFID system to track and manage the contents in the refrigerator. For example, as food is placed in a particular region of the refrigerator, the RFID system may sense the type and quantity of the newly placed food. Then, a corresponding icon associated with the newly placed food may be displayed in the image 720 of the refrigerator. Additional information may be entered, such as expiration dates, using the display 200 as previously described. Alternatively, expiration date information may be set using default values based on the detected food identification. Moreover, RFID may be used to sense when food is removed from the refrigerator, and the display may be updated accordingly.

Recipe Menu

Figure 20:
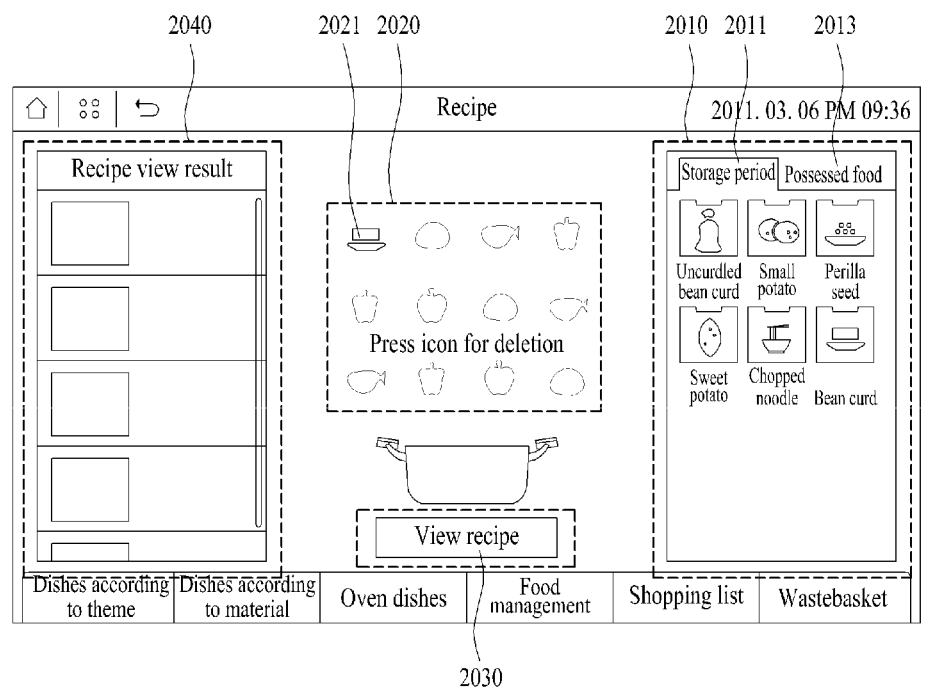
FIG. 20 is a view illustrating one example of a recipe menu displayed on the display of the refrigerator in accordance with an embodiment of the present disclosure.

FIG. 20 is a view illustrating one example of a recipe menu displayed on the display of the refrigerator in accordance with an embodiment of the present disclosure. The recipe menu provides an interface for searching for a particular recipe or to retrieve a list of recommended recipes based on various criteria. The recipes may be searched based on a particular food objects stored in the storage chambers of the refrigerator, information associated with a particular food object (e.g., expiration date or quantity of an item), or based on a category of types of dishes. The recipe menu may be displayed by selecting the recipe icon 642 at the lower portion 640 of the home screen of FIG. 6.

When the recipe menu is activated, a food object selection area 2010 may be displayed in a region on the right side of the recipe menu. The food object selection area 2010 may include a storage period tab 2011 and a possessed food tab 2013 (also available food tab) to sort the food object icons. The storage period tab 2011 sorts the food icons based on the expiration dates of the food objects. The possessed food tab 2013 displays available food objects in alphabetical order or based on categories. In one embodiment, the food object selection area 2010 may be an image 720 of the refrigerator as shown in FIG. 7B.

A material area 2020 (ingredient area), in which a food object selected as an ingredient for a dish is arranged, may be displayed at the upper end of the center region of the menu. When a user presses a recipe view button 2030 provided at the lower end, a list of recipes that include the ingredients in the material area 2020 (e.g., bean curd 2021) may be displayed in the recipe result area 2040.

The icon 2021 of the food object located in the material area 2002 may be added from the food management menu, as illustrated in FIG. 18A, or selected from the food object selection area 2010. A method of adding a food object icon from the food object selection area 2010 to the material area 2020 will be described with reference to FIGS. 21A to 21D.

Figure 21A:
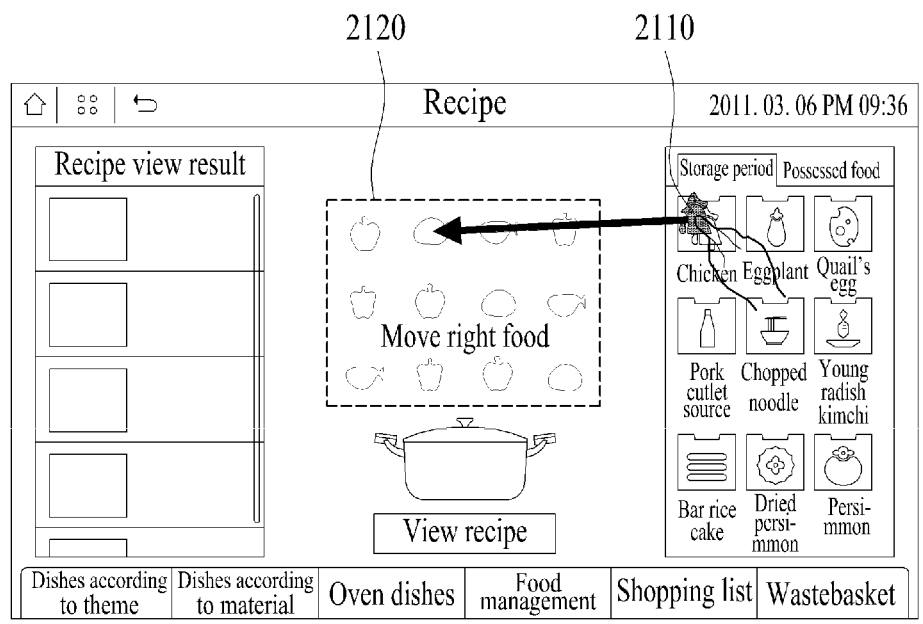
FIGS. 21A to 21D are views illustrating a method of adding a food object as an ingredient in a recipe in the recipe menu displayed on the display of the refrigerator in accordance with an embodiment of the present disclosure.
Figure 21B:
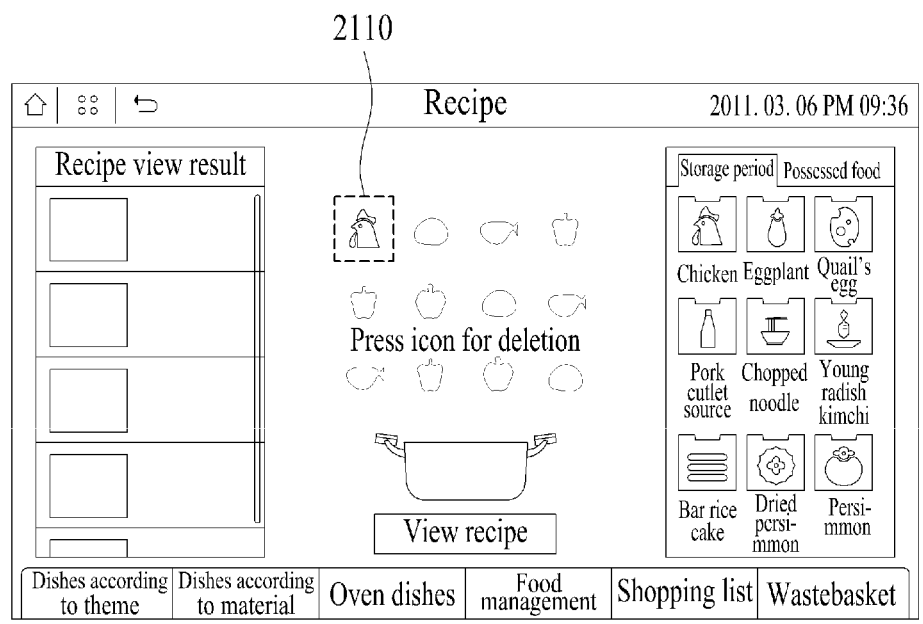

FIGS. 21A to 21D are views illustrating a method of adding a food object icon as an ingredient in the recipe menu displayed on the display of the refrigerator in accordance with an embodiment of the present disclosure. For example, with reference to FIG. 21A, when a user maintains touch with a chicken icon 2110 for a designated time (for example, 1 second) under the condition that the storage period tab is selected, the corresponding icon 2110 is activated to a movable state. Then, when the user drags and drops the corresponding icon 2110 to the material area 2120, the chicken icon 2110 may be arranged in the material area 2120, as shown in FIG. 21B.

Figure 21C:
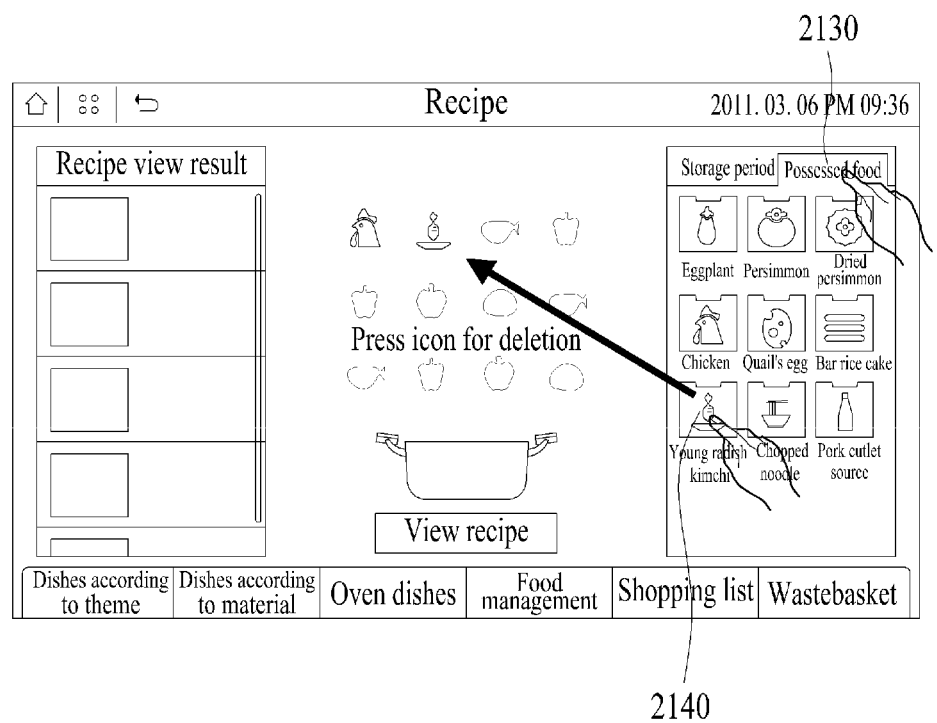
Figure 21D:
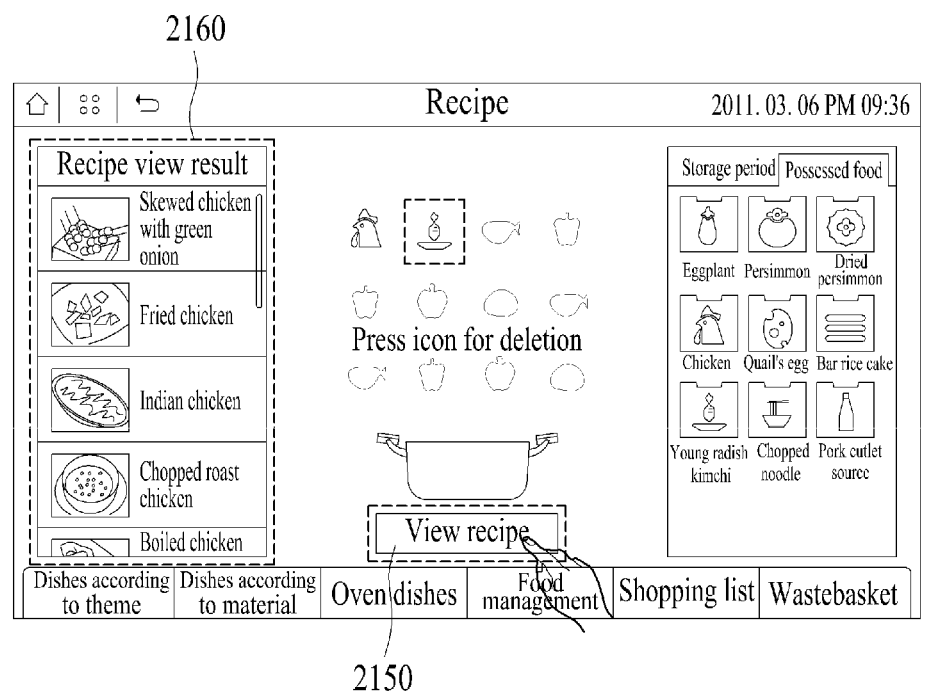

Further, a food object may be added irrespective of the expiration date of the food object by selecting the possessed food tab 2130. The user may activate an icon 2140 corresponding to young radish kimchi from among displayed icons, for example, and drag the icon 2140 to the material area, as illustrated in FIG. 21C. Thereafter, when a recipe view button 2150 is selected, as illustrated in FIG. 21D, recipes that include chicken and young radish kimchi as ingredients may be displayed in the recipe result area 2160 provided at the left region of the recipe menu.

Figure 22A:
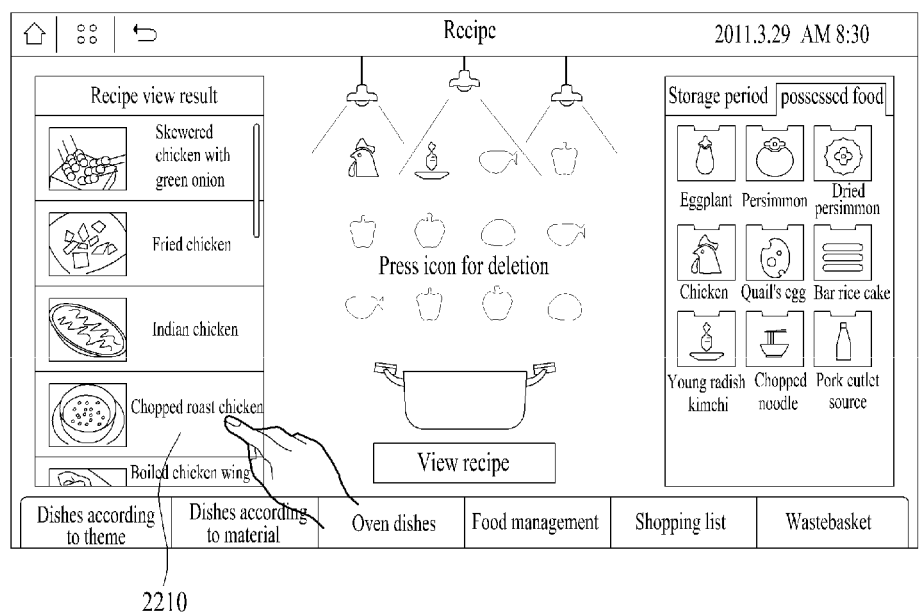
FIGS. 22A and 22B are views illustrating display of detailed information on a recipe displayed on the display of the refrigerator in accordance with an embodiment of the present disclosure.
Figure 22B:
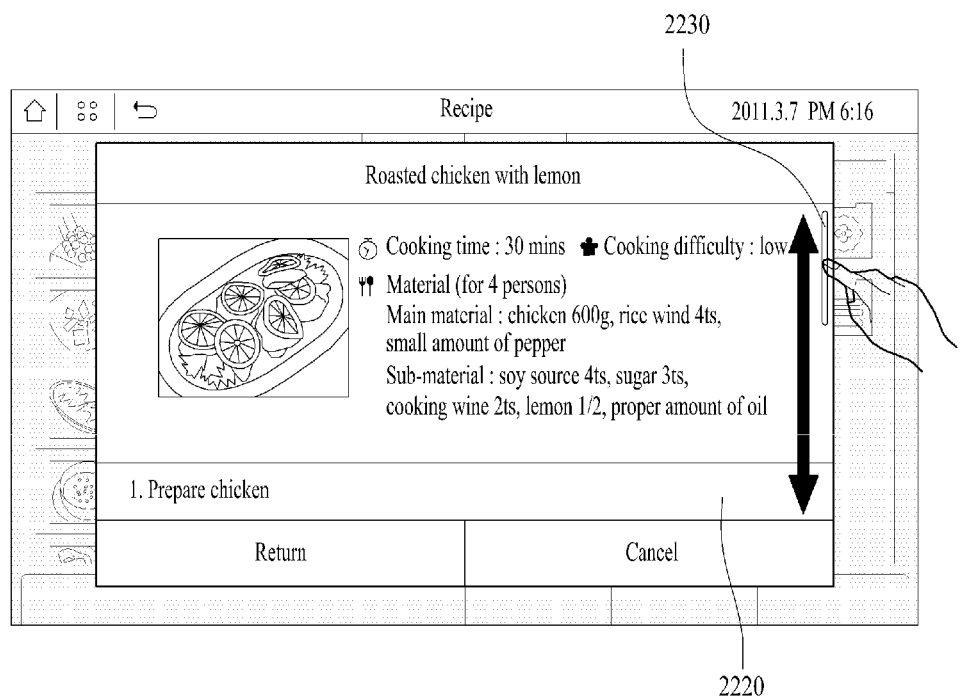

Next, display of recipe detailed information according to selection of a displayed recipe will be described with reference to FIGS. 22A and 22B. When one recipe 2210 is selected from a recipe result area, as illustrated in FIG. 22A, a popup window 2220 including detailed information for the selected recipe may be displayed, as shown in FIG. 22B. A scroll bar 2230 may be provided to allow scrolling through the menu when the detailed information for the recipe is not entirely displayed on the popup window 2220. The scroll bar may be controlled using a touch and drag input to scroll vertically through the recipe. The scroll bar 2230 may also indicate the relative position of the currently displayed portion of the recipe with respect to the entire content of the recipe. Further, ingredients which are required by the selected recipe but are not present in the food object information may be automatically added to the shopping list.

An icon displayed on the food object selection area may be moved to another menu, or be deleted. 23A and 23B are views illustrating one example of a method of moving or deleting a food object icon displayed on the display of the refrigerator in accordance with an embodiment of the present disclosure.

Figure 23A:
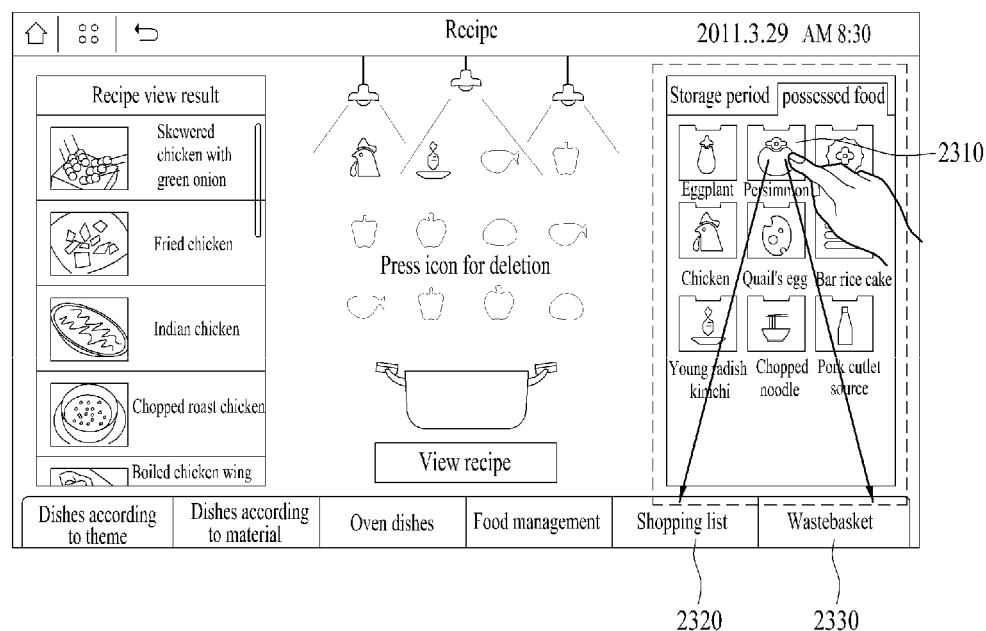
FIGS. 23A and 23B are views illustrating one example of a method of moving or deleting a food object icon displayed on the display of the refrigerator in accordance with an embodiment of the present disclosure.

A user may activate an icon 2310 displayed in the food object selection area displayed at the right side of the recipe menu, and then drag the icon 2310 to a shopping list button 2320 or a wastebasket 2330, as illustrated in FIG. 23A. If the icon 2310 is dragged to the shopping list button 2320, a food object corresponding to the corresponding icon 2310 may be added to the shopping list which will be described later, and if the icon 2310 is dragged to the wastebasket 2330, information on the corresponding food object may be deleted.

Figure 23B:
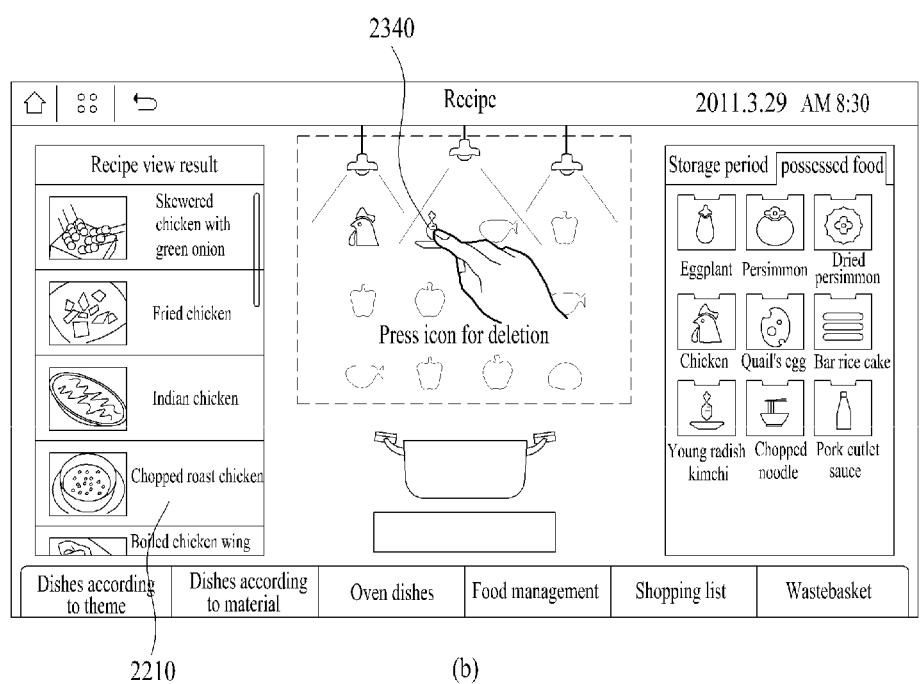

Further, in the case of an icon 2340 displayed in the material area, as shown in FIG. 23B, the icon 2340 may be deleted from the material area by applying touch to the corresponding icon 2340. In this case, the corresponding icon 2340 is deleted from the material area, but information on a food object corresponding to the icon 2340 may be maintained.

Further, a user may search recipes regardless of icons added to the material area. FIGS. 24A to 24D are views illustrating one example of a method of searching for recipes in the display of the refrigerator in accordance with an embodiment of the present disclosure.

Figure 24A:
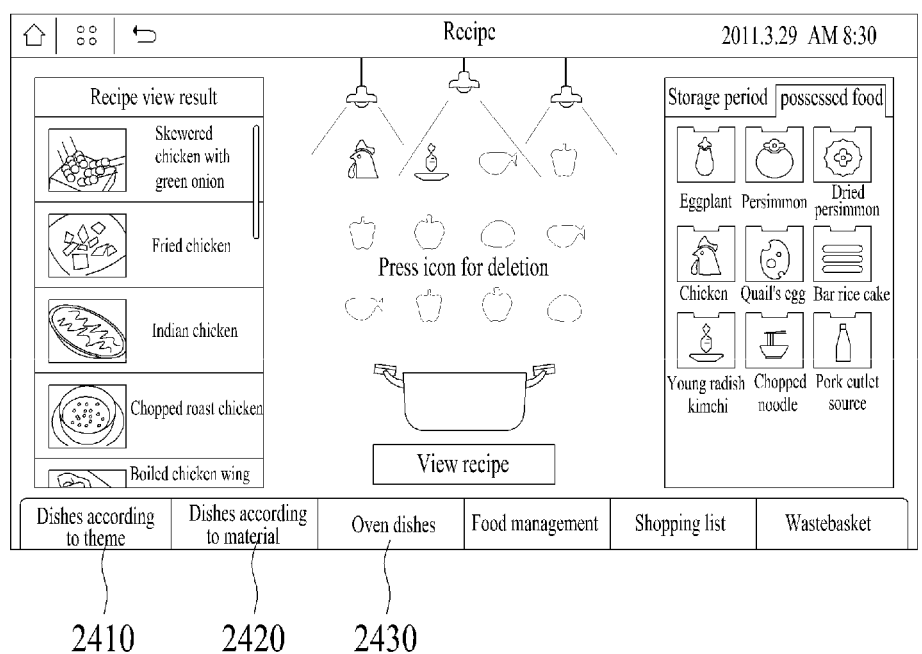
FIGS. 24A to 24D are views illustrating one example of a method of searching for recipes in the display of the refrigerator in accordance with an embodiment of the present disclosure.
Figure 24B:
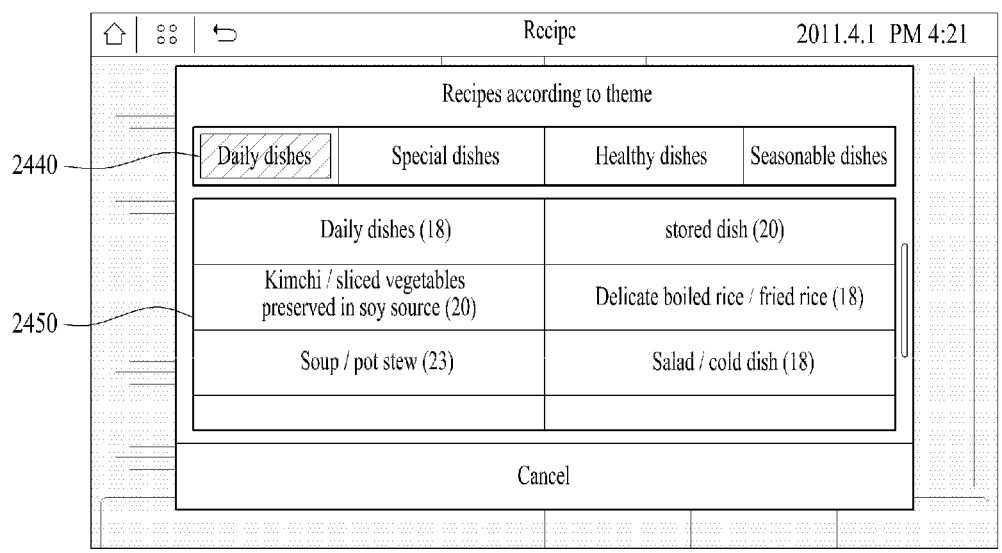

As shown in FIG. 24A, a dish icon 2410 according to a theme, a dish icon 2420 according to material and an oven dish icon 2430 are arranged at the lower end of the recipe menu. When the dish icon 2410 according to theme is selected, a popup window in which a theme selection area 2440 is arranged at the upper end and a sub-theme list 2450 belonging to a selected theme is arranged under the theme selection area 2440 may be displayed, as shown in FIG. 24B.

Figure 24C:
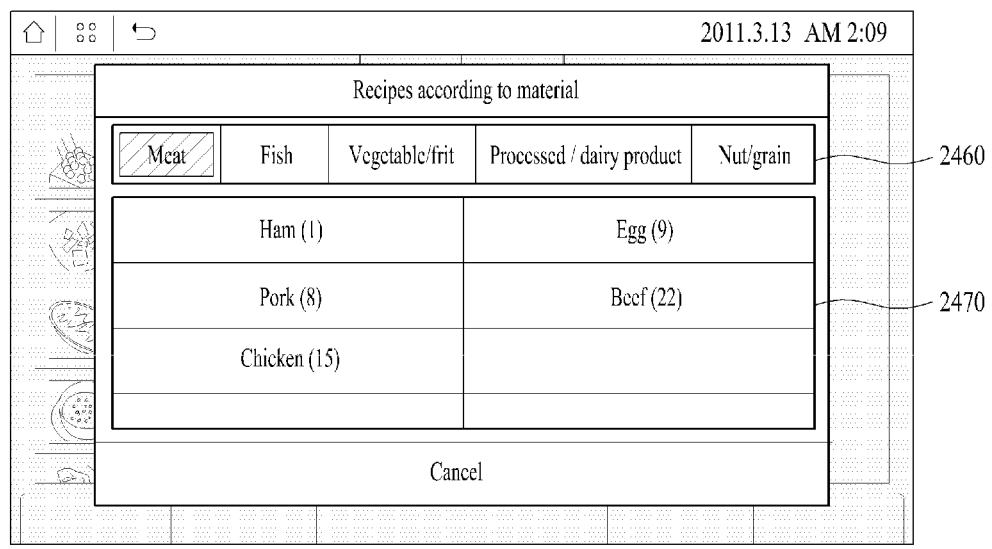
Figure 24D:
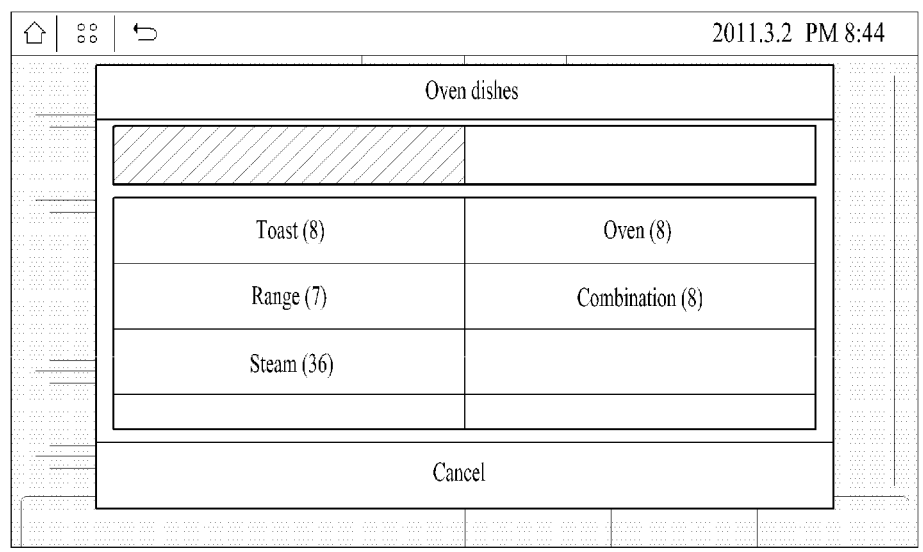

Further, when the dish icon 2420 according to material is selected, a popup window in which a material selection area 2460 is arranged at the upper end and a sub-concept list 2470 of a selected material is arranged under the material selection area 2460 may be displayed, as shown in FIG. 24C. For example, when category meat is selected, the sub-concept list 2470 may display additional meat options. When the oven dish icon 2430 is selected, a popup window in which a cooking mode selection area is arranged at the upper end and a sub-cooking mode list of a selected mode is arranged under the cooking mode selection area may be displayed, as shown in FIG. 24D.

Figure 25A:
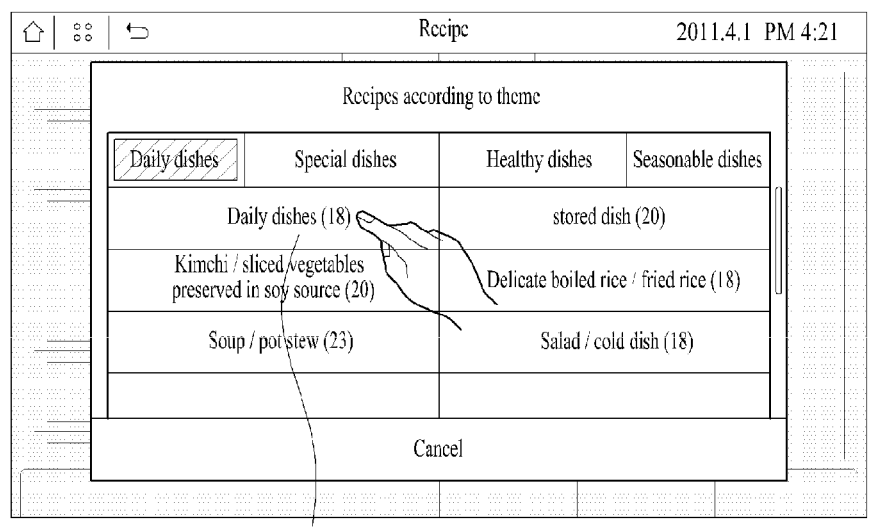
FIGS. 25A to 25C are views illustrating one example of a method of confirming detailed information on a searched recipe in the display of the refrigerator in accordance with an embodiment of the present disclosure.
Figure 25B:
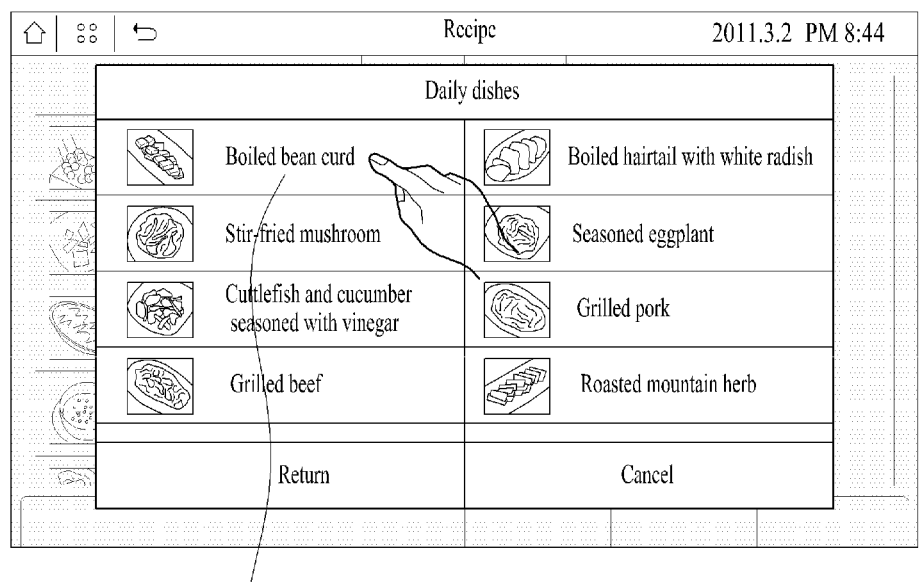
Figure 25C:
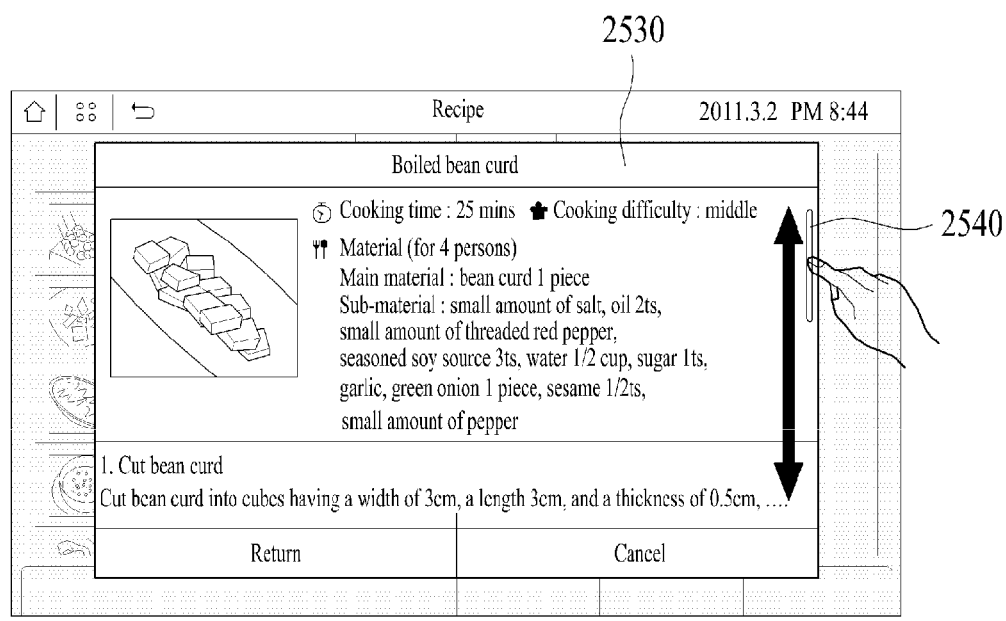

FIGS. 25A to 25C are views illustrating one example of a method of confirming detailed information on a searched recipe in the display of the refrigerator in accordance with an embodiment of the present disclosure. It is assumed for this example that FIG. 25A illustrates a subsequent process of FIG. 24B. When a recipe according to theme is selected, the popup window is displayed in which the theme selection area is arranged at the upper end. The sub-theme list belonging to a selected theme is arranged under the theme selection area. In this case, when a user select a daily dish 2510 from the sub-theme list, a list of recipes belonging to the daily dish 2519 may be displayed, as shown in FIG. 25B.

In this case, when the user selects boiled bean curd 2520, a popup window 2530 including the recipe for boiled bean curd may be displayed, as shown in FIG. 25C. If the detailed information on the recipe is not entirely displayed in the popup window 2530, a scroll bar 2540 which is scrollable in the vertical direction through touch and drag input may be additionally displayed. The scroll bar 2540 may indicate the relative position of the displayed portion of the recipe within the entire recipe.

The theme or material categories may include specialized categories such as for diet foods, heart healthy foods, low sodium foods, etc. The categories may be customized by the user using category list available on the server or stored locally. The categories may be configured to appear in the top level (e.g., with daily dishes) or as a sub-category (e.g., a sub-category within the healthy dishes category). The categories may also include a favorite category recipes which are designated as a favorite recipe, or those which are most frequently accessed or used.

Figure 26A:
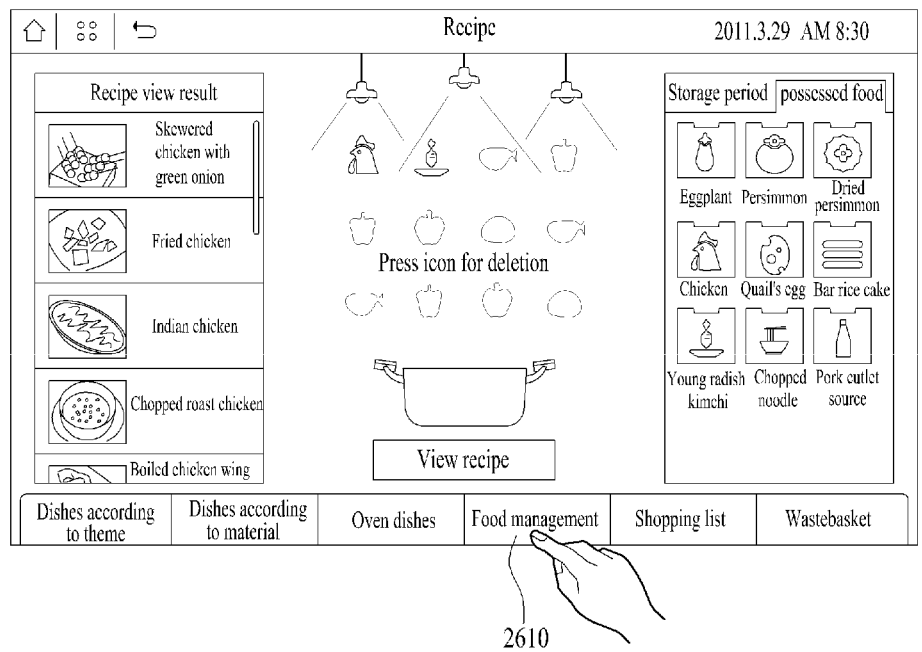
FIGS. 26A and 26B are views illustrating one example of a method of calling a food management menu when a recipe menu is displayed on the display of the refrigerator in accordance with an embodiment of the present disclosure.
Figure 26B:
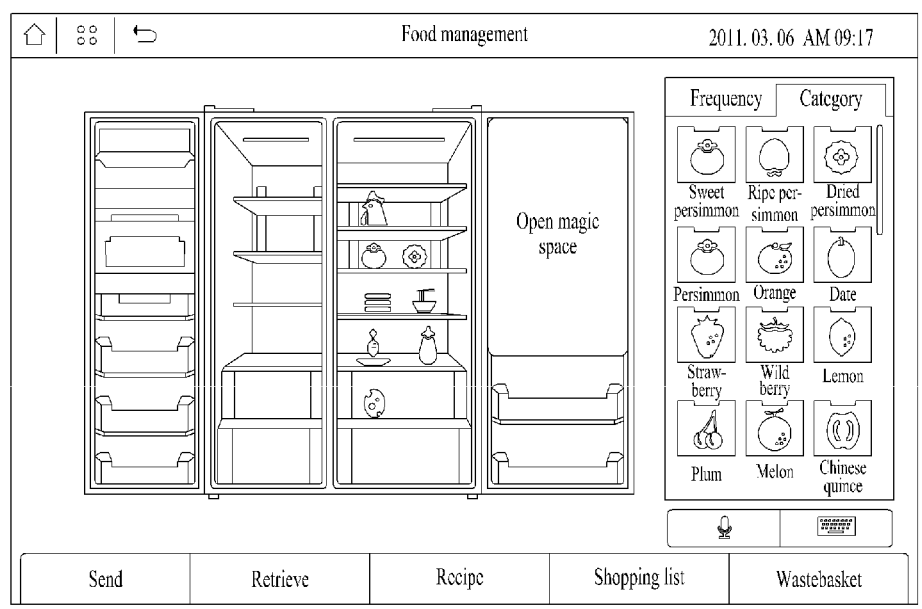

Next, movement from the recipe menu to the food management menu will be described with reference to FIGS. 26A and 26B. FIGS. 26A and 26B are views illustrating one example of a method of calling the food management menu when the recipe menu is displayed on the display of the refrigerator in accordance with an embodiment of the present disclosure. When a food management button 2610 provided at the lower end of the recipe menu is selected, as shown in FIG. 26A, the food management menu may be displayed, as shown in FIG. 26B.

Shopping List

Figure 27A:
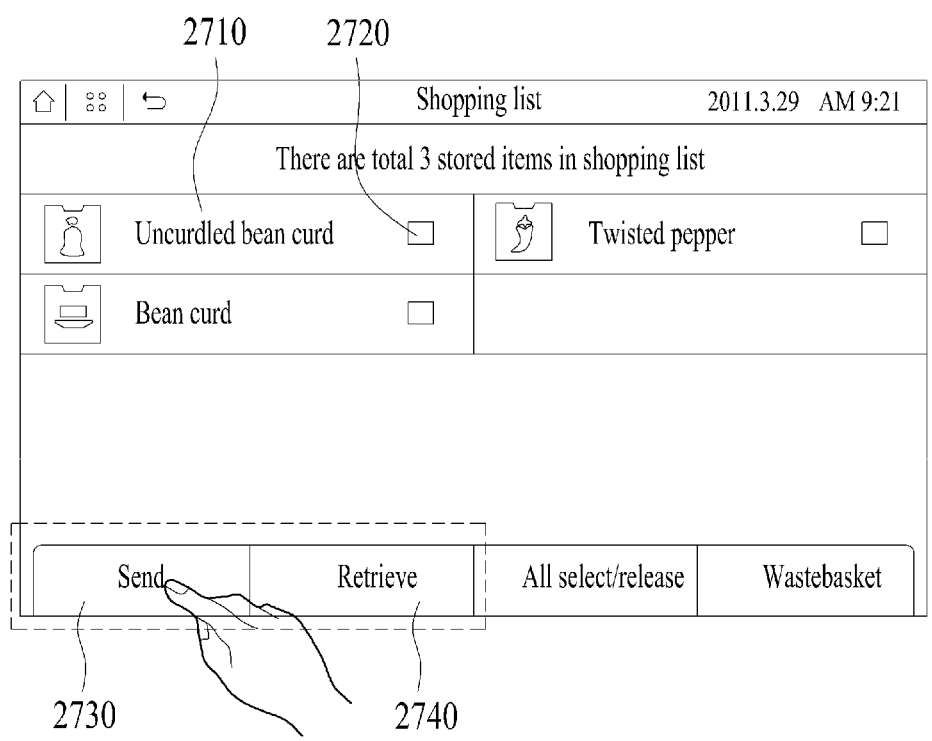
FIGS. 27A to 27C are views illustrating one example of a shopping list menu displayed on the display of the refrigerator in accordance with an embodiment of the present disclosure.
Figure 27B:
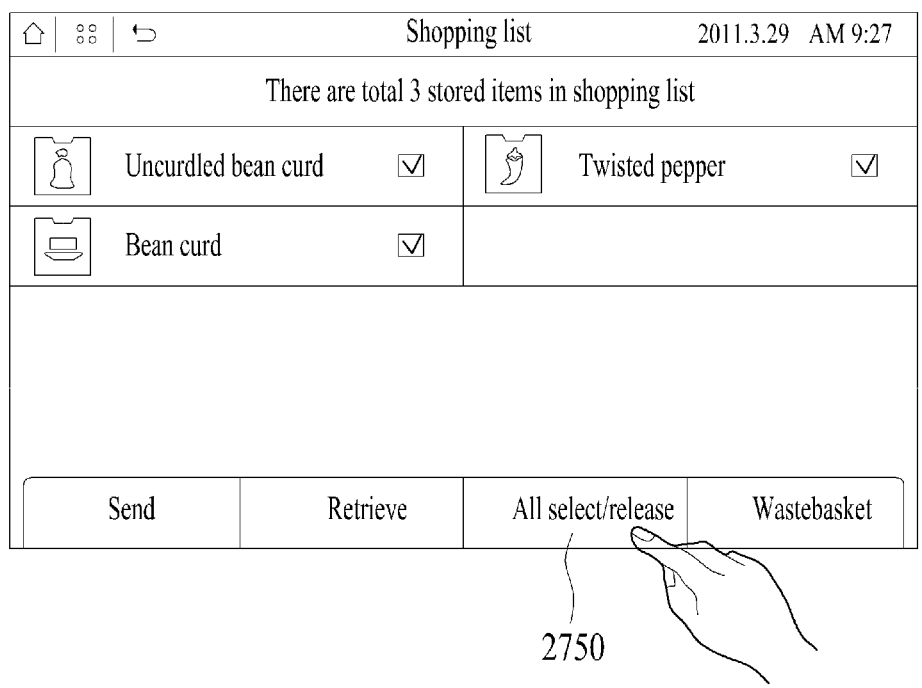
Figure 27C:
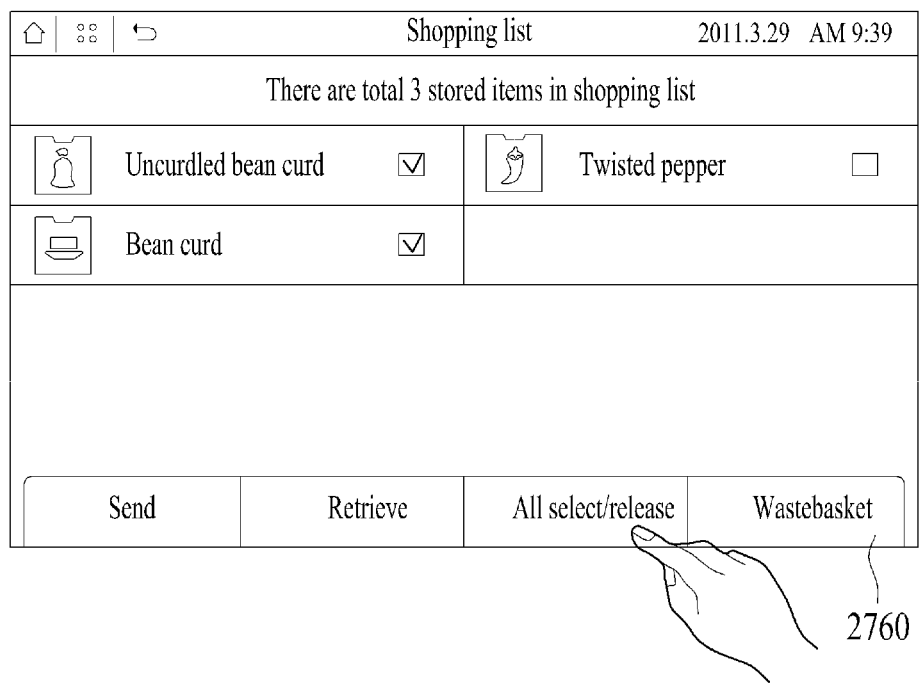

Hereinafter, the shopping list menu will be described with reference to FIGS. 27A to 27C. FIGS. 27A to 27C are views illustrating one example of a shopping list menu displayed on the display of the refrigerator in accordance with an embodiment of the present disclosure. The shopping list menu has a function of confirming/amending/deleting information for food objects added to the shopping list in the food management menu or the recipe menu. The shopping list menu may be called by selecting the shopping list icon 643 at the lower portion 640 of the initial picture of FIG. 6.

When the shopping list menu is called, the touch screen 241 switches from the image home screen of FIG. 6 to the shopping list menu picture, as shown in FIG. 27A. In more detail, icons 2710 of food objects saved as the shopping list and check boxes 2720 provided at the right sides of the respective icons 2710 may be displayed at the center of the initial picture of the shopping list menu. A send button 2730 to send the shopping list to an external device and a retrieve button 2740 (calling button) to obtain the shopping list from an external device may be arranged at the lower end region of shopping list menu.

When an all selection/release button 2750 provided at the lower end region is selected, as illustrated in FIG. 27B, all food objects included in the shopping list are selected, and thus, all check boxes 2720 located at the right sides of the respective icons 2710 are checked. Here, when the all selection/release button 2750 is selected one more time, the checked states of the all check boxes may be released. Further, if a user desires to delete all or some of the food objects included in the shopping list, the check boxes of food objects desired to delete are selected and then a wastebasket button 2760 provided at the lower end is selected, thereby being capable of deleting the selected food objects.

Widget

Hereinafter, a widget function will be described with reference to FIGS. 28A to 30. A widget is a mini application program designed perform a specific purpose, such as weather, calendar, a calculator, etc. The widgets may execute locally and not through a Web browser, for example. As shown in FIG. 6, the widgets in accordance with the present disclosure may be displayed at the center of the home screen. Moreover, simply for ease of description, in this example it is assumed that the widgets are separately arranged, and three separate pages of widgets are provided. The different pages of widgets may be accessed by scrolling to the right or left.

Figure 28A:
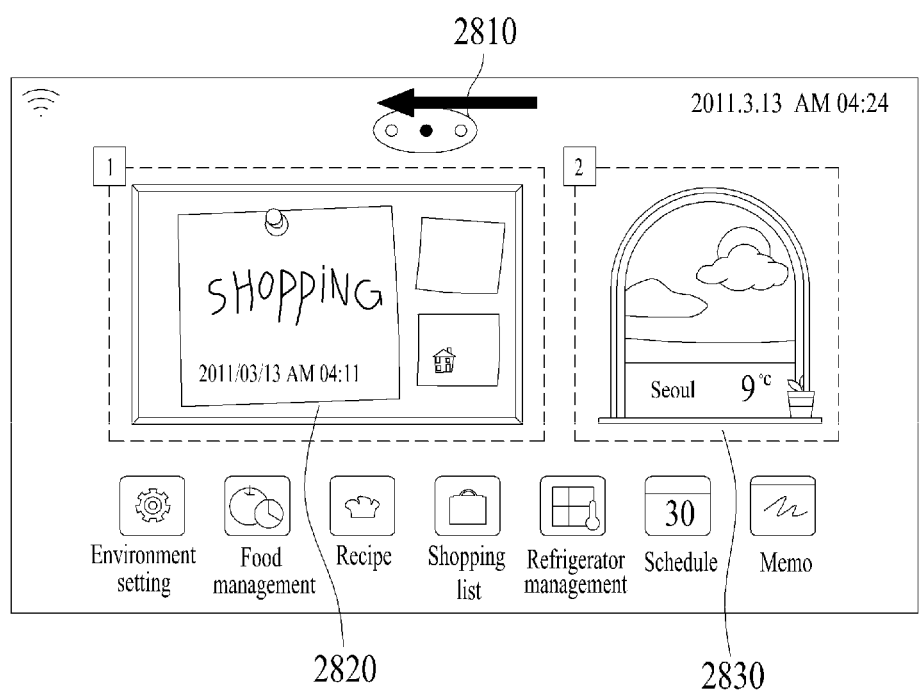
FIGS. 28A to 28C are views illustrating one example of a widget configuration displayed on the display of the refrigerator in accordance with an embodiment of the present disclosure.
Figure 28B:
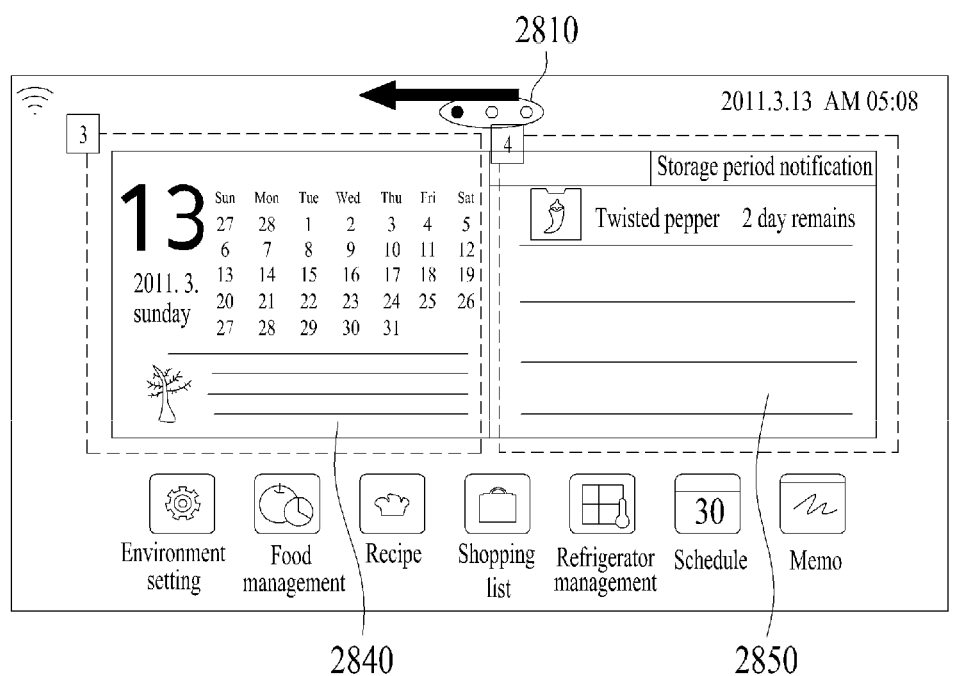
Figure 28C:
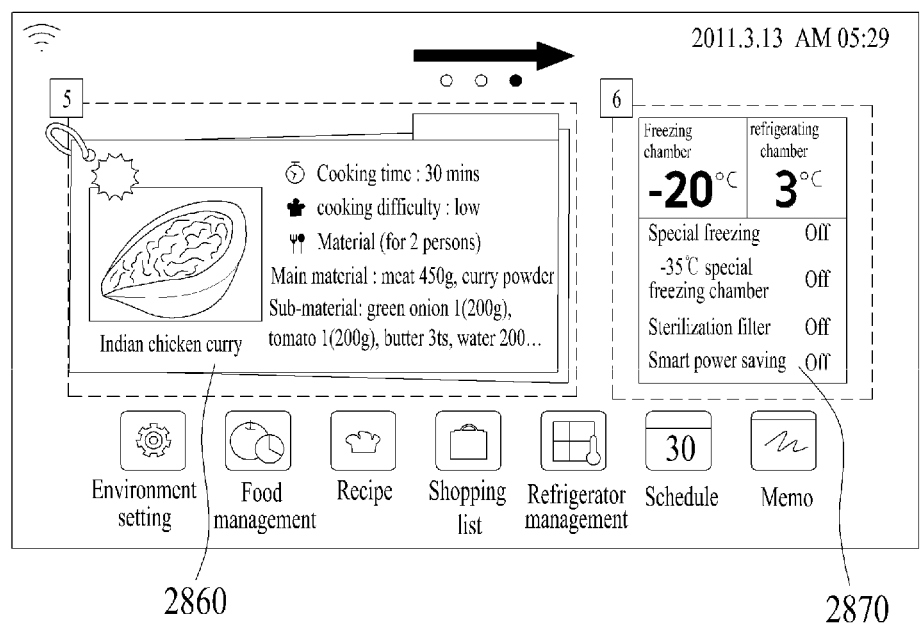

FIGS. 28A to 28C are views illustrating one example of a widget configuration displayed on the display of the refrigerator in accordance with an embodiment of the present disclosure. Widgets may be displayed on the home screen. FIG. 28A illustrates widgets at the left position from among the widgets arranged on three pages. A page indicator 2810 may indicate a picture on which the currently displayed widgets are arranged, from among the three pictures. The page indicator 2810 includes points prepared in number corresponding to the number of the respective pictures, and exhibits visual effects to discriminate a point corresponding to the currently displayed picture from other points. A memo widget 2820 to display a memo written through a memo function which will be described later and a weather widget 2830 to indicate weather of a predetermined region may be displayed on the left picture.

If a user desires to scroll the screen from the left picture to the central picture when the left picture is displayed, when the user inputs a flicking touch in the leftward direction, the left picture moves to the left and the central picture appears from the right on the touch screen. Then, the page indicator 2810 provides visual effects to the central point to indicate display of the central picture, as shown in FIG. 28B. A calendar widget 2840 to display a schedule according to designated unit (for example, 1 month) is displayed at the left of the central picture, and a storage period notification widget 2850 to display an icon of a food object, storage period expiration of which is near, may be displayed at the right of the central picture.

When the user inputs a flicking touch in the leftward direction one more time under the condition that the central picture is displayed, the central picture moves to the left and the right picture appears from the right on the touch screen. Then, the page indicator 2810 provides visual effects to the right point to indicate display of the right picture, as shown in FIG. 28C. A recommended recipe widget 2860 randomly displaying recipes using available food objects as ingredients is displayed at the left of the right picture, and a refrigerator management widget 2870 indicating an operational state of the refrigerator is displayed at the right of the right picture. In order to confirm the widgets of the central picture or the left picture on the right picture, the user may input a flicking touch in the rightward direction.

Figure 29A:
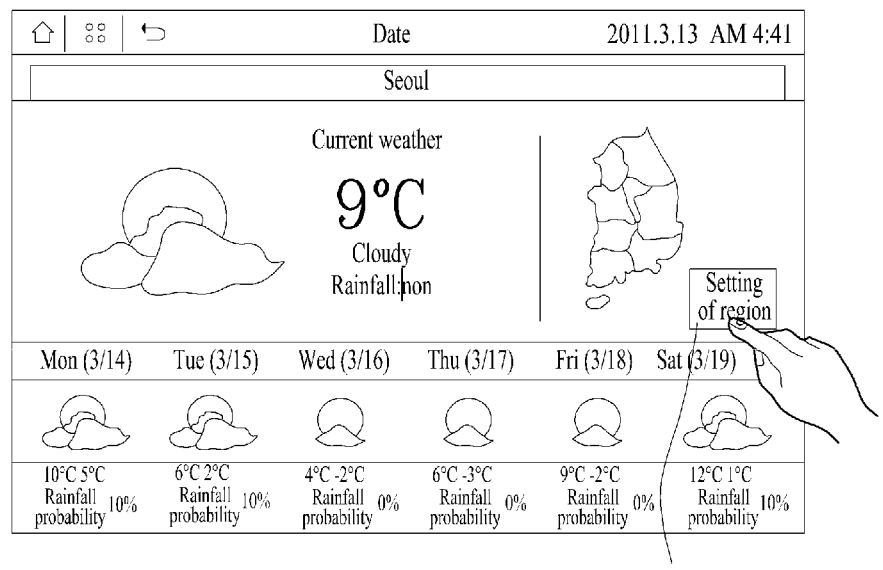
FIGS. 29A to 29D are views illustrating one example of setting a region in a weather widget displayed on the display of the refrigerator in accordance with an embodiment of the present disclosure.
Figure 29B:
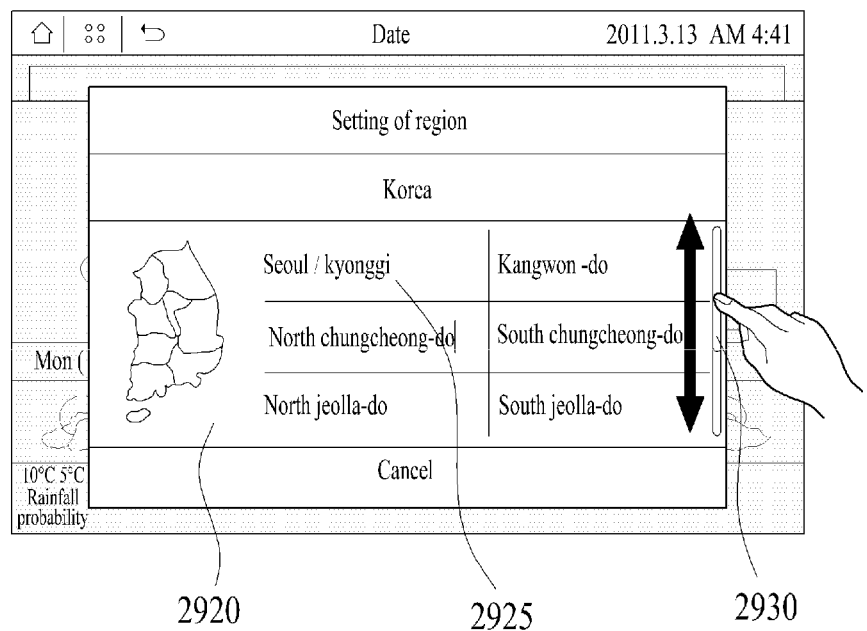

FIGS. 29A to 29D are views illustrating one example of a weather widget and a method of setting a region in the weather widget displayed on the display of the refrigerator in accordance with an embodiment of the present disclosure. First, when the weather widget is selected from the home screen through a touch, detailed weather information including current weather, temperature, a current region, a weekly weather forecast, etc. may be displayed, as shown in FIG. 29A. Here, when a region setting button 2910 arranged at the right of a map indicating which region the currently displayed weather corresponds to through different colors is selected, a popup window 2920 for region setting may be displayed, as shown in FIG. 29B. If a region list is not displayed at a time on the popup window 2920, the region list may be scrolled in the vertical direction through drag/flicking input.

Figure 29C:
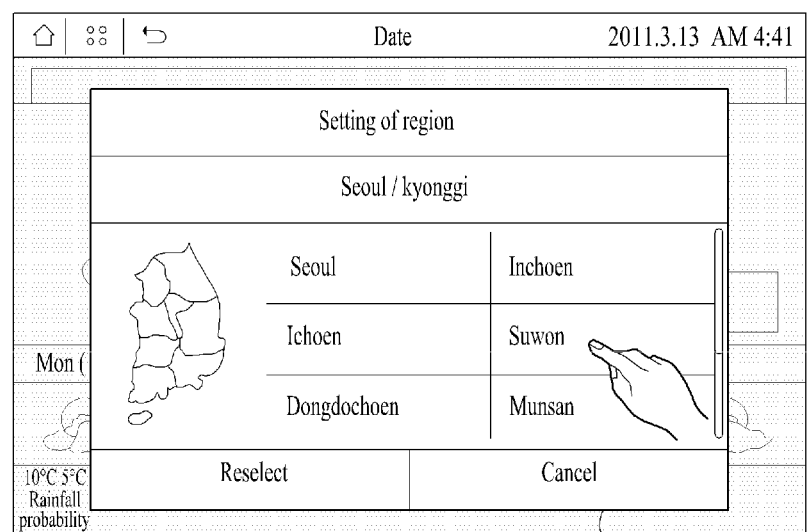
Figure 29D:
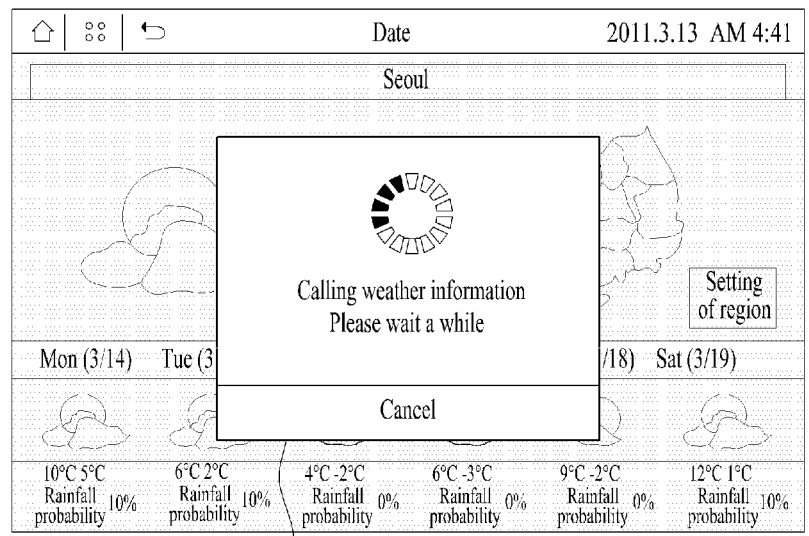

If the Seoul/Kyungki region is selected from the region list, a popup window 2940 including a sub-region list is displayed, as shown in FIG. 29C. Here, if a designated region is specified, a popup window 2950 indicating receiving weather of the corresponding region from an external server may be displayed after setting of the region has been completed, as shown in FIG. 29D. Thereafter, the weather widget displays weather of the changed region.

Figure 30:
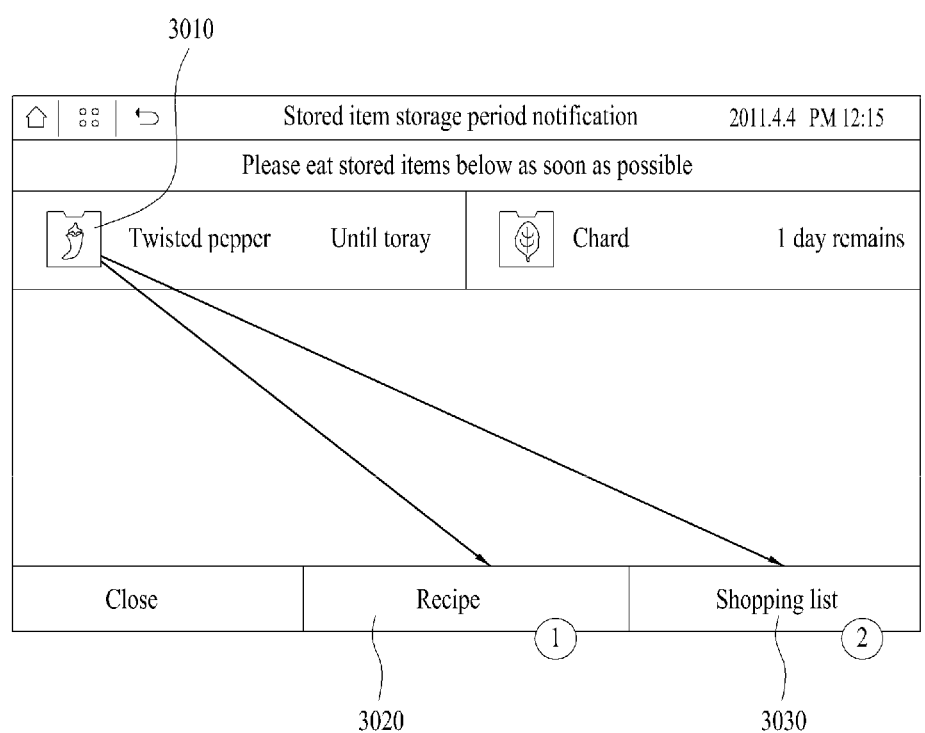
FIG. 30 is a view illustrating one example of use of a storage period notification widget displayed on the display of the refrigerator in accordance with an embodiment of the present disclosure.

FIG. 30 is a view illustrating one example of use of the storage period notification widget displayed on the display of the refrigerator in accordance with an embodiment of the present disclosure. When a user selects the storage period notification widget from the home screen through a touch, an icon 3010 of a food object, storage period expiration of which is near, is displayed, as shown in FIG. 30. The displayed icon 3010 may be dragged to a recipe menu 3020 provided at the lower end, thus being capable of being added to the material area of the recipe menu. Further, if the displayed icon 3010 is dragged to a shopping list menu 3030 provided at the lower end, the icon 3010 may be added to the shopping list menu.

Refrigerator Management

Figure 31:
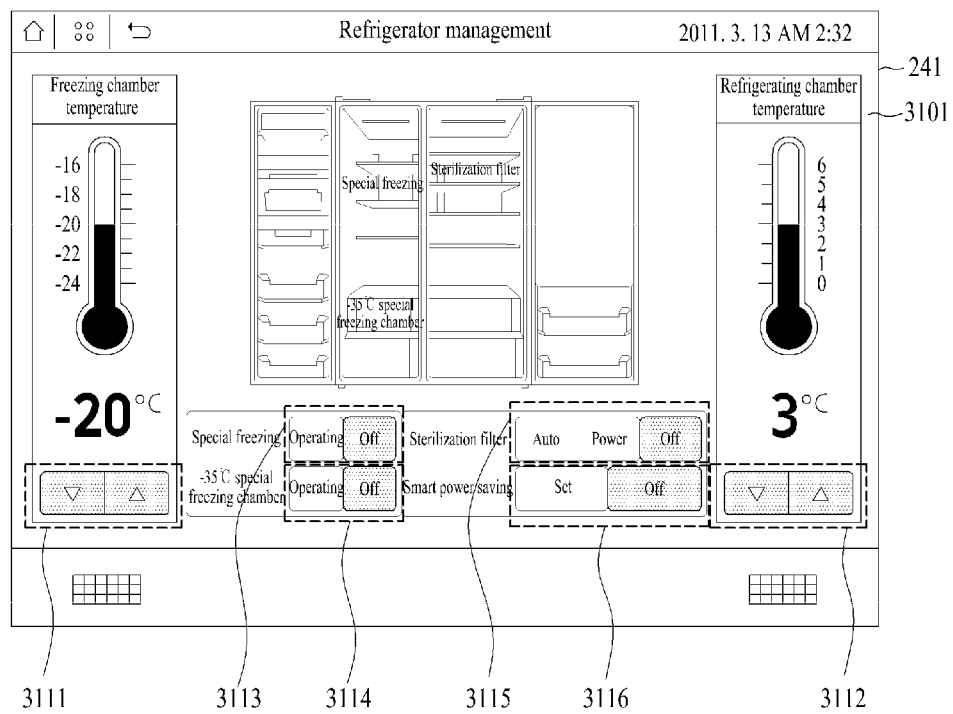
FIG. 31 is a view illustrating a refrigerator management menu displayed on the display in accordance with the present disclosure.

When a user touches the refrigerator management icon 645 (with reference to FIG. 6) from among the several menu icons provided at the lower end of the display 241, an menu 3101 for refrigerator management may be displayed, as shown in FIG. 31.

There may be 6 refrigerator management menu items. That is, the 6 refrigerator management menus items may include a freezing chamber temperature setting button 3111, a refrigerating chamber temperature setting button 3112, a special freezing setting button 3113 increasing the freezing rate of the freezing chamber, a special freezing chamber operation setting button 3114, a filter device setting button 3115 and a smart power saving operation button 3116.

Temperature Adjustment

Each of the freezing chamber and refrigerating chamber temperature setting buttons 3111 and 3112 includes a touch button to lower and raise temperature, and a window showing the current temperature of the freezing chamber or the refrigerating chamber. The temperature may be displayed in Celsius or Fahrenheit.

Each of the special freezing setting button 3113, the special freezing chamber operation setting button 3114 and the smart power saving operation button 3115 may include a touch button to select 'operating' and 'off', and the filter device setting button 3115 includes an 'auto' button for automatic operation, a 'power' button to improve sterilizing performance during operation, and a 'off' button.

A virtual refrigerator in which a refrigerating chamber and a freezing chamber are completely opened is displayed on the refrigerator management menu, and the positions of a special freezing chamber and a filter device provided in the freezing chamber and the refrigerating chamber are displayed on the virtual refrigerator.

Buttons regarding the above-described 6 menu items are arranged around the virtual refrigerator, and a user may touch these buttons to operate the refrigerator. Here, the respective buttons are touch buttons, and these touch buttons may be capacitive switches which are operated through reaction with a human body close to the buttons by a designated distance or an object having static electricity without mechanical operation.

Figure 32:
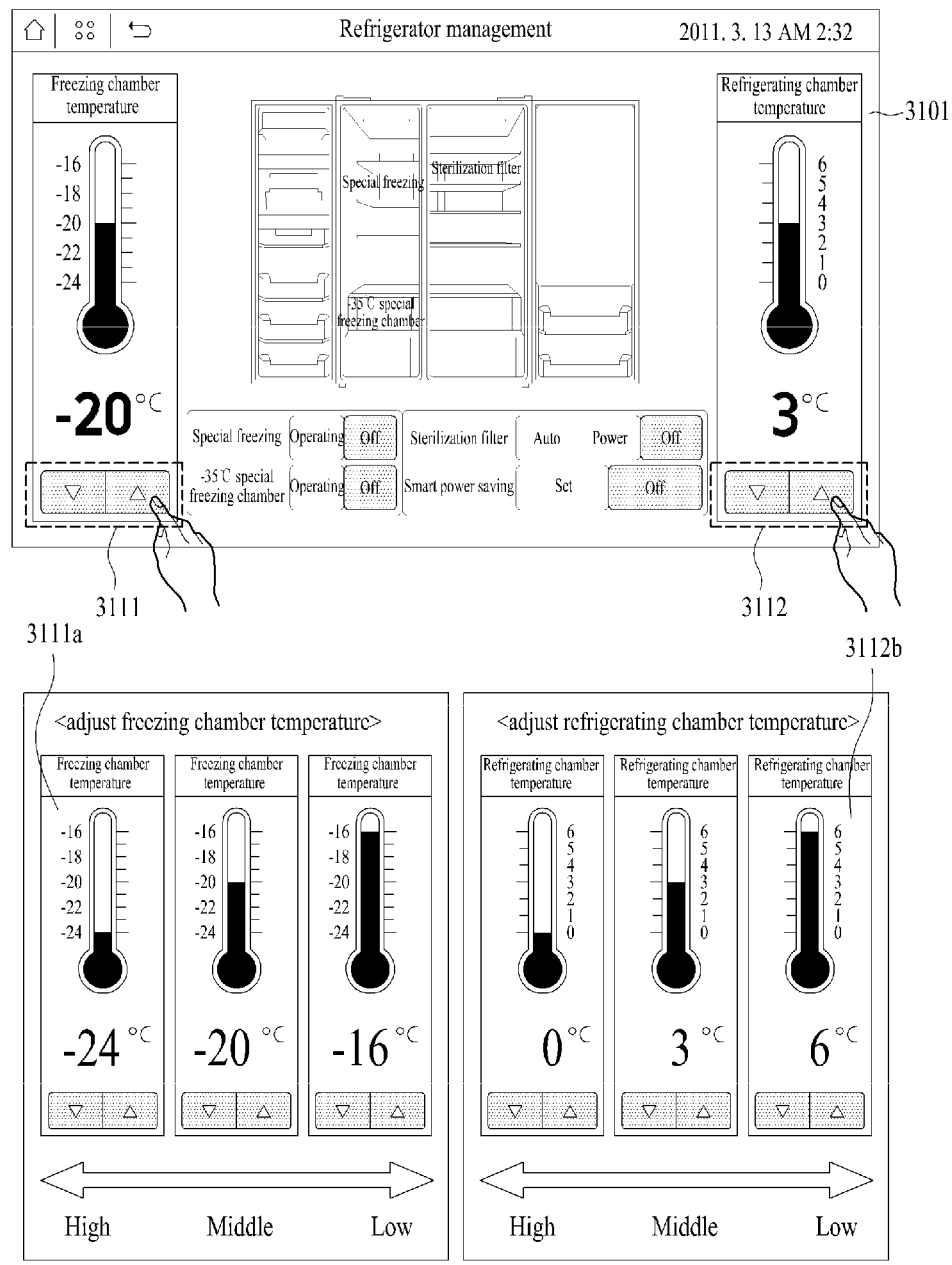
FIG. 32 is a view illustrating temperature adjustment of a freezing chamber or a refrigerating chamber on the display in accordance with the present disclosure.

As shown in FIG. 32, in order to adjust the temperature of the freezing chamber or the refrigerating chamber, the user operates the freezing chamber temperature setting button 3111 or the refrigerating chamber temperature setting button 3112. Here, the freezing chamber and the refrigerating chamber temperature setting buttons 3111 and 3112 include an up button and a down button so as to raise and lower the respective temperatures of the freezing chamber and the refrigerating chamber.

When these buttons are pressed to adjust temperature, numeral of a temperature and graduations of thermometers displayed on a freezing chamber temperature state window 3111a or a refrigerating chamber temperature state window 3112a may be changed, as illustrated in FIG. 32.

Temperature adjustment of the freezing chamber or the refrigerating chamber is executed according to opening and closing operation of a cold air damper, change of an operation factor of the compressor, on/off of the cold air fan, or change of a rotating velocity of the cold air fan.

Special Freezing Operation

As shown in FIG. 33, when the 'operating' button of the special freezing setting button 3113 in the refrigerator management menu is selected, the color of the entirety of the freezing chamber F of the virtual refrigerator may be activated (e.g., color changed or the chamber highlighted), and the controller causes freezing within the actual freezing chamber 5 (with reference to FIG. 5) to be more rapidly executed than in the general freezing operation mode. That is, the freezing chamber in the special freezing operation mode more rapidly reaches a target temperature than in the general freezing operation mode. The special freezing operation may be executed while increasing the rotating velocity of the cold air fan.

Further, when a designated time period has elapsed from the time the 'operating' button of the special freezing setting button 3113 is pressed, the window of the freezing chamber F of the virtual refrigerator may be deactivated and the special freezing operation automatically turned off. Moreover, when the 'off' button of the special freezing setting button 3113 is pressed before the designated time has not elapsed, the special freezing operation is finished and the refrigerator enters the general freezing operation mode.

Special Freezing Chamber Operation

Figure 34:
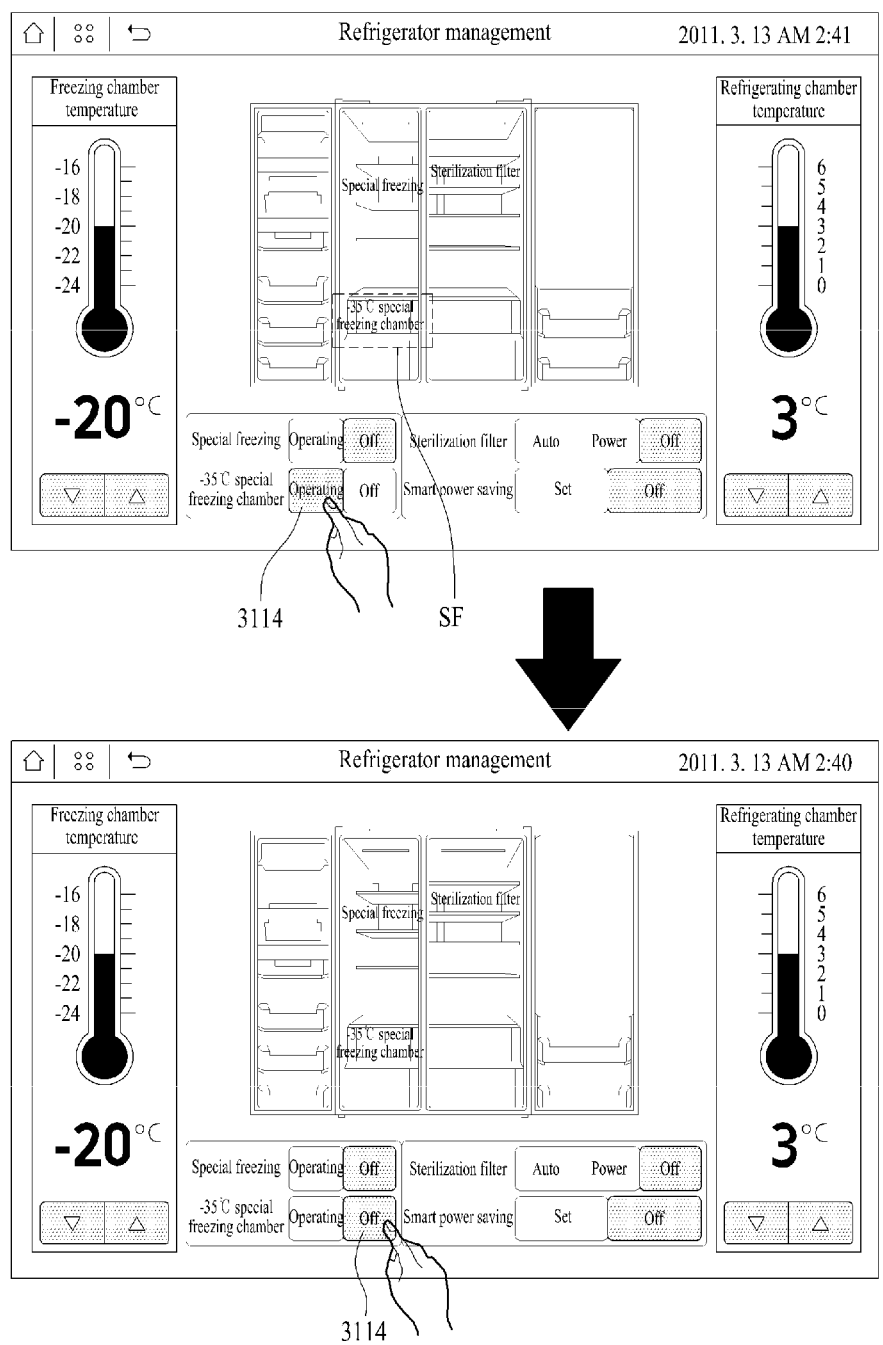
FIG. 34 is a view illustrating setting of operation of a special freezing chamber on the display in accordance with the present disclosure.

As shown in FIG. 34, when the 'operating' button of the special freezing chamber setting button 3114 is selected, the color of the special freezing chamber SF of the virtual refrigerator may be activated. The special freezing chamber SF means a special freezing chamber which has a lower temperature than the freezing chamber and a relatively high freezing velocity (or rate) in order to store food, such as meat, in the optimal state.

Special freezing shown in FIG. 33 corresponds to rapid freezing of the entirety of the freezing chamber, and is used when a large amount of items are put into the freezing chamber. Therefore, if the special freezing operation is executed, the compressor and the cold air fan are operated for a longer time than in the general freezing operation.

On the other hand, the special freezing chamber shown in FIG. 34 corresponds to a storage space that is separately provided in the freezing chamber, and special freezing chamber operation refers to concentration of cold air into the separate storage space. If a relatively small amount of meat or fish, as compared to the state of FIG. 33, is required to be placed in the special freezing chamber so as to be rapidly frozen, the special freezing chamber operation is executed. For this purpose, a cold air fan and/or a cold air damper that concentrate cold air in the direction toward a duct connected to the special freezing chamber may be provided.

Filter Device Operation

Figure 35A:
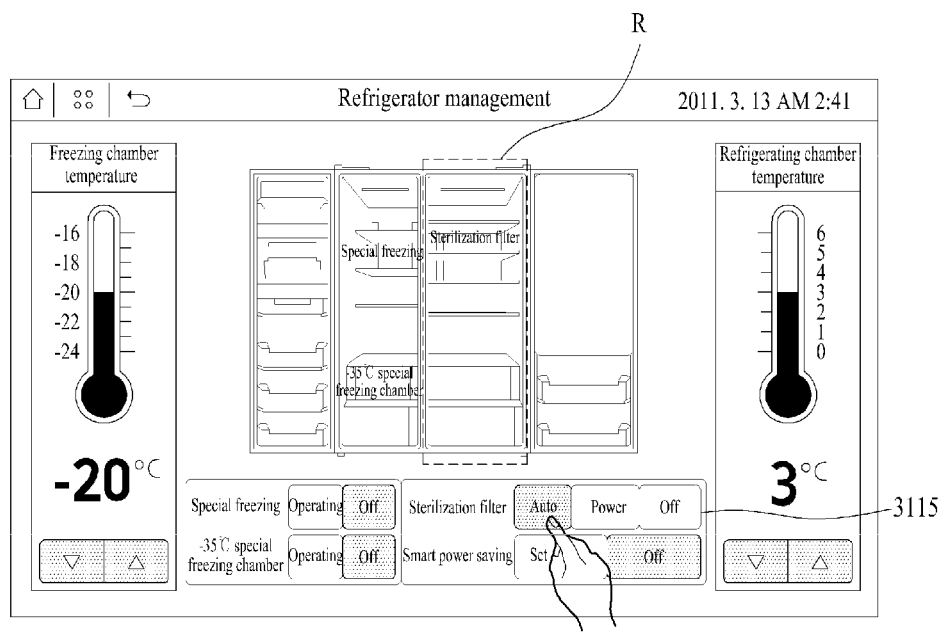
FIGS. 35A to 35C are views illustrating setting of operation of a filter device on the display in accordance with the present disclosure.
Figure 35B:
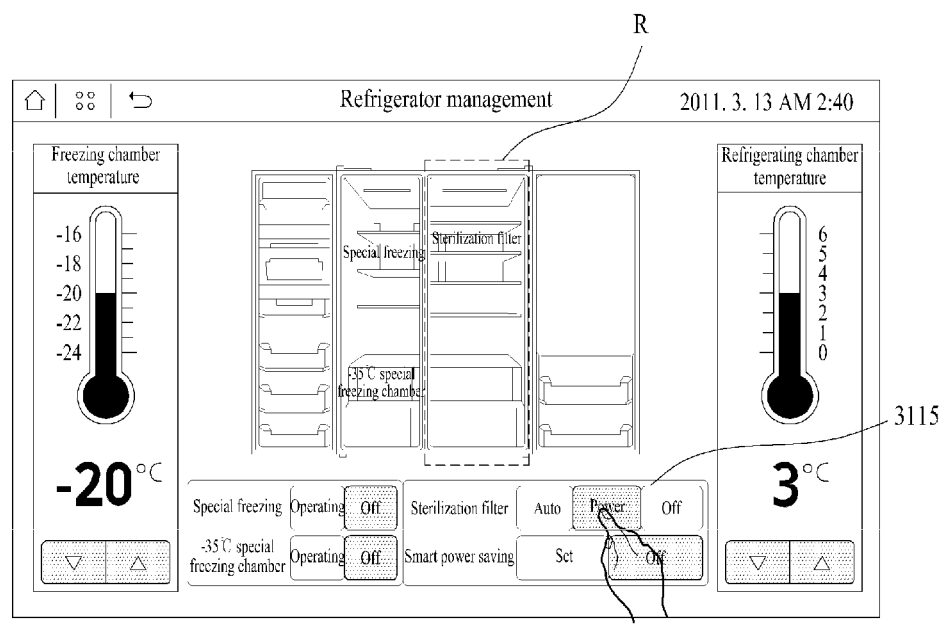
Figure 35C:
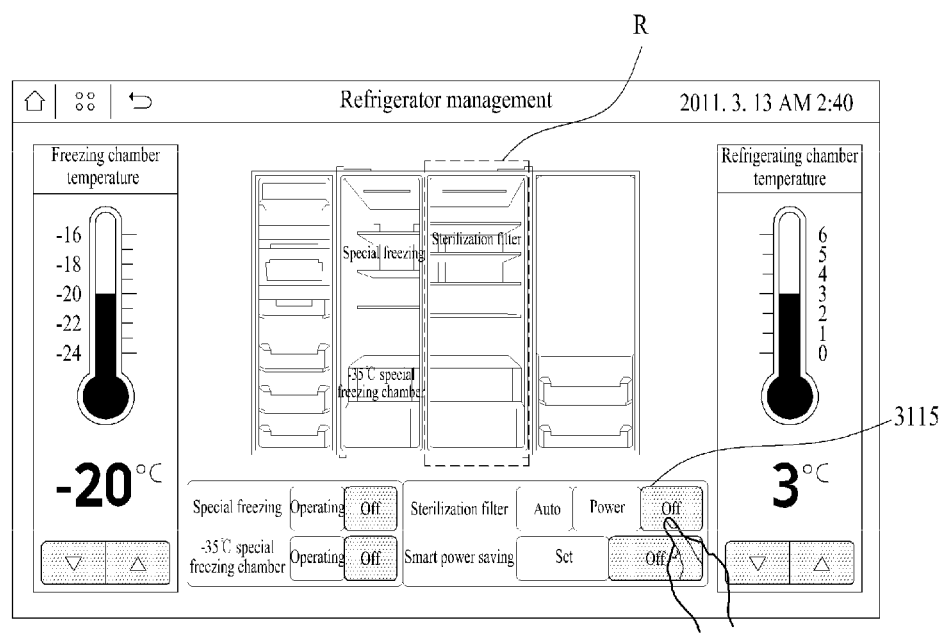

FIGS. 35A to 35C are views illustrating display states regarding operation of the filter device 295 (with reference to FIG. 1). Although FIGS. 35A to 35C state the filter device 295 as a sterilization filter, the scope or function of the filter device 295 is not limited to the sterilization filter.

The filter device 295 in accordance with the present disclosure may execute a sterilization function of removing viruses or bacteria from the inside of the refrigerator and a deodorization function of removing odors from the inside of the refrigerator. As shown in FIGS. 35A and 35B, when the 'auto' button or the 'power' button of the filter device setting button 3115 are selected, the color of the refrigerating chamber R of the virtual refrigerator on the display 214 may be changed or highlighted. Simultaneously, the filter device 295 provided in the refrigerating chamber 6 (with reference to FIG. 1) of the main body of the refrigerator may be operated to filter air within the refrigerating chamber 6.

The lighting device 296 (with reference to FIG. 1) is provided around the filter device 295 of the refrigerating chamber 6. When the 'auto' button or the 'power' button is touched, the lighting device 296 is turned on while operating the filter device 295 to indicate the operational state of the filter device 295.

Here, operation of the filter device 295 when the 'auto' button is touched and operation of the filter device 295 when the 'power' button is touched are basically the same. However, operation of the filter device 295 when the 'auto' button is touched and operation of the filter device 295 when the 'power' button is touched are different in that the 'power' setting may require increased rotating velocity and an operating time of a fan unit 295b (with reference to FIG. 1) of the filter device 295. Further, as shown in FIG. 35C, when the 'off' button is selected, operation of the filter device 295 (with reference to FIG. 1) is stopped, and the activated color of the refrigerating chamber R of the virtual refrigerator is no longer activated.

Figure 36:
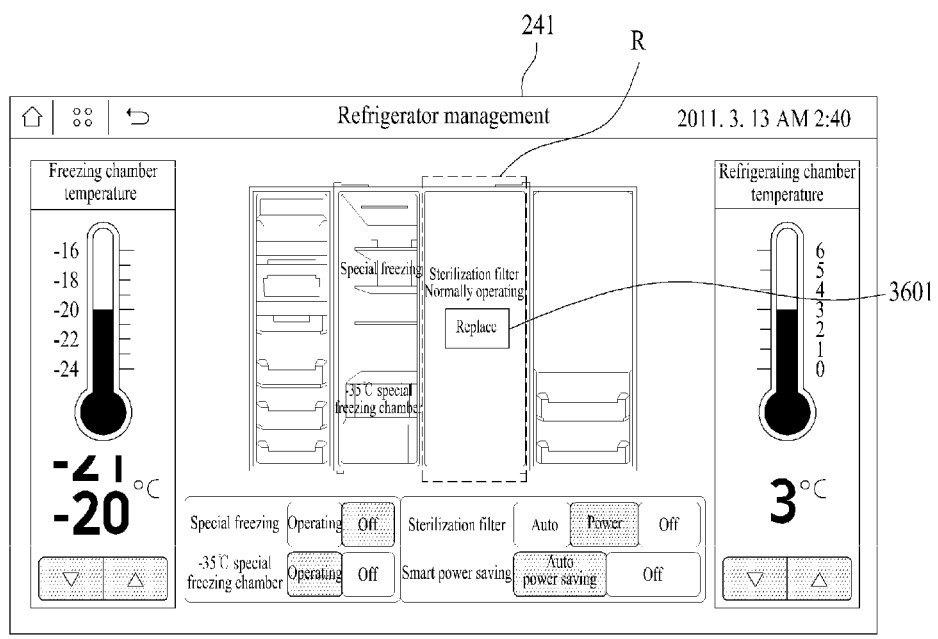
FIG. 36 is a view illustrating notification of replacement of a filter on the display in accordance with the present disclosure.

As shown in FIG. 36, if the life span of the filter unit 295a (with reference to FIG. 1) of the filter device 195 (with reference to FIG. 1) is ended, and thus replacement of the filter unit 295a is required, a replacement button 3601 in the refrigerating chamber R of the virtual refrigerator of the display 241 may be displayed, e.g., in a popup window. Therefore, a user or an AS mechanic may replace the filter unit 295a with a new one upon seeing the popup state of the replacement button 3601. When the replacement button 3601 is pressed for a designated time (for example, 5 seconds), the life span timer may be reset and the replacement button 3601 may disappear.

Power Saving Command

FIGS. 37 to 40 are views illustrating a power saving command to reduce power consumed during operation of the refrigerator.

Figure 37:
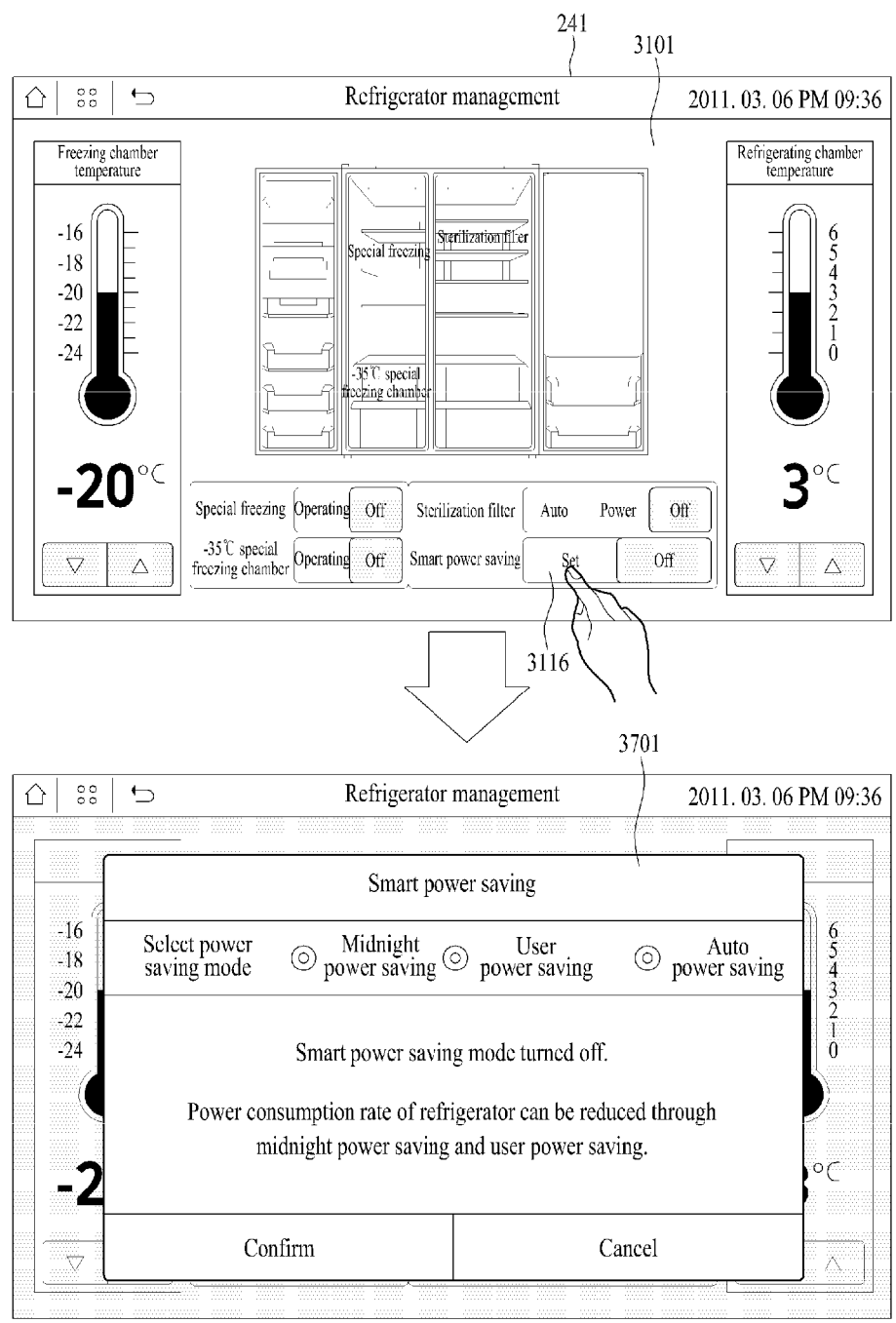

As shown in FIG. 37, when a 'set' button of the smart power saving operation button 3116 provided below the virtual refrigerator is selected, a power saving mode selection popup window 3701 may be displayed for selecting a power saving mode. The power saving modes displayed on the popup window 3701 may include a midnight power saving mode, a user power saving mode and an auto power saving mode.

Figure 38:
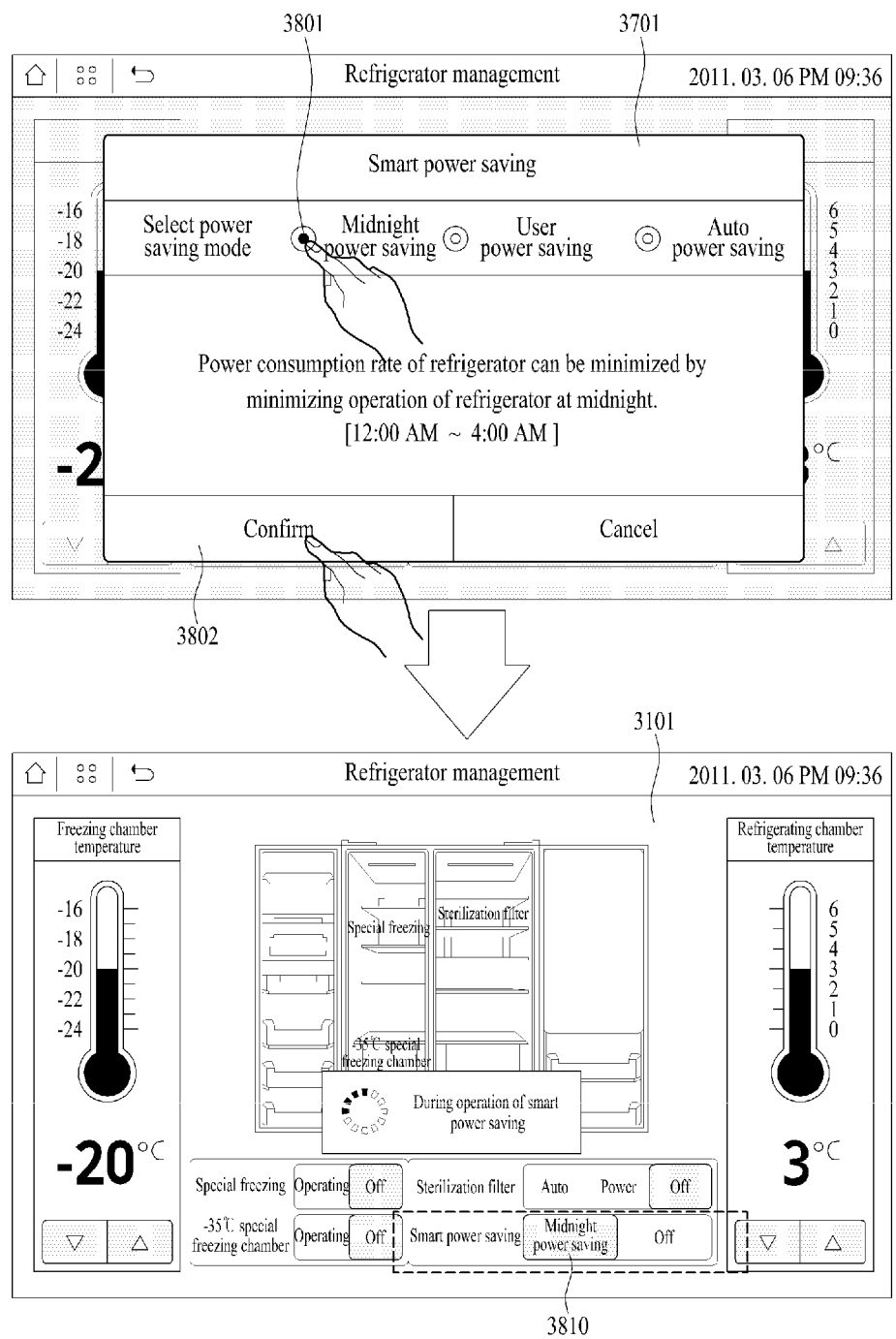

As shown in FIG. 38, when a user selects the midnight power saving mode from the power saving mode selection popup window 3701 and touches a confirmation button 3801, a midnight power saving function may be executed. The midnight power saving function minimizes operation of the refrigerator in a predetermined time period around midnight (for example, from midnight to 4:00 am) to minimize a power consumption rate.

In general, the frequency of use of the refrigerator is remarkably reduced in the midnight time period as users are sleeping. Therefore, the operation factor of the compressor, operation of the cold air fan or operation of the defrost heater in the midnight time period may be reduced as compared to the general operation mode, thereby reducing power consumption.

For example, when a user opens and closes the door of the storage chamber in the day time or the night time other than the midnight time period, the temperature in the storage chamber is raised and such rise in temperature may act as load. In order to reduce the effects of such a load, the compressor may be operated or the cold air fan may be operated to supply cold air.

However, when the midnight power saving mode is selected, even if the temperature of the refrigerating chamber or the freezing chamber is raised, the compressor or the cold air fan is not immediately operated as long as the temperature does not exceed the upper limit of a set inner temperature range of the refrigerating chamber 5 (with reference to FIG. 1) or the freezing chamber 6 (with reference to FIG. 1). Only when the temperature of the refrigerating chamber or the freezing chamber reaches the upper limit of the set inner temperature range of the refrigerating chamber or the freezing chamber, is the compressor or the cold air fan operated. Since immediate load is eliminated during operation in the midnight time period, as described above, power consumption caused by the load may be reduced.

As shown in FIG. 38, when a user selects the midnight power saving mode 3801, a message 3810 'midnight power saving' is displayed on the menu 3101 of the refrigerator management menu, thereby notifying the user of midnight power saving operation.

Figure 39A:
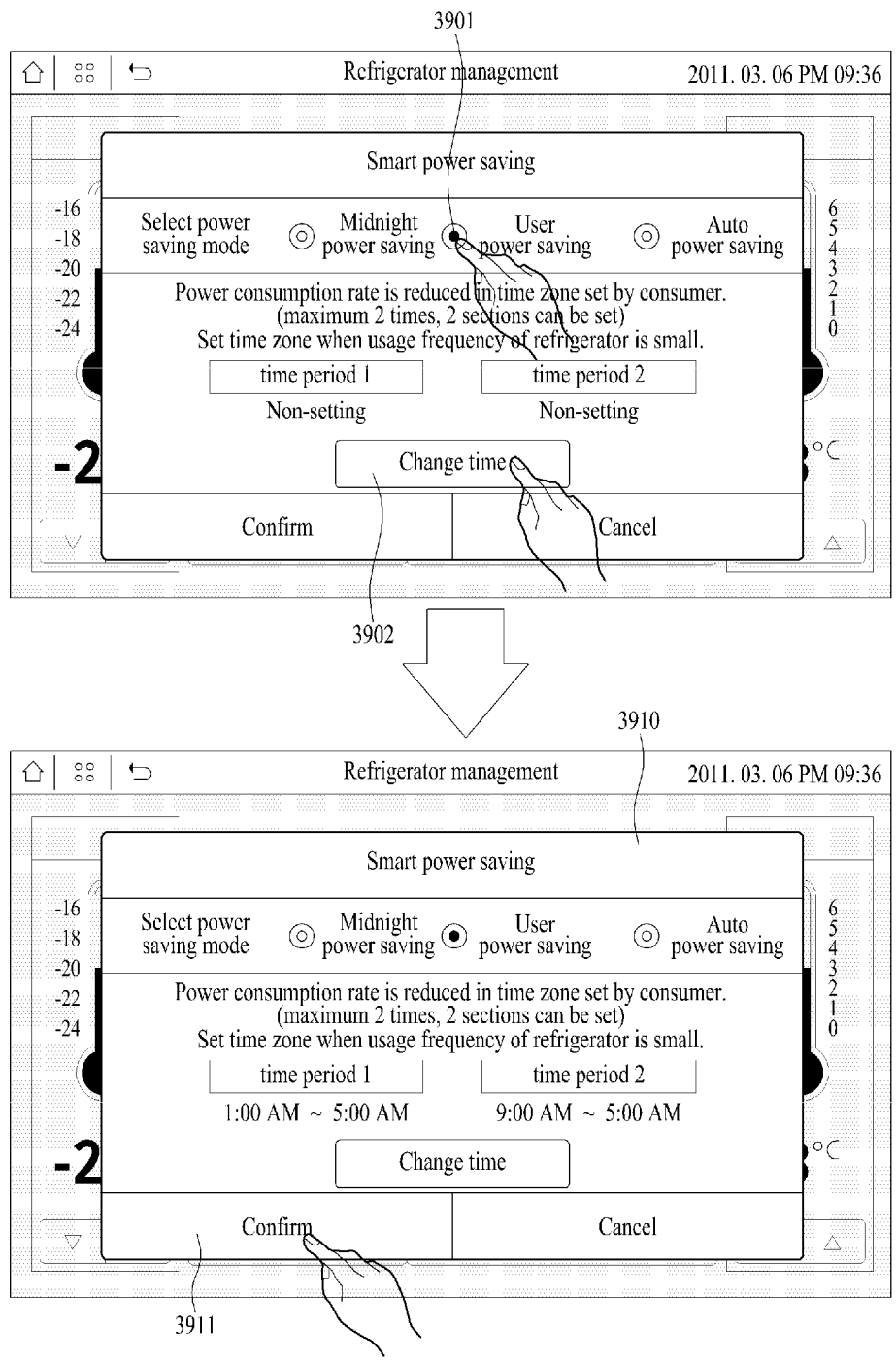
Figure 39B:
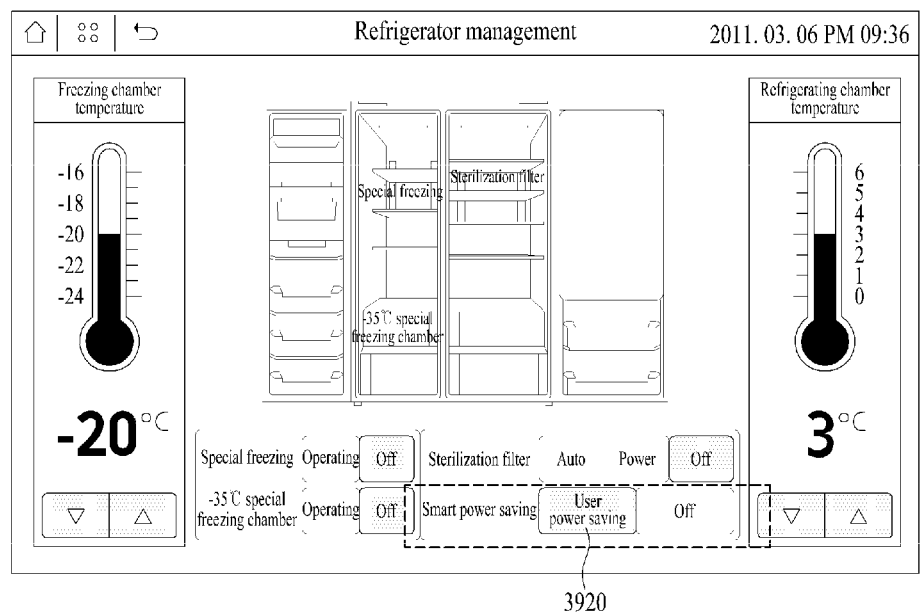

FIGS. 39A and 39B illustrate selection of the user power saving mode so as to execute power saving operation in a time section selected by a user. As shown in FIG. 39A, when the user selects a user power saving mode 3901 on the power saving mode selection window and touches a time change button 3902 to set a time period for power saving, a time setting window 3910 to set a time period is displayed.

On the time setting window 3910, the user may set one time period or plural time periods as power saving time. Here, the set time period may be a time period when the user does not frequently use the refrigerator, for example, during overnight hours or work hours. As shown in FIG. 39B, when the user sets a time period and touches a confirmation button 3911, a message 3920 'user power saving' is displayed on the initial picture of the refrigerator management menu. Here, power saving operation may be executed so as to cause the minimum power consumption within the set temperature range of the storage chamber, by lowering the operation factor of the compressor or lowering the operation performance of the cold air fan during the time periods set by the user.

FIG. 40 illustrates selection of the auto power saving mode on the power saving mode selection window. When the user selects an auto power saving option 4001, a brief description of auto power saving and a power condition and charge information notification button 4002 may be displayed.

The auto power saving function relates to power saving operation of the refrigerator based on information regarding a time zone having the highest electric rates (utility costs) which is recognized by a server communicable with the refrigerator and is transmitted to the refrigerator.

That is, the auto power saving function may be configured to apply to the refrigerator the trend of electric rates toward a change from a fixed charge system unrelated to season and time to a variable charge system variable according to season and time. The auto power saving mode may vary the operation of the refrigerator based on the cost of electrical power. For example, when the electric rates are relatively high, the auto power saving function may increase the set temperature of the refrigeration chamber and the freezing chamber by a predetermined amount. The predetermined amount may be an amount which may not be readily noticeable to the user. Likewise, when the retrieved electric rates are relatively lower, the set temperatures of one or more of the refrigeration chamber and/or the freezing chamber may be increased or returned to the desired values. Based on the electric rate, the set temperature of the freezer chamber alone may be adjusted, or both set temperatures of the freezer and refrigeration chambers may be adjusted.

Moreover, the operational rate of the compressor and/or cold air fan may be adjusted based on the received electric rate information. For example, when electric rates are relatively low, the operational rate of the compressor and/or the cold air fan may be increased to optimize for performance. Likewise, when electric rates are relatively high, the operational rate of the compressor and/or the cold air fan may be reduced to optimize for energy conservation.

The server may control the operation of the refrigerator in the auto power saving function, e.g., to adjust the set temperature or operational efficiency to optimize power consumption of the refrigerator based on the electric rate. In one embodiment, the user may control operation based on the electric rate or effective cost. The user may set the level of the electric rate or effective cost at which the set temperature of the refrigerator may be automatically adjusted. For example, the user may configure the set temperatures to be adjusted when the electric rate increases by more than 10% above a preset rate. The user may also set the amount in which the set temperature may be adjusted.

If the refrigerator is operated in the auto power saving mode, an auto power saving notification message 4010 may be displayed on the main setting window of the refrigerator management menu, as shown in FIG. 40.

Schedule Management

Figure 41:
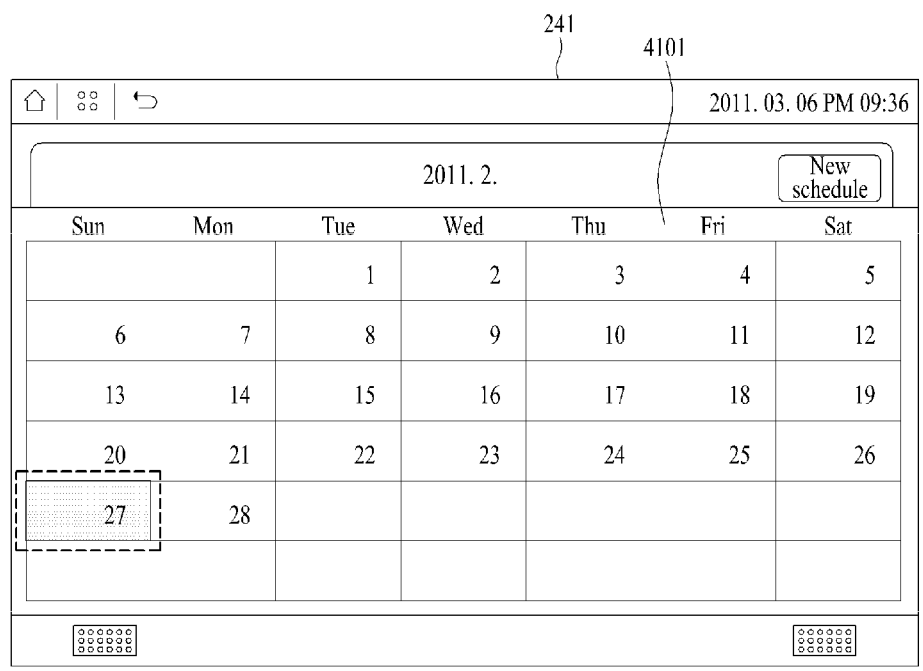
FIGS. 41 to 46C are views illustrating execution of schedule management on the display in accordance with the present disclosure.

FIG. 41 is a view illustrating display of a schedule when the schedule button 646 (with reference to FIG. 6) of the main menu displayed on the display is selected. If the schedule button 646 is selected, a basic schedule 4101 may be displayed. The basic schedule 4101 may be a monthly grid, like a calendar. The image of the basic schedule 4101 may be scrolled to display other months in the schedule. The basic schedule 4101 may be scrolled using a touch input at the display screen to move the image vertically up or down. Particularly, the selected date (Feb. 27, 2011) may be highlighted (color, dark borders, etc.) to be discriminated from other dates.

Figure 42:
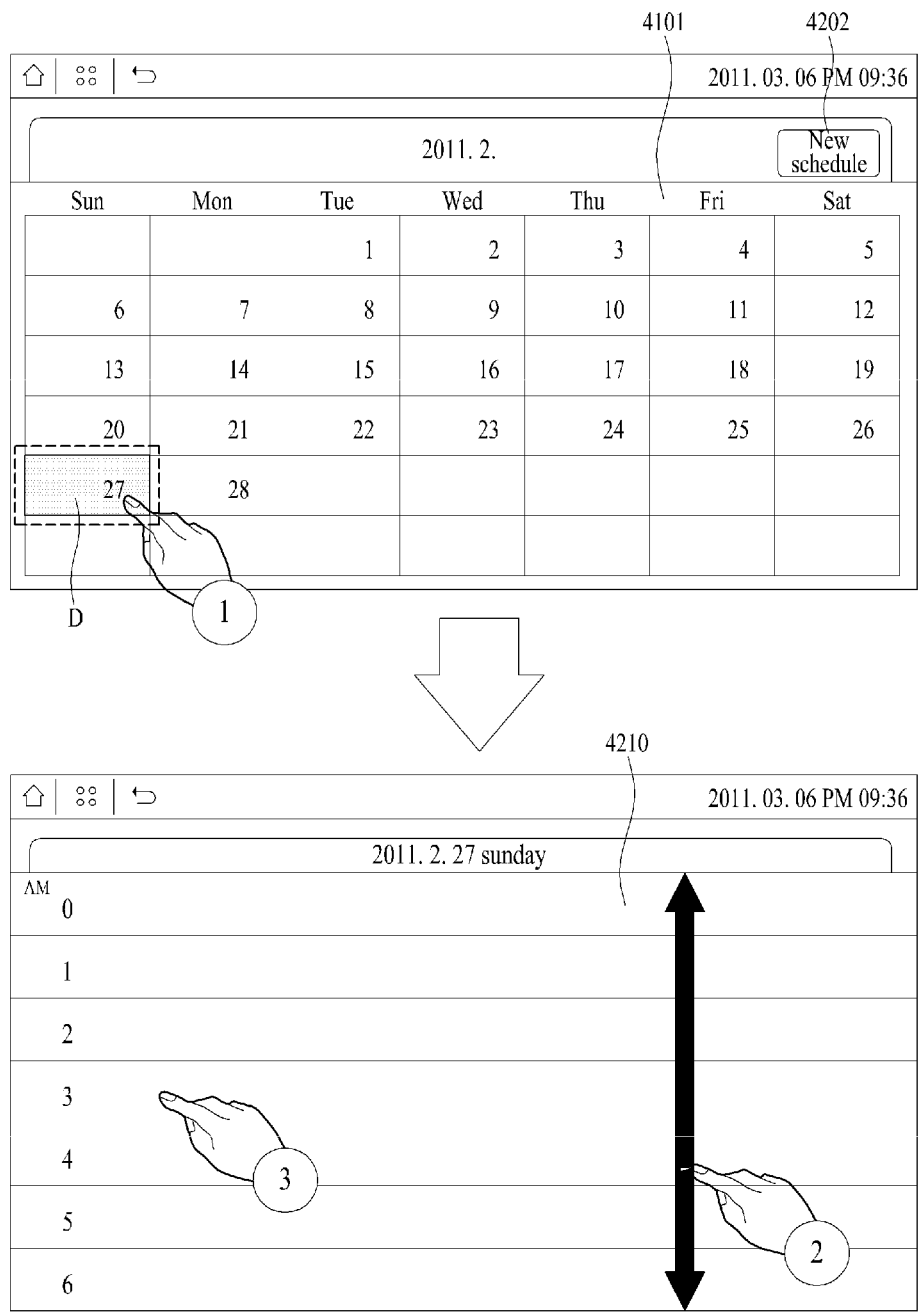

If a user desires to add a new schedule under the condition that the basic schedule picture 4101 is displayed, the user may touch a corresponding date D related to the new schedule on the basic schedule picture 4101, as illustrated in FIG. 42 (Sequence 1). When the user touches the corresponding date D, a schedule input window 4210 may be displayed in which time zones of the corresponding date D are sequentially displayed.

Figure 43:
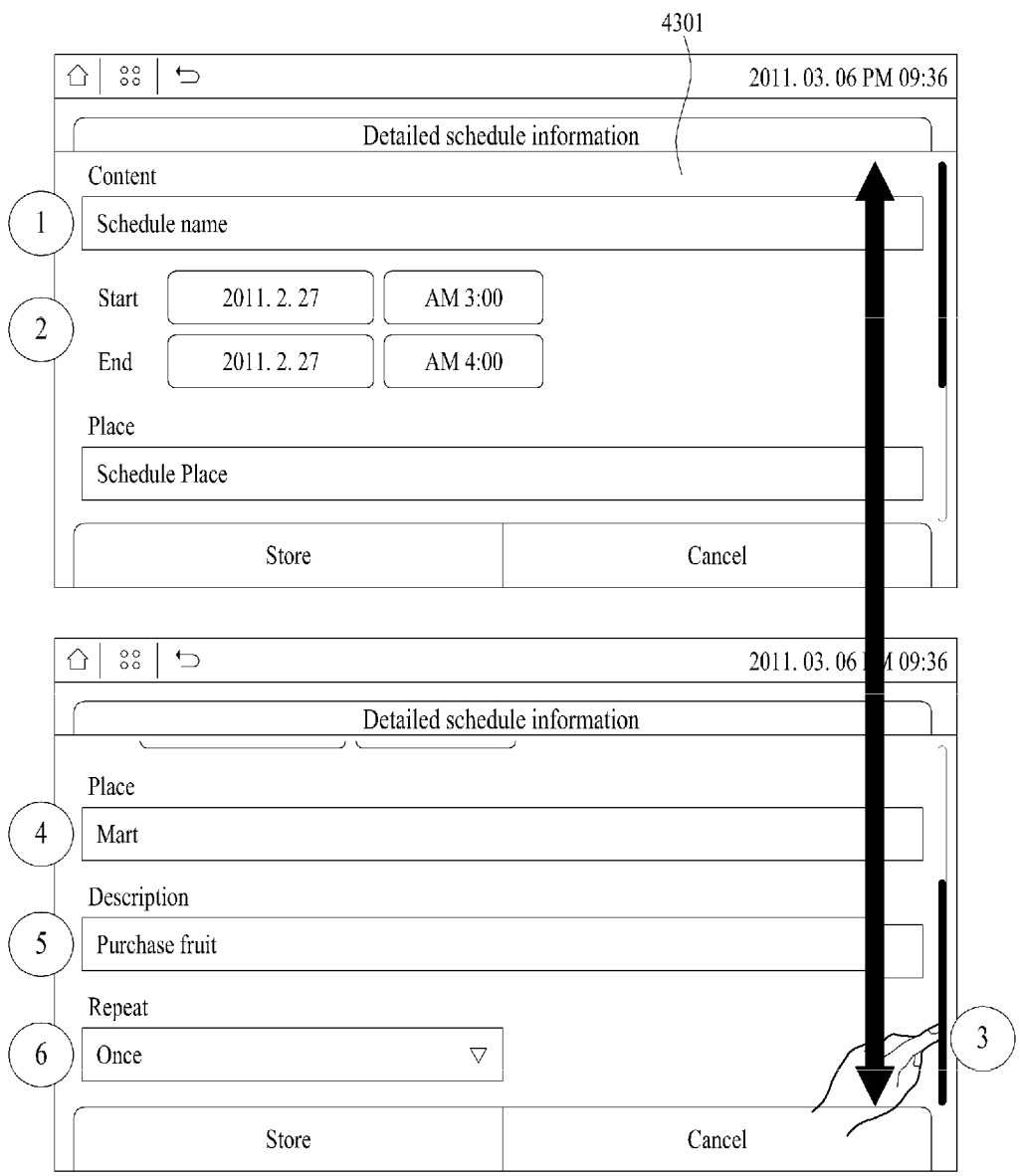

When the user moves the schedule input window 4210 in the vertical direction under the condition that the user touches the schedule input window 4210, the schedule input window 4210 may move vertically to display other time zones (Sequence 2). Then, when the user touches a specific time zone on the schedule input window 4210 (Sequence 3), a detailed schedule information input window 4301 may be displayed, as shown in FIG. 43. The schedule input window 4210 may also be accessed by selecting the new schedule button 4202.

As shown in FIG. 43, the user inputs a name and contents of the schedule on the detailed schedule information input window 4301 (Sequence 1). Here, when the user touches a corresponding compartment, a keyboard input window allowing the user to input the name and contents of the schedule through the keyboard may be displayed.

Thereafter, the user sets a starting date and time and an ending date and time of the schedule (Sequence 2). Thereafter, if input of a place of the schedule is required, the user moves the corresponding compartment downward under the condition that the user maintains touch with the compartment (Sequence 3).

Then, an input window to input the place is displayed, and when the user touches the input window, the keyboard input window is displayed. The user inputs the place using the keyboard input window (Sequence 4). If a detailed description of the corresponding schedule in such a state is required, the user touches an input window to input the description and then inputs the detailed description on the input window (Sequence 5).

Thereafter, according to characteristics of the schedule, setting once, setting every day, setting weekdays (Mon-Fri), setting every week (the corresponding day of the week), setting every month (the first week), setting every month (the corresponding day), and setting every year (the corresponding day) may be carried out. This may be carried out by touching a window under a portion displaying 'repeat' (Sequence 6).

Figure 44A:
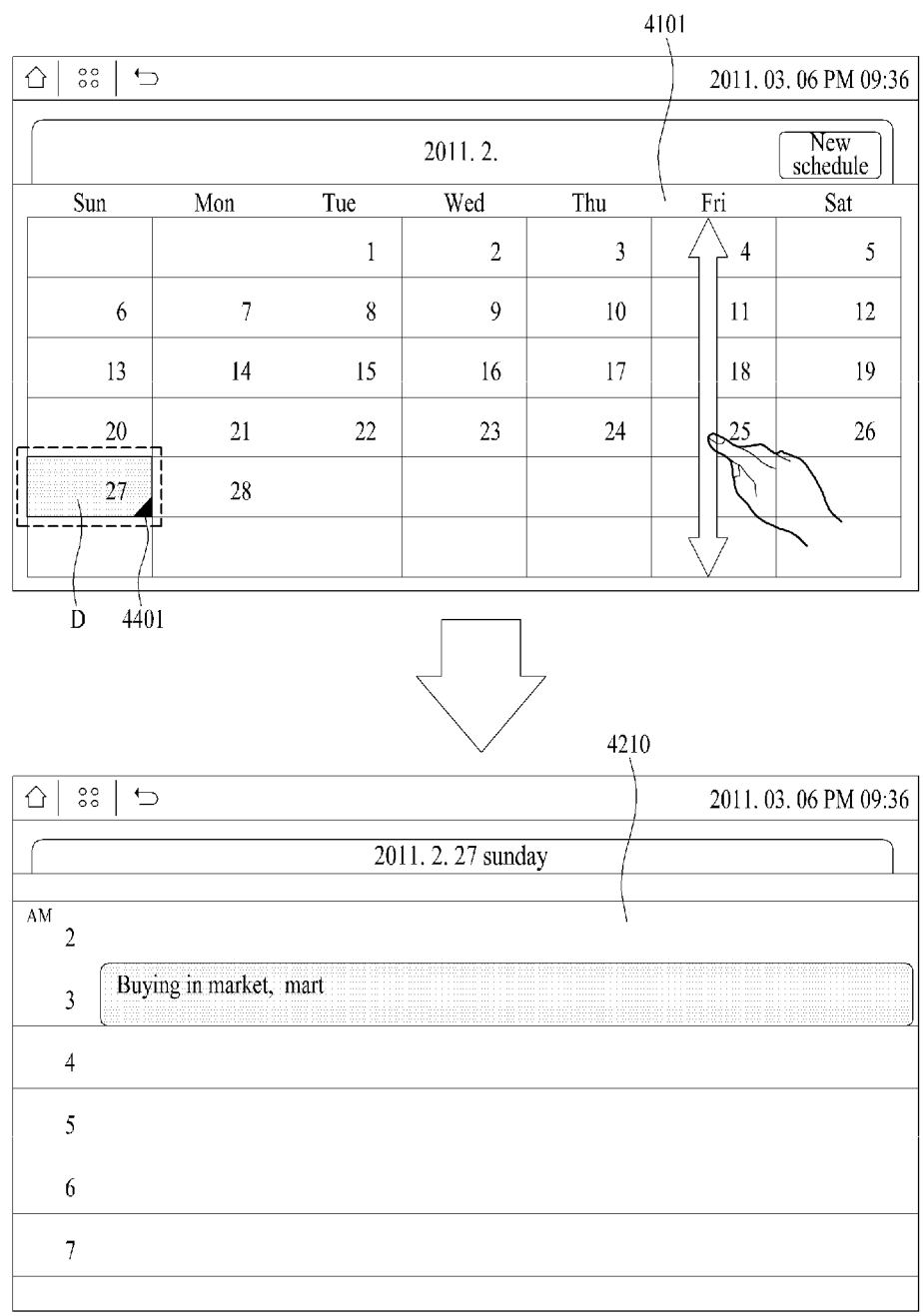
Figure 44B:
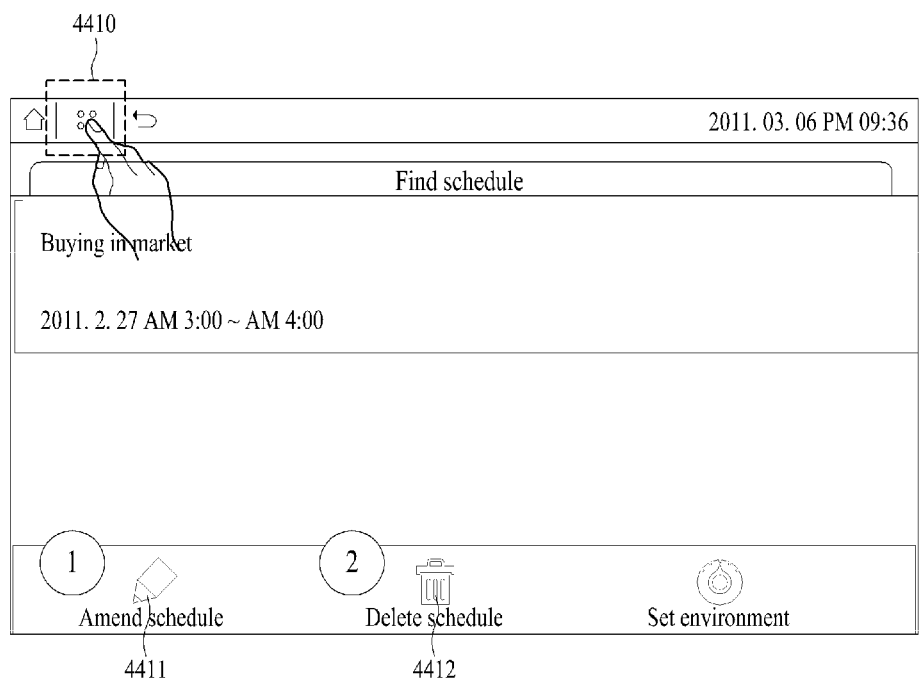

FIGS. 44A and 44B are views illustrating a process of amending or deleting the schedule input in advance on the display 241. As shown in FIG. 44A, a FIG. 4401 for an index is displayed at a date having an input schedule on the basic schedule picture 4101.

When a user scrolls the basic schedule picture 4101 in the vertical direction under the condition that the user touches the basic schedule picture 4101, a date D having a schedule to be changed may be displayed. When the user touches the date D having the schedule to be changed in this state, the schedule input window 4210 may be displayed in which the schedule is recorded, as shown in FIG. 44A.

As shown in FIG. 44B, when the user touches a schedule confirmation button 4410 displayed at the upper end of the schedule input window 4210 in the above state, a schedule amendment button 4411 and a schedule deletion button 4412 may be displayed at the lower end of the schedule input window 4210. When the user touches the schedule amendment button 4411, the detailed schedule information input window 4301 shown in FIG. 43 may be displayed, and the schedule may be amended through the detailed schedule information input window 4301 (Sequence 1). On the other hand, when the user touches the schedule deletion button 4412 (Sequence 2), the corresponding schedule may be deleted.

Figure 45:
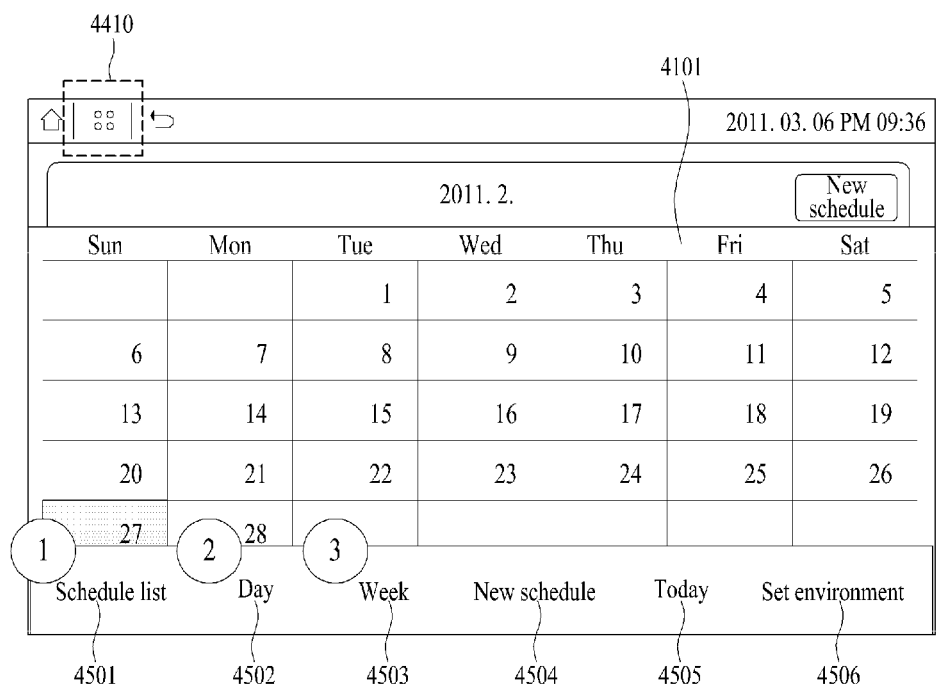

FIG. 45 and FIGS. 46A to 46C are views illustrating rapid schedule registration through the display 241. As shown in FIG. 45, when a user touches the schedule confirmation button 4410 on the basic schedule picture 4101, a schedule list button 4501, a daily search button 4502, a weekly search button 4503, a new schedule input button 4504, a today schedule search button 4505 and an environment setting button 4506 may be displayed at the lower end of the basic schedule picture 4101.

Figure 46A:
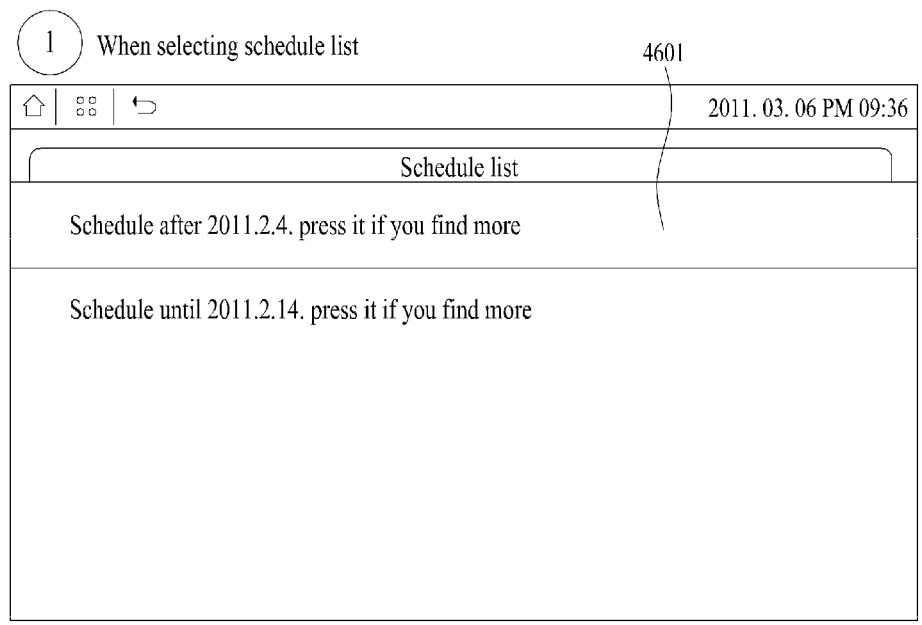
Figure 46B:
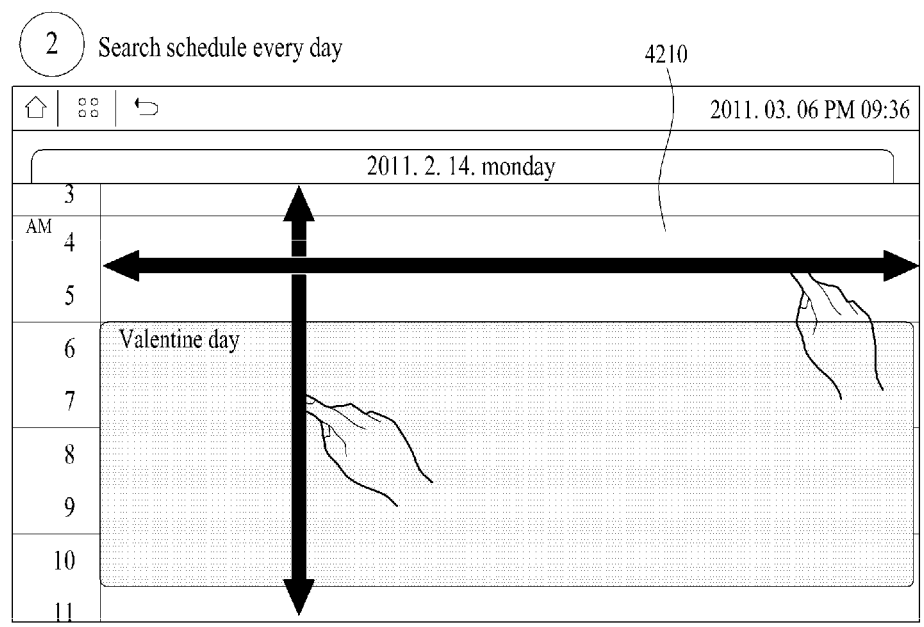

When the user selects and touches the schedule list button 4501 in this state (Sequence 1), a schedule list 4601 may be displayed which correspond to a schedule after a specific date, as shown in FIG. 46A. Further, when the user touches the daily search button 4502 of FIG. 45 (Sequence 2), a daily schedule input window 4210 may be displayed, as shown in FIG. 46B, and the daily schedule may be searched.

When the user moves the daily schedule input window 4210 up and down under the condition that the user maintains touch with the daily schedule input window 4210, schedule in time zones of a specific date may be searched, and when the user moves the daily schedule input window 4210 right and left under the condition that the user maintains touch with the daily schedule input window 4210, a date is changed to another date, and schedule in time zones of the changed date may be searched.

Figure 46C:
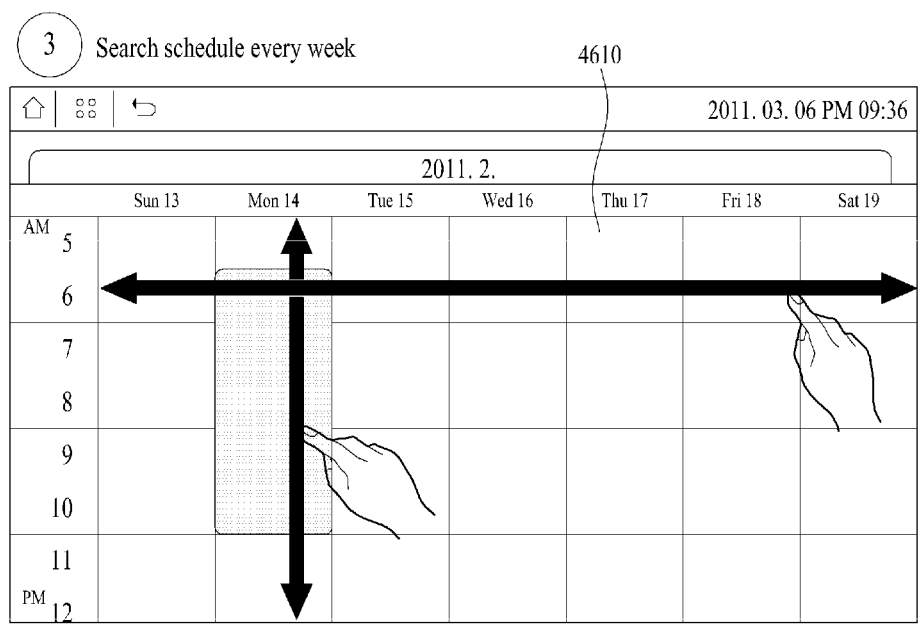

Further, when the user selects and touches the weekly search button 4503 of FIG. 45 (Sequence 3), a weekly schedule list 4610 may be displayed, as shown in FIG. 46C. Here, seven dates forming one week are displayed in the horizontal direction, and time zones of the respective dates are displayed in the vertical direction.

When the user moves the weekly schedule list 4610 up and down under the condition that the user maintains touch with the weekly schedule list 4610, schedule in time zones of the respective seven dates belonging to a specific week may be searched, and when the user moves the weekly schedule list 4610 right and left under the condition that the user maintains touch with the weekly schedule list 4610, a week is changed to another week, and schedule in time zones of the dates of the changed week may be searched.

Memo Management

Figure 47:
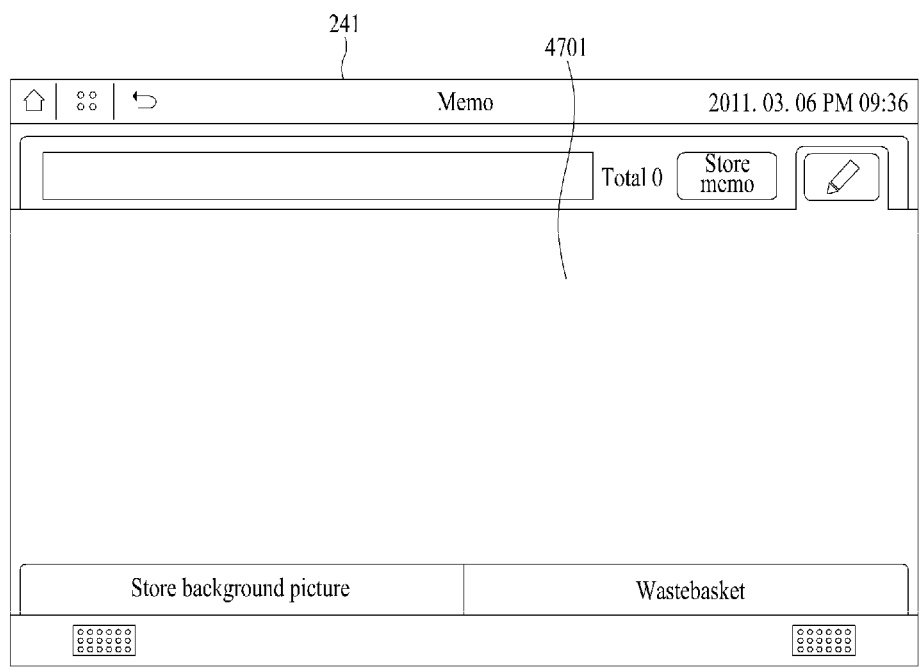

FIGS. 47 to 52B are views illustrating processing a user's memo through the display 241. When a user touches the memo button 647 (with reference to FIG. 6) of the main menu of the display 241, an initial memo screen 4701 may be displayed, as shown in FIG. 47.

Figure 48A:
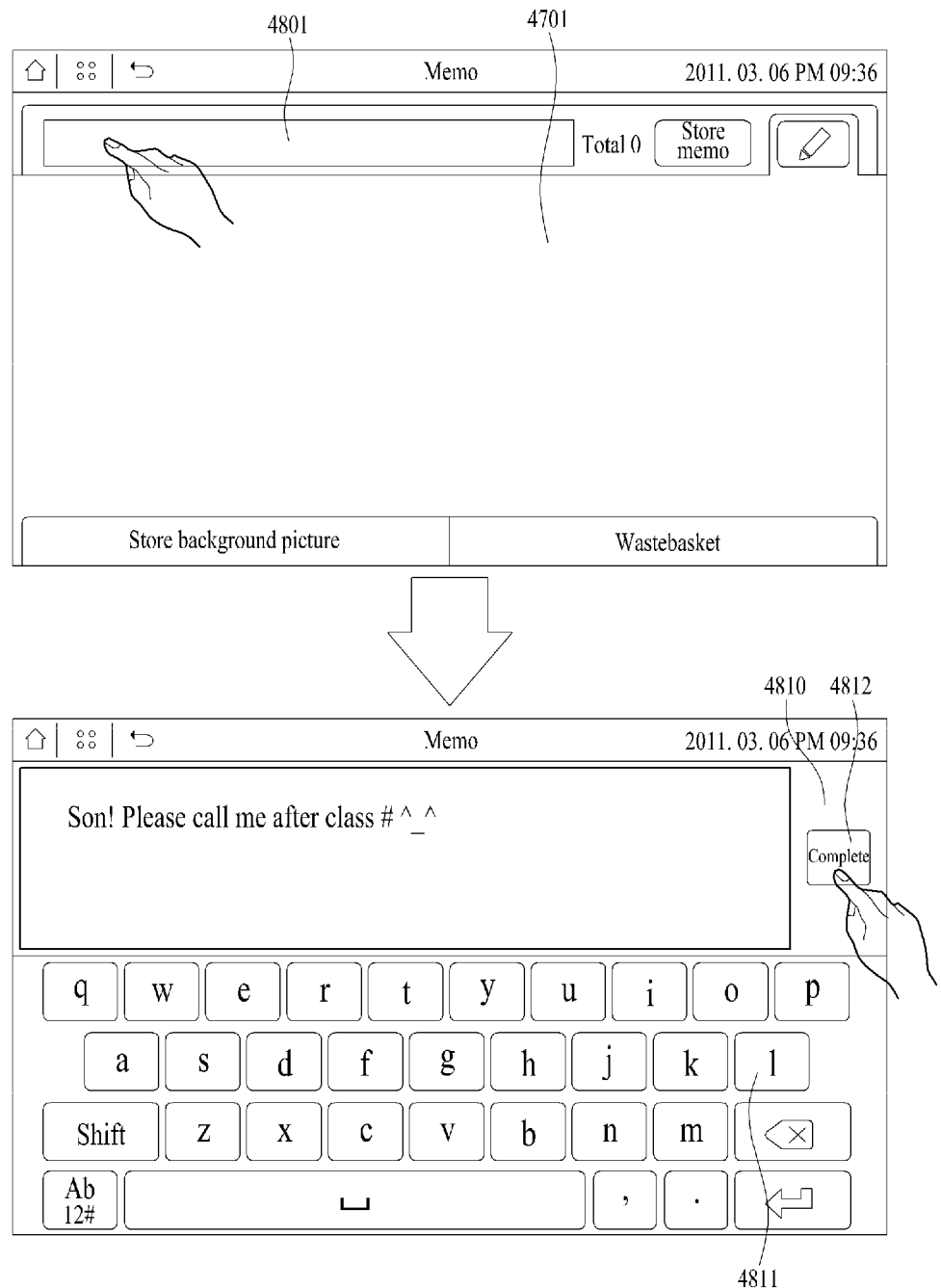
Figure 48B:
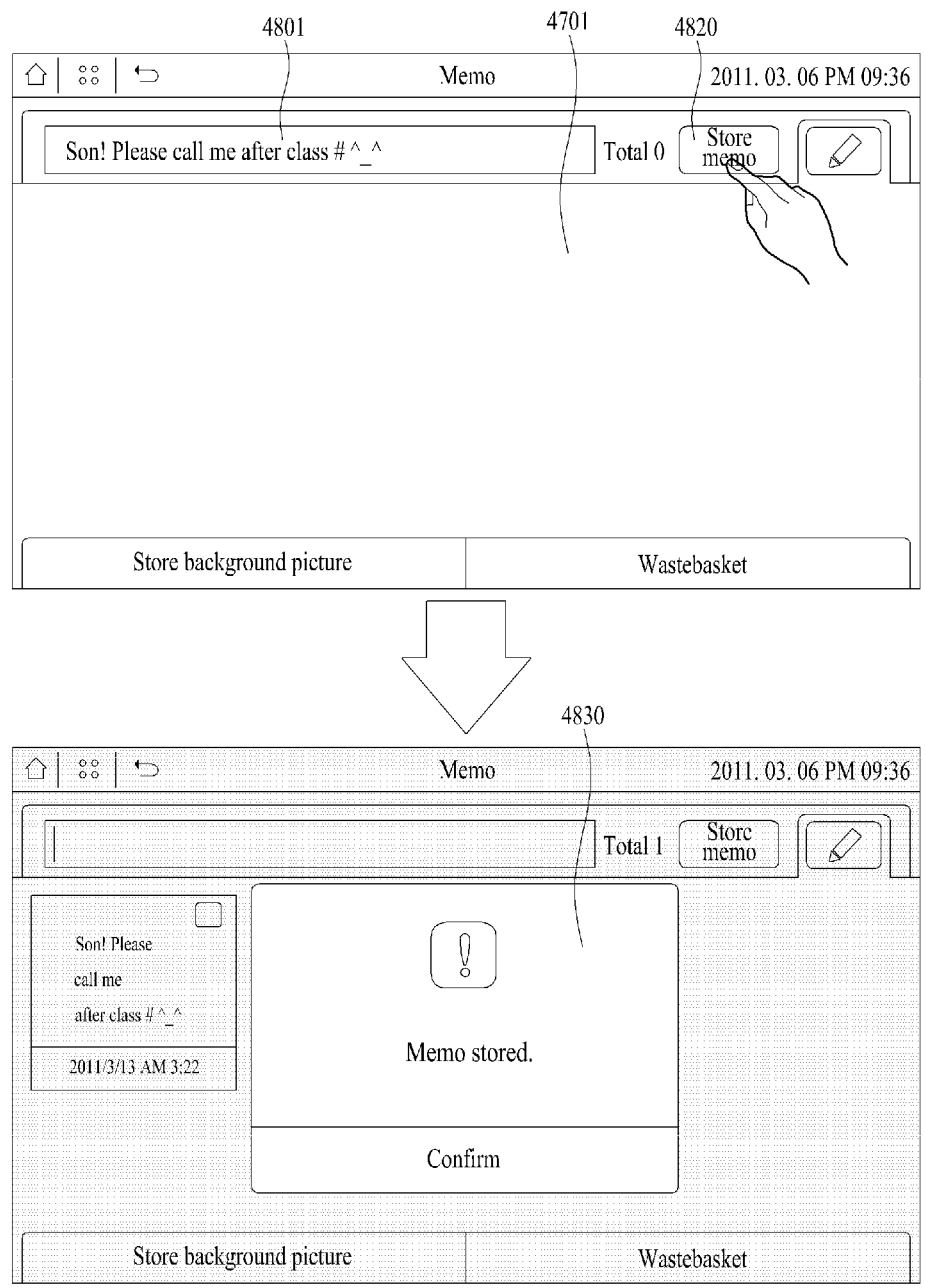

As illustrated in FIG. 48A, when the user touches the memo input window 4801 on the initial memo screen 4701, the initial memo screen 4701 is switched to a text input keyboard screen 4810. When the user inputs a sentence on the text input keyboard screen 4810 using a text keyboard 4811 and then touches a completion button 4812, the text input keyboard screen 4810 is again switched to the initial memo screen 4701, and the sentence input on the test input keyboard picture 4810 is displayed on the memo input window 4801, as shown in FIG. 48B. If the user confirms the sentence, i.e., a memo, and judges that there is nothing wrong, when the user touches a memo storage button 4820 at the side of the memo input window 4801, the memo is stored and a memo storage confirmation window 4830 is displayed.

Figure 49B:

FIGS. 49A and 49B are views illustrating input of a picture or a memo using a handwriting input rather than the text keyboard 4811. As shown in FIG. 49A, when the user touches a drawing button 4901 provided at the right side of the initial memo screen 4701, the initial memo screen 4701 is switched to a drawing memo screen 4910.

The user may draw a memo by touching the drawing memo picture 4910. Here, the user may draw a memo within a frame 4911 shown by a dotted line (a), may touch a line width setting button 4912 to set a line width (b), and may press an eraser button 4913 to erase the drawn memo (c).

Further, the user may touch a color selection button 4914 to determine a line color (d), and may touch an initialization button 4915 to delete all of drawn memos (e) when the user desires to erase all of the drawn memos at once. When memo drawing has been completed, the user may touch a storage button 4916 to store the drawn memo (f), and may touch a cancellation button 4917 to cancel the drawing memo (g). That is, as shown in FIG. 49B, when memo drawing has been completed, the user may touch the storage button 4916 to store the handwritten memo.

Figure 50:
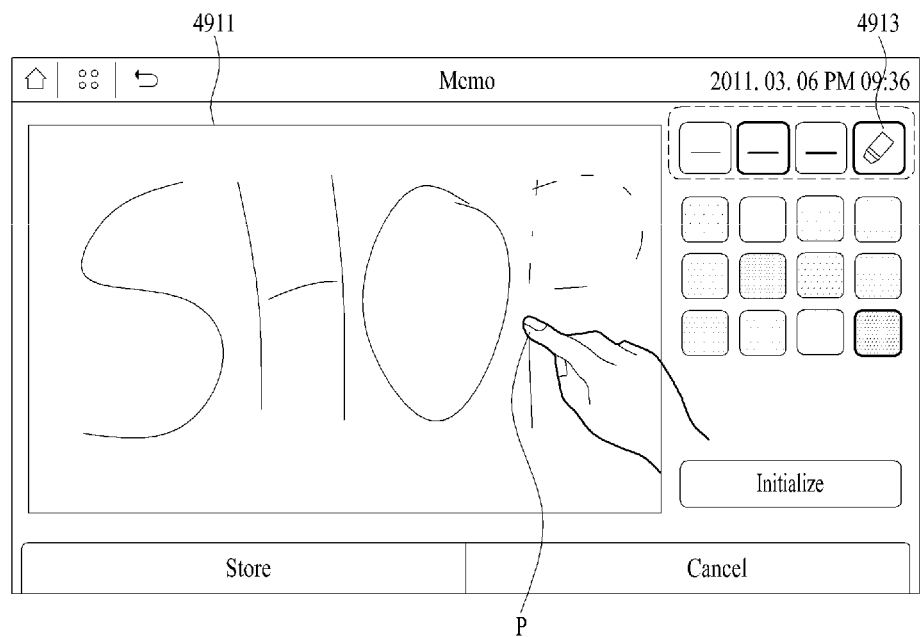

FIG. 50 is a view illustrating a process of erasing a drawn memo. The user may erase the drawn memo by touching the eraser button 4913 and touching a portion P desired to be erased up, down, right and left, i.e., in all directions.

Figure 51A:
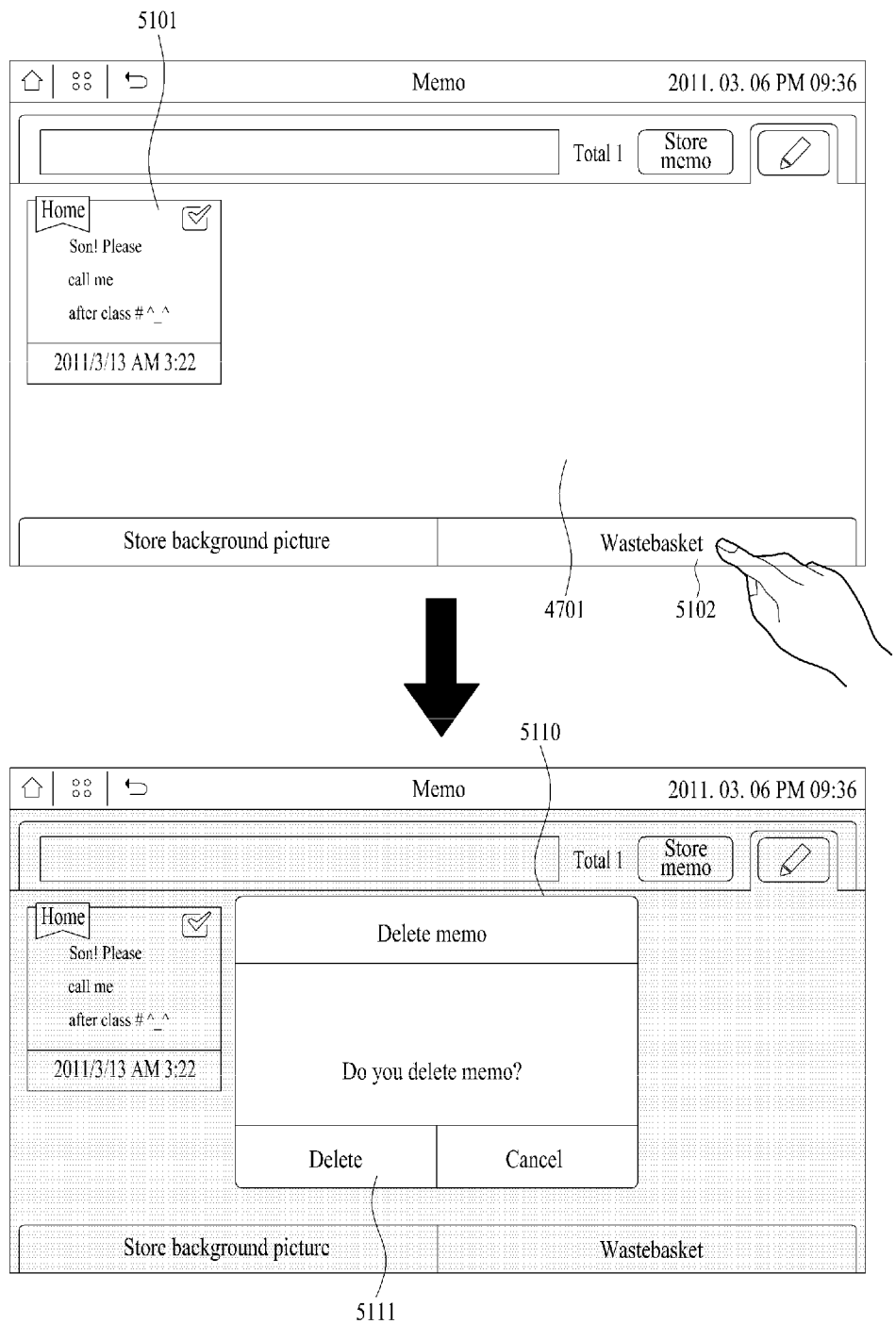
Figure 51B:
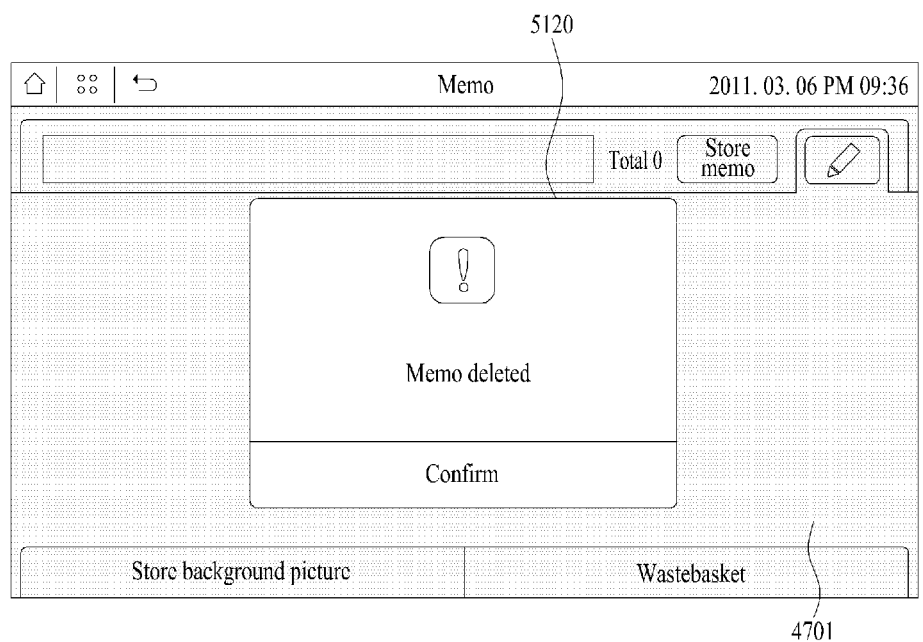

FIGS. 51A and 51B are views illustrating a process of deleting an unnecessary memo. As shown in FIG. 51A, a stored memo is displayed in a virtual Post-it shaped memo display window 5101 on the initial memo picture 4701. When a user touches an unnecessary memo in this state and touches a wastebasket button 5102, a popup window 5110 may be displayed to confirm whether or not the memo is to be deleted. As shown in FIG. 51B, when the user touches a deletion button 5111 in this state, a popup window 5120 may be displayed confirming deletion of the memo, and thereby the process of deleting the unnecessary memo has been completed.

Figure 52B:
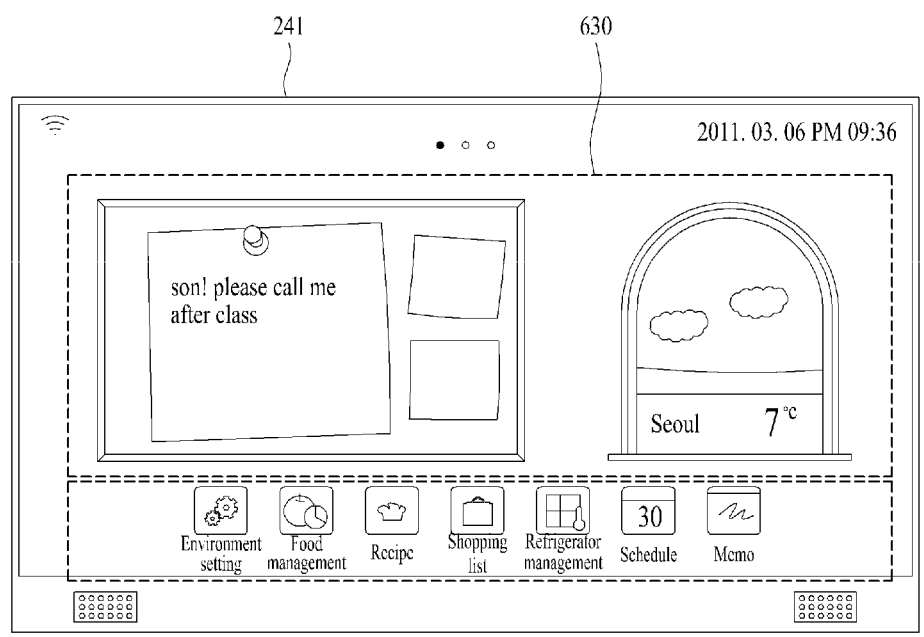

FIGS. 52A and 52B are views illustrate storage of a memo in a background picture of the display 241 such that the stored memo is displayed on the widget on the home screen. As shown in FIG. 52A, a user may select the particular memo display window 5101 displayed on the initial memo picture 4701 (Sequence 1). The user may then select a background picture storage button 5110 provided at the lower end of the initial memo picture 4701 (Sequence 2). In this case, an indicator indicating 'Home' is displayed at the upper end of the selected memo, and a color of the selected memo may be discriminated from colors of other regions.

Thereafter, when the user touches a home screen button 5111 displayed as the upper end of the initial memo screen 4701 (Sequence 3), the contents of the memo recorded on the selected memo display window 5105 may be displayed on the widget on the background picture on the home screen, as shown in FIG. 52B.

Display Setting

Figure 53A:
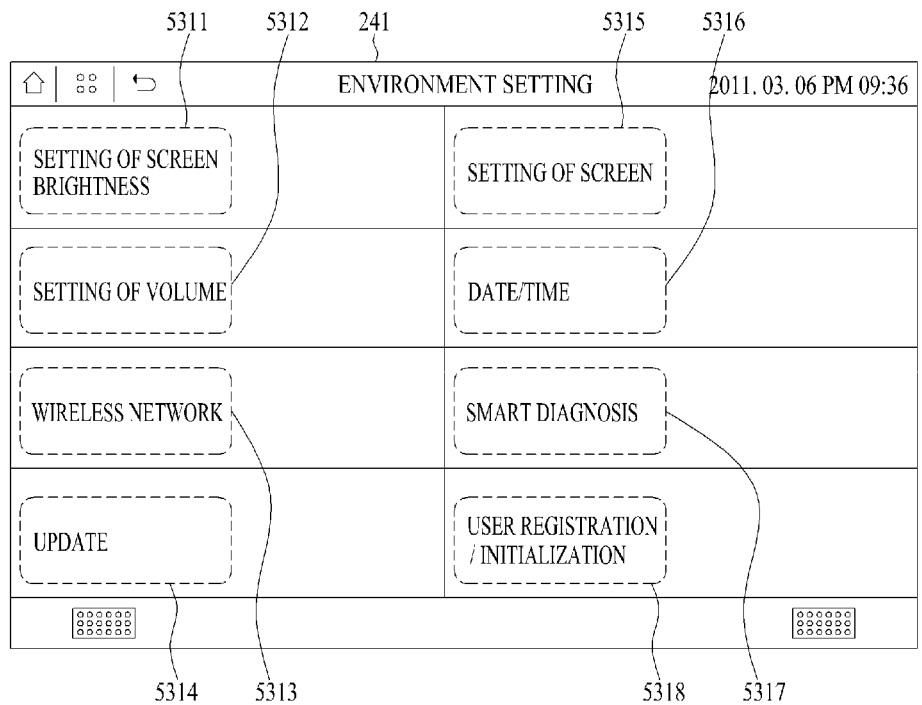
FIG. 53A is a view illustrating a environment setting menu displayed on the display in accordance with the present disclosure.

FIG. 53A is a view illustrating a main environment setting picture to set the environment of the display 241. When a user touches the environment setting button of the main menu shown in FIG. 6, the main environment setting screen is displayed on the display 241. Here, a total of 8 sub-menus may be displayed on the main environment setting screen 5301.

The 8 sub-menus may include menus regarding a screen brightness setting button 5311, a volume setting button 5312, a wireless network setting button 5313, an update button 5314, a screen setting button 5315, a date/time setting button 5316, a smart diagnosis button 5317 and a user registration/initialization setting button 5318.

Figure 53B:
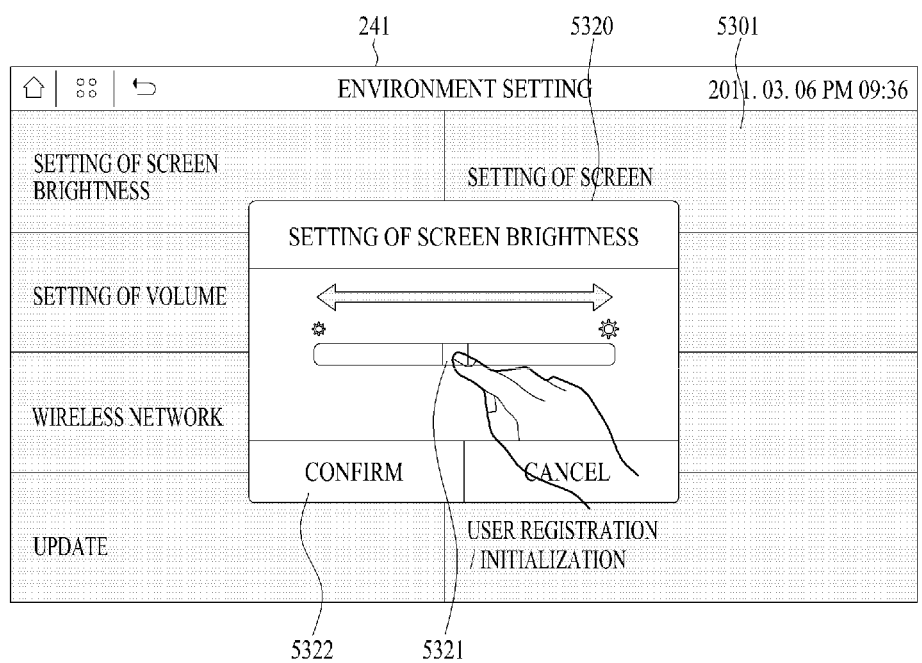
FIG. 53B is a view illustrating execution of setting of screen brightness on the display in accordance with the present disclosure.

When the user touches the screen brightness setting button 5311, a screen brightness setting popup window 5320 is displayed, as shown in FIG. 53B. A scroll bar 5321 to adjust screen brightness may be displayed on the screen brightness setting popup window 5320. The user may move the scroll bar 5322 to right and left to set desired brightness and then may touch a confirmation button 5322 to save the changes to the screen brightness.

Figure 54:
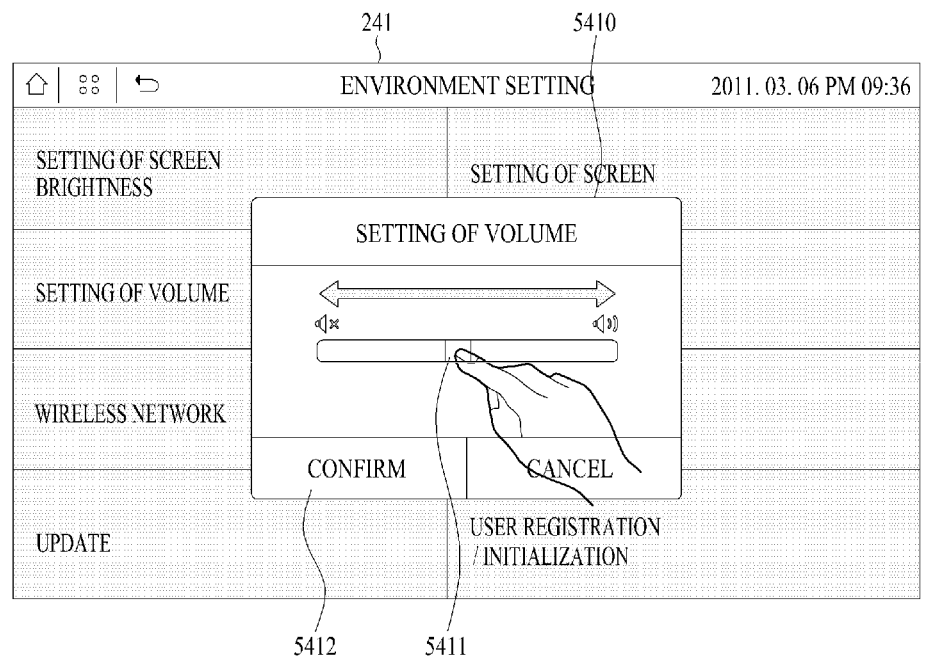
FIG. 54 is a view illustrating setting a volume level on the display in accordance with the present disclosure.

FIG. 54 is a view illustrating a process of setting volume. When the user touches the volume setting button 5312 shown in FIG. 53A, a volume setting popup window 5410 to set volume may be displayed, as shown in FIG. 54. A scroll bar 5411 may be displayed to adjust the intensity of volume on the volume setting popup window 5410. When the user moves the scroll bar 5411 to right and left to adjust the volume level and then touches a confirmation button 5412, adjustment of volume is completed.

Wireless Network Setting

Figure 55A:
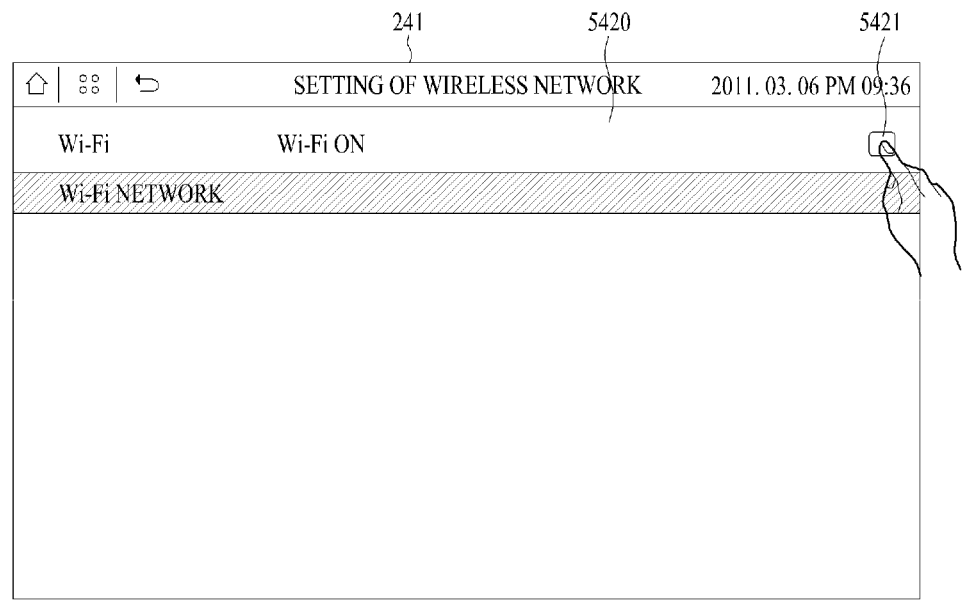

FIG. 55A illustrates a wireless network setting screen 5420. When a user touches the wireless network setting button 5313 shown in FIG. 53A, the wireless network setting screen 5420 is displayed on the display 241. Here, although this embodiment illustrates use of a Wi-Fi system as a wireless network, the present disclosure is not limited thereto and other appropriate types of wireless network protocols may be implemented. In order to set the wireless network, the user may touch a Wi-Fi on box button 5421, as shown in FIG. 55A.

Figure 55B:
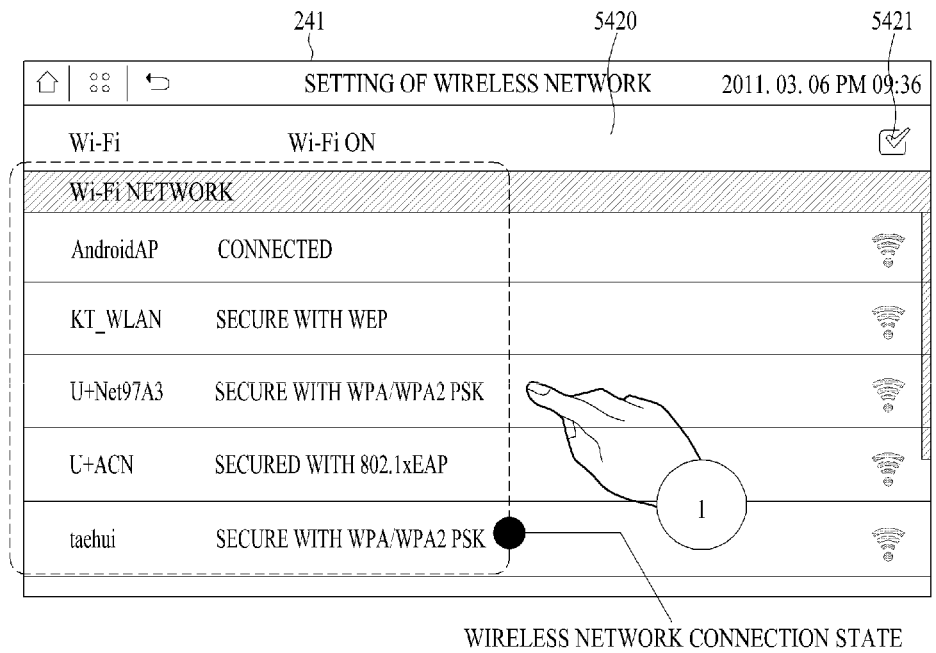
Figure 55C:
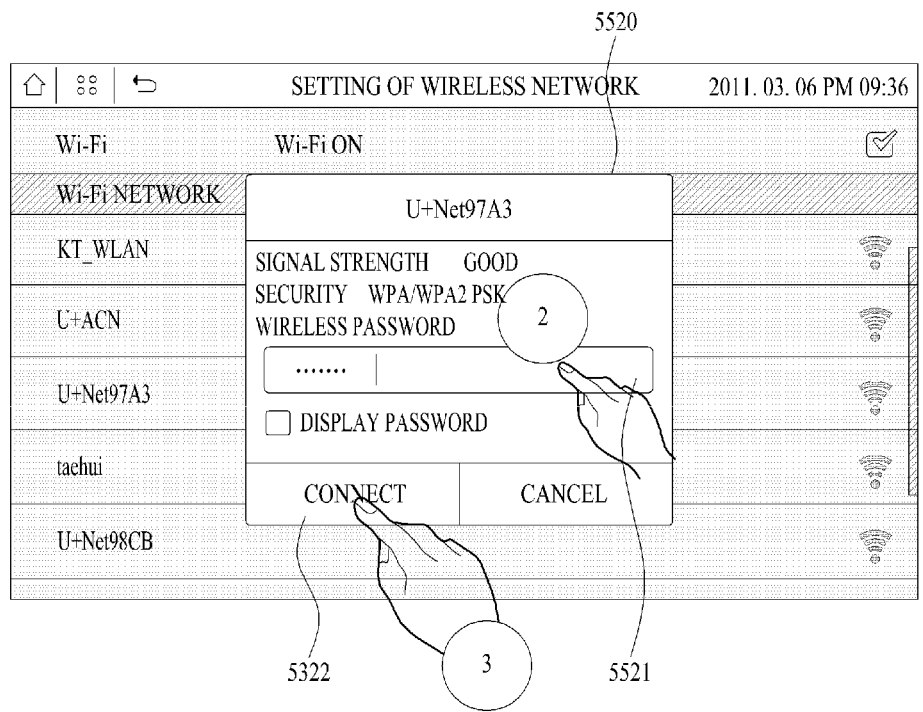

FIGS. 55B and 55C and FIG. 56 are views illustrating a detailed process of connecting to the wireless network. When the user or a worker selects and touches a wireless network of an actual place (Sequence 1), as shown in FIG. 55B, a wireless password popup window for connection with the wireless network is displayed, as shown in FIG. 55C (here, U+ Net97A3 is an ID number of a wireless sharer). Then, the user inputs a password on the wireless password popup window (in the case of setting of a password of the wireless sharer) (Sequence 2). When the user touches a connection button 5522 (Sequence 3) after input of the password has been completed, connection of the wireless network is completed, as shown in FIG. 56.

Figure 57A:
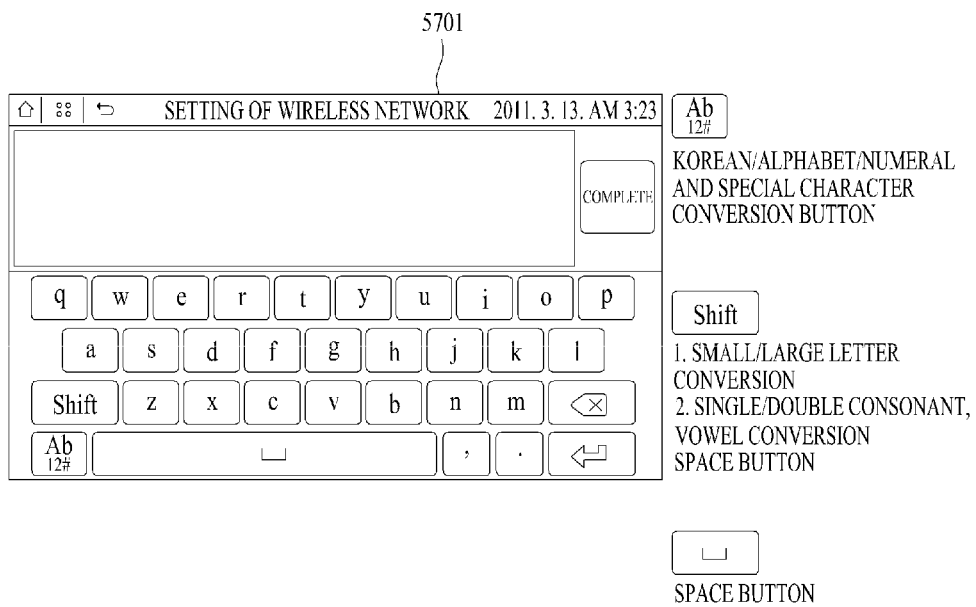
Figure 57B:
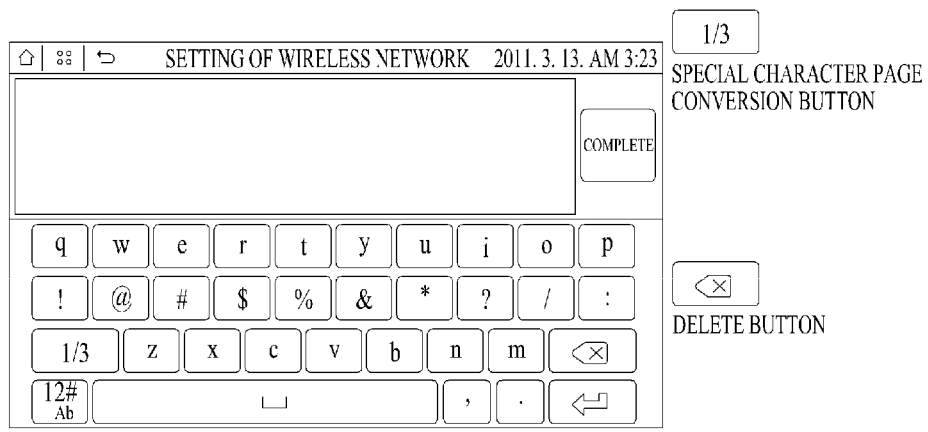

FIGS. 57A and 57B are views illustrating a wireless password keyboard, and the wireless password keyboard may be converted between Korean, alphabet and numeral. Various types of passwords may be set using conversion keys and special function keys shown in FIGS. 57A and 57B.

Information Update

Figure 58A:
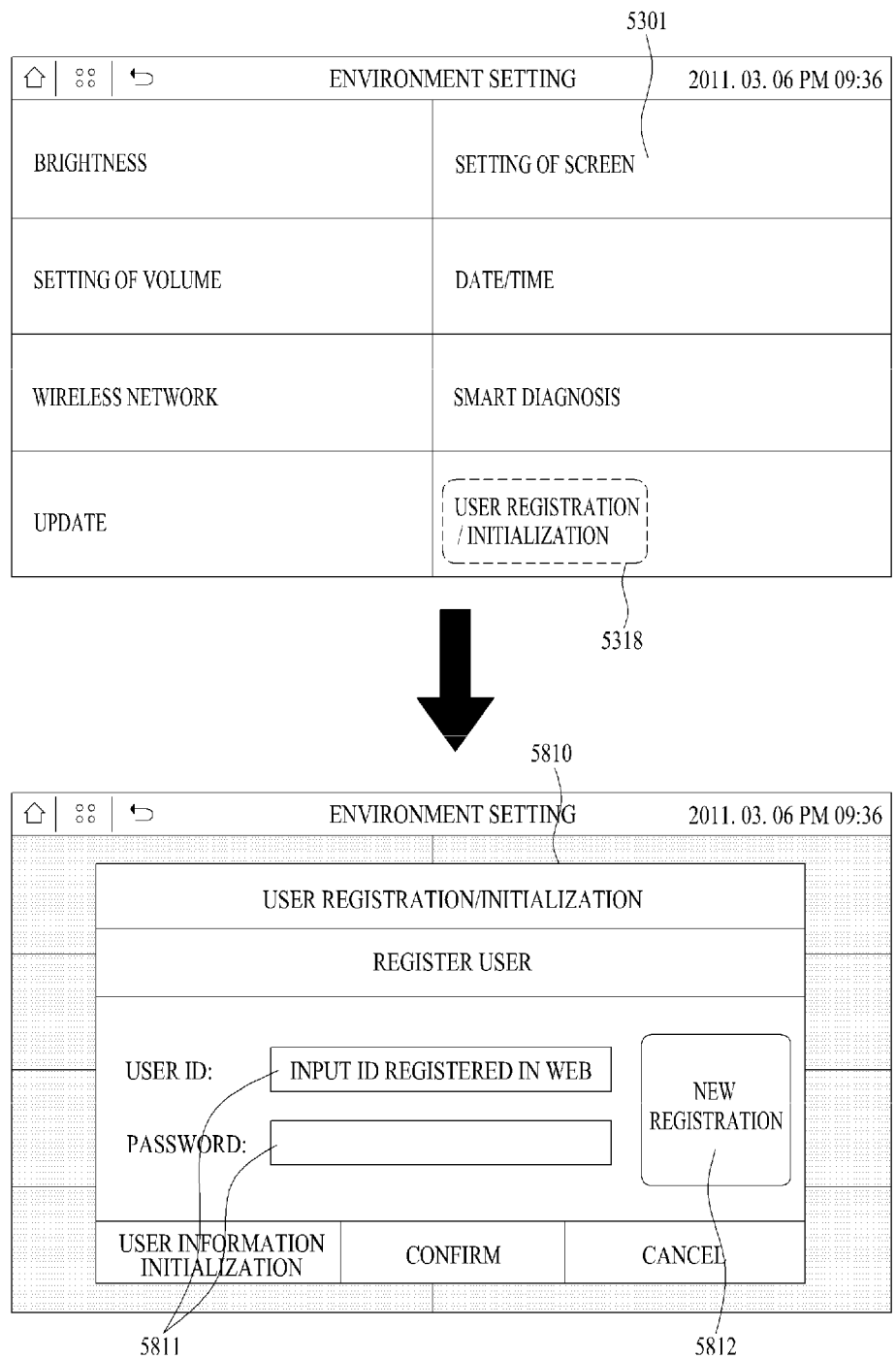
FIGS. 58A to 61 are views illustrating update of information on the display in accordance with the present disclosure.
Figure 58B:
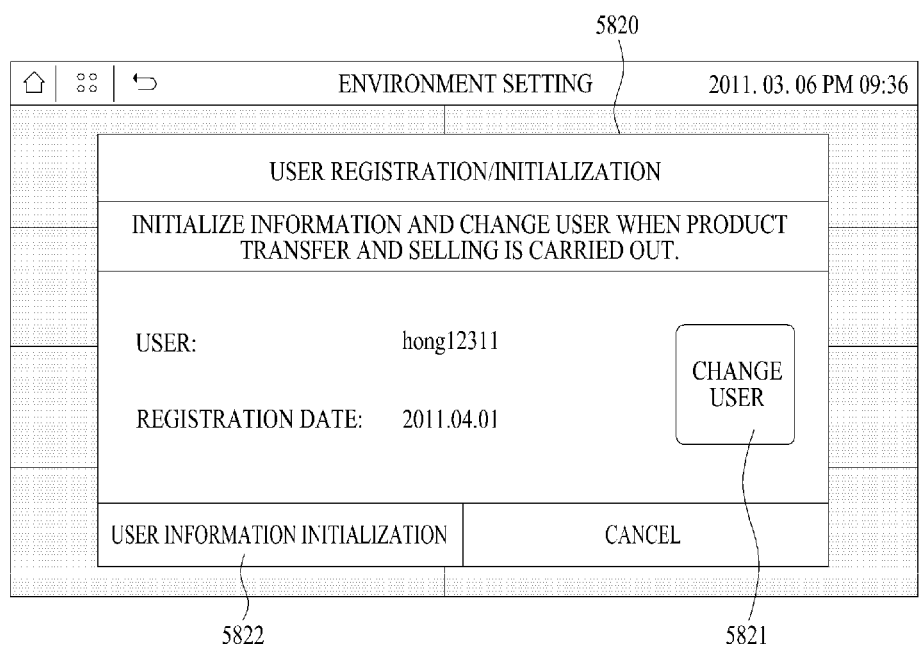

FIGS. 58A and 58B are views illustrating a process of confirming user registration to update information, such as firmware or recipes. As shown in FIG. 58A, when a user touches the user registration/initialization button 5318 on the initial environment setting screen 5301, a user registration and initialization popup window 5810 may be displayed, if the user not been registered.

The user may execute user registration by inputting an ID and a password which were given to the user when the user purchases the refrigerator, or an ID and a password which were input through a homepage of a manufacturer, on the user registration and initialization popup window 5810, and touching a new registration button 5812. On the other hand, if the user has been registered, a picture shown in FIG. 58B is displayed, and the user ID and password are displayed on the picture.

In this state, when user change is required, the user touches a user change button 5821 to execute user change, and when initialization of user information is required, the user touches a user information initialization button 5822. The recipes as well as other information, such as power management settings, may be customized and stored based on the user account.

Figure 59A:
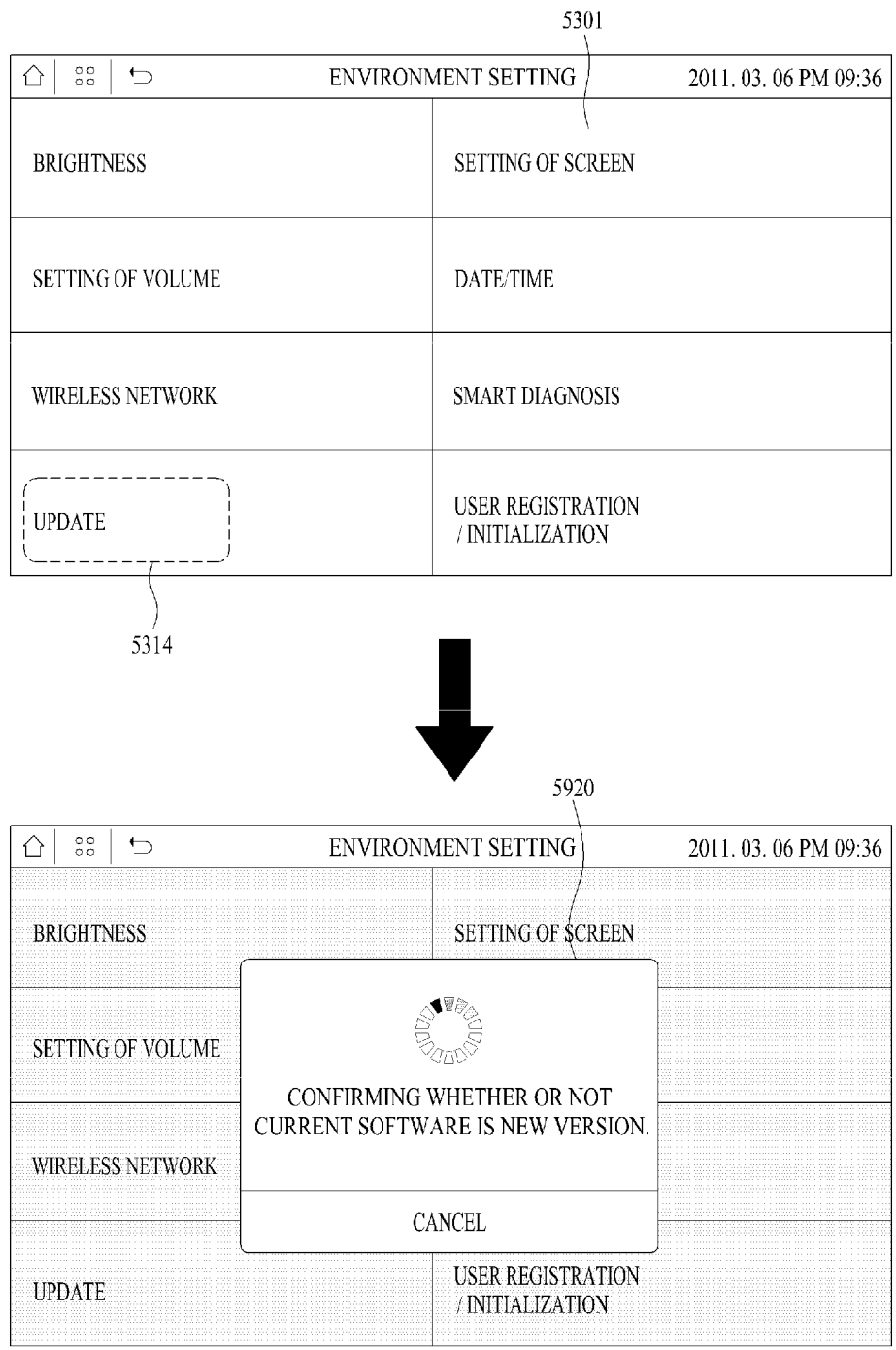

FIG. 59A is a view illustrating update of firmware or recipes on the display. After user registration has been confirmed or completed, when the user touches the update button 5314 on the initial environment setting screen 5301, as shown in FIG. 59A, a version confirmation popup window 5920 to confirm whether or not current software is the latest version, as shown in FIG. 59B.

Figure 59B:
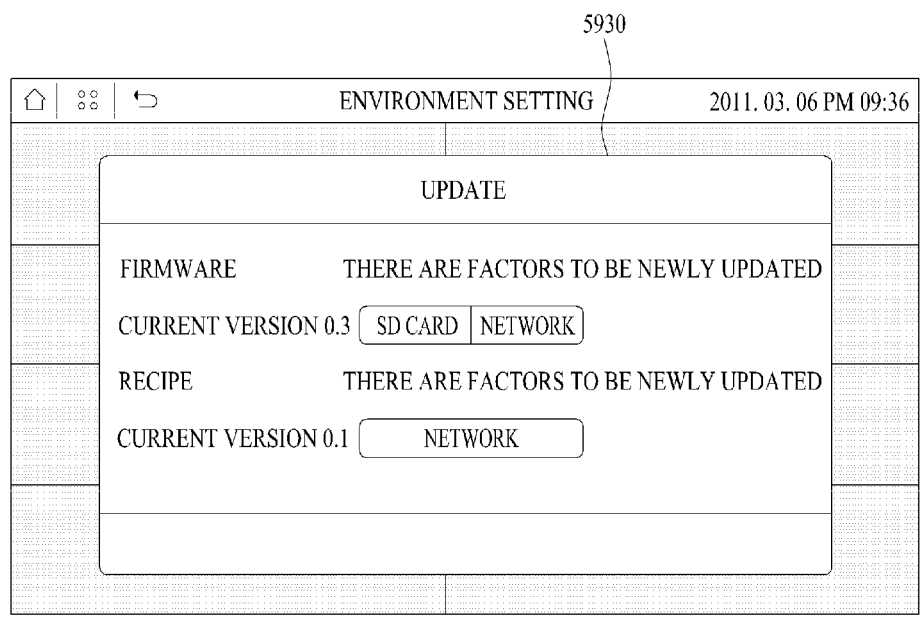

When confirmation has been completed, an update confirmation popup window 5930 is displayed, as shown in FIG. 59B. The current versions of the firmware and the recipes and whether or not there are factors or items related to the firmware and the recipes for update may be displayed on the update confirmation popup window 5930.

Figure 60:
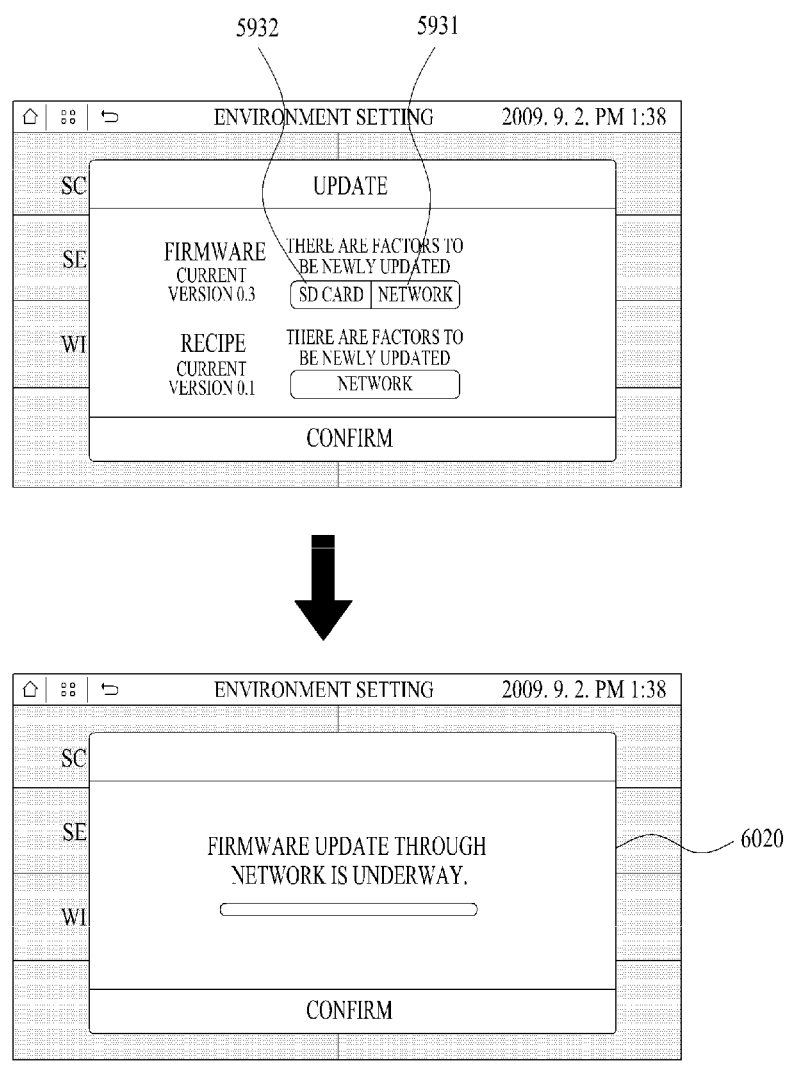

In this state, if update of the firmware is required, the user may select a network button 5931, as shown in FIG. 60. In this case, an update progress popup window 6020 may be displayed while update through the wireless network progresses. After update has been completed, rebooting may be automatically executed.

In order to update the firmware using an SD memory card other than the network, the user may update the firmware by inserting the SD memory card in which updated firmware is stored into the insertion slot 245 (with reference to FIG. 4) and then touching an SD card button 5932. Also, in this case, after update has been completed, rebooting may be automatically executed.

Figure 61:
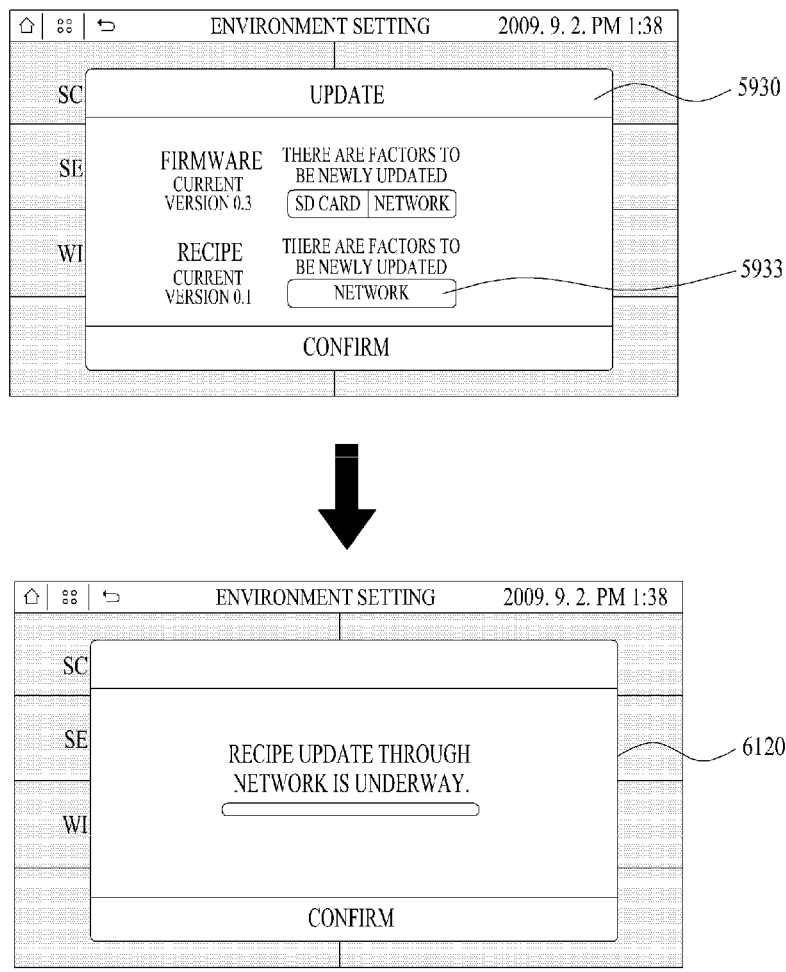

If a message 'there are factors of recipes to be updated' is displayed on the update confirmation popup window 5930, the user may select a network button 5933 related with recipe update, as shown in FIG. 61. When the user touches the network button 5933, an update progress popup window 6120 may be displayed, as shown in FIG. 61, and when update has been completed, the display is returned to the initial environment setting picture 5301, as shown in FIG. 53A.

Screen Setting

Figure 62:
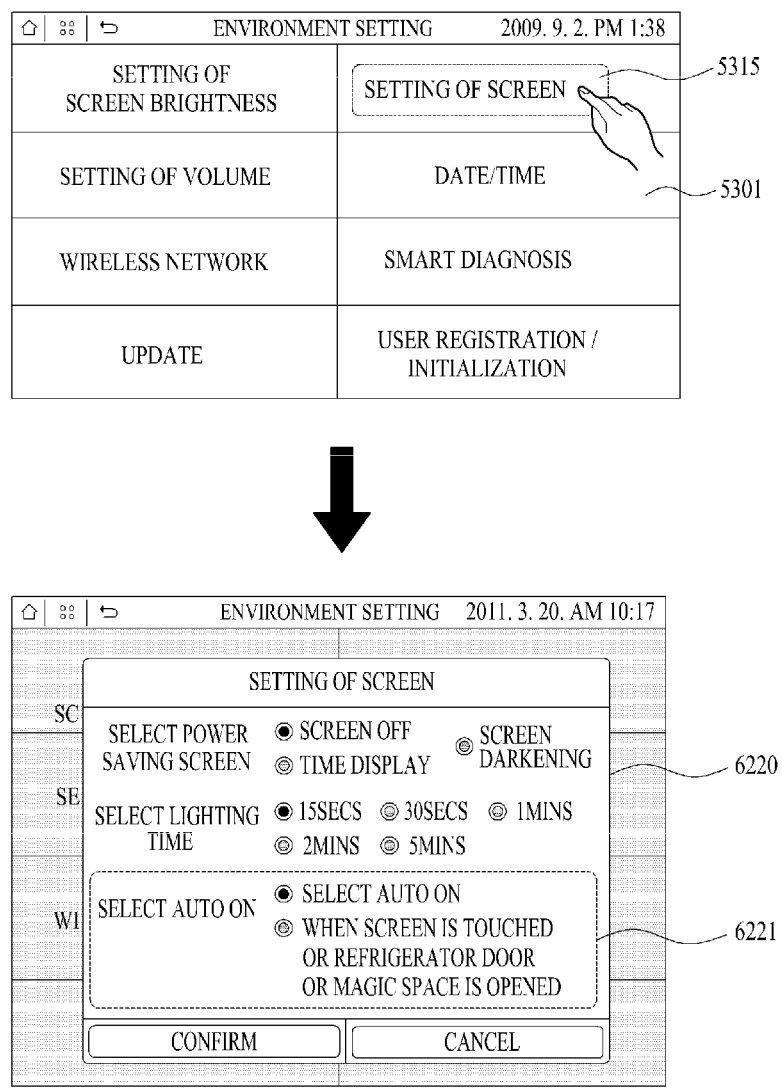
FIGS. 62 and 63 are views illustrating configuring screen settings on the display in accordance with the present disclosure.
Figure 63:
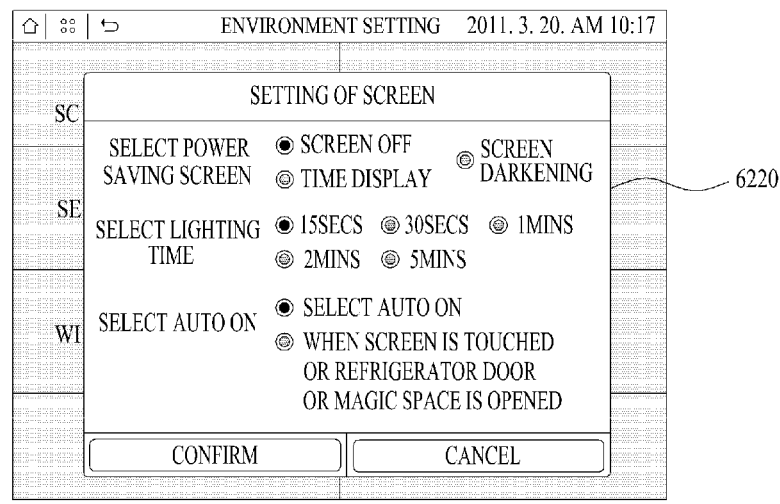

A power saving screen or a lighting time may be selected through screen setting. In order to execute screen setting, a user touches the screen setting button 5315 on the initial environment setting screen 5301, as illustrated in FIG. 62.

When the user touches the screen setting button 5315, a screen setting popup window 6220 is displayed. The user may select a power saving screen option, a lighting time option and an auto on option on the screen setting popup window 6220.

The power saving screen mode controls the display to enter power saving (e.g., turn off, dim) after a predetermined amount of time since user access on the display. The user may select one of OFF of the screen, lowering of the intensity of illumination of the screen, or display of time.

Further, the user may select auto ON, as shown in a portion 6221 shown by a dotted line on the screen setting popup window 6220. Auto ON means the case in which the display is automatically brightened when the user touches and the case in which the display is automatically brightened when the user touches or the door or the sub-storage chamber of the refrigerator (expressed as the magic space in this embodiment).

If the user selects the power saving screen option on the screen setting popup window 5220, when the user selects screen OFF or screen darkening, the screen is turned off or darkened after a designated period of time. In this case, if the screen is touched again, the screen is in a locked state and thus a corresponding touch command is not executed even though the user touches the screen.

Figure 64:
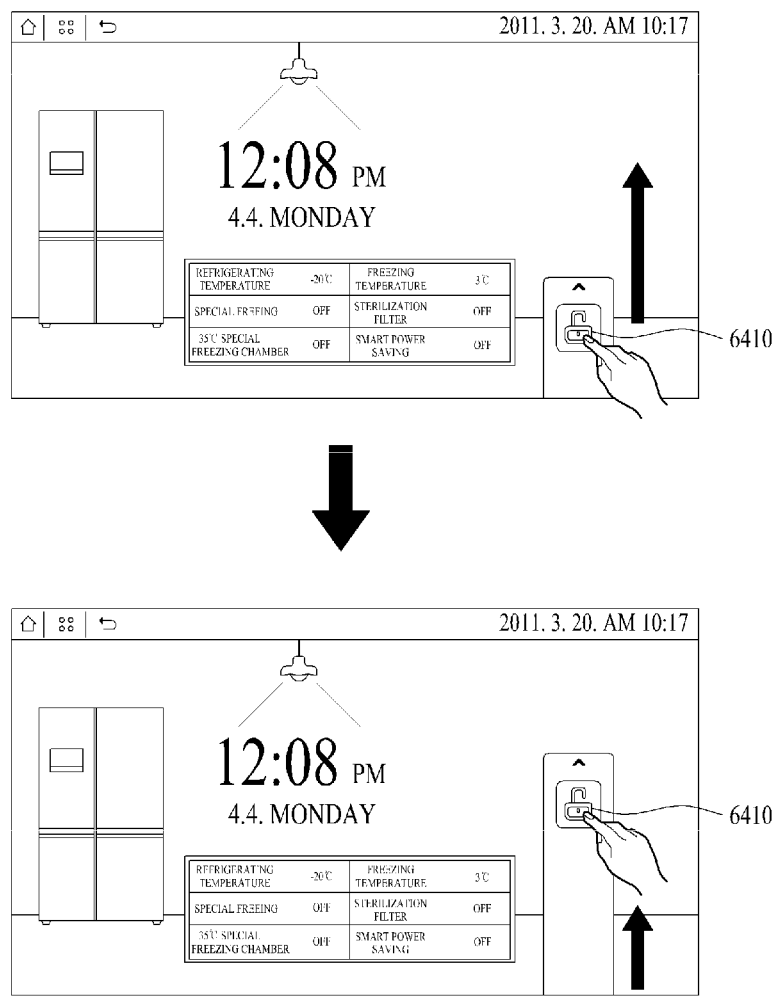
FIG. 64 is a view illustrating release of screen locking on the display in accordance with the present disclosure.

In order to release the locking state of the screen, when the user moves his/her finger upward under the condition that the user maintains touch with a lock release button 6410, the screen of the display is returned to the picture prior to locking setting, as shown in FIG. 64. When the display is returned to the picture prior to the screen lock setting, if the user touches a specific button, a result of touch may be again displayed on the display.

Figure 65:
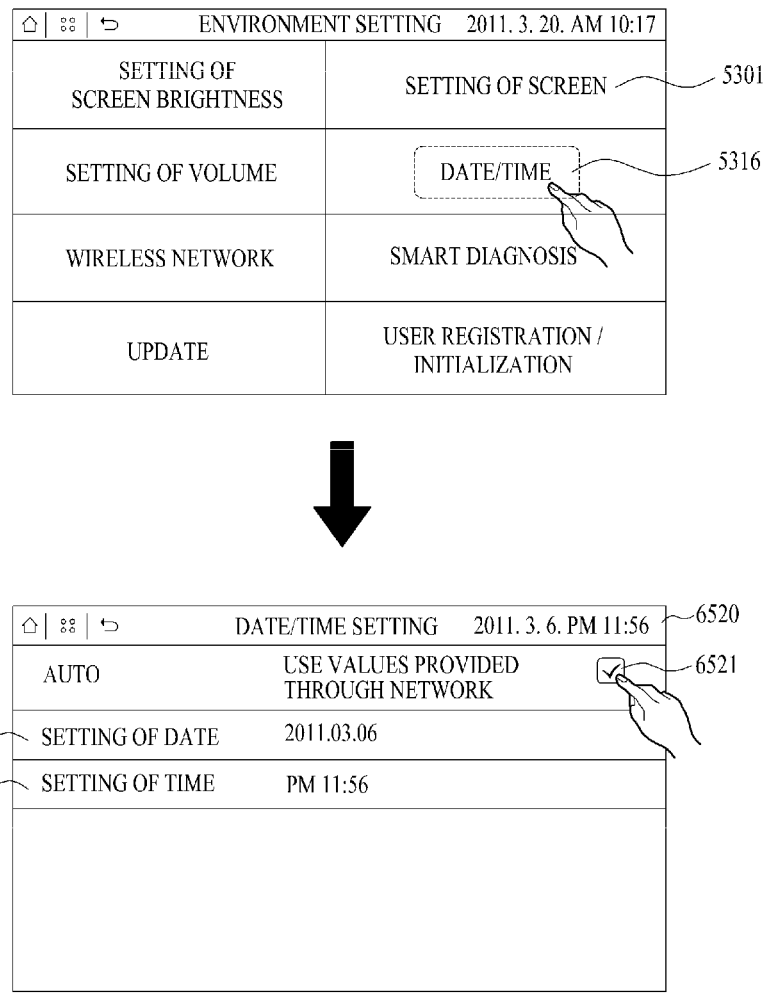
FIGS. 65 and 66 are views illustrating setting of date or time on the display in accordance with the present disclosure.

In order to set date or time on the screen of the display, the user touches the date/time button 5316 on the initial environment setting picture 5301, as shown in FIG. 65. As a result of the touch input, the initial environment setting screen 5301 is switched to a date/time setting screen, and date and time are displayed on the corresponding picture.

Figure 66:
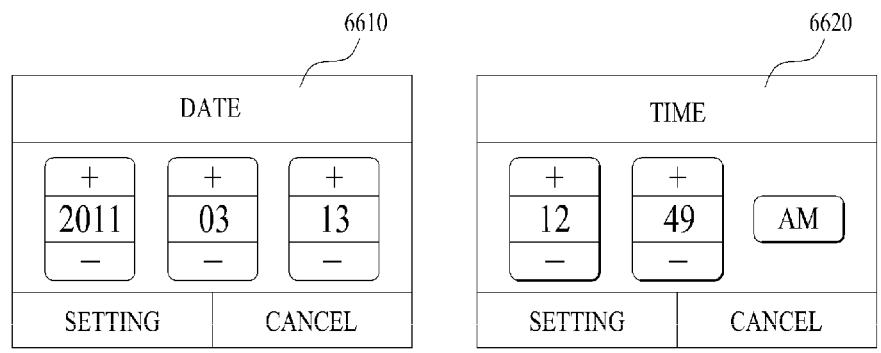

When the user selects the option to use values provided through the network for the date/time setting picture, date and time information is received through the wireless network and is applied to the display. If the user directly sets date or time, the user touches a date setting area 6522 or a time setting area 6523. In response to the selection of the date setting area 6522 or time setting area 6523, a date setting popup window 6610 or a time setting popup window 6620 may displayed, as shown in FIG. 66. The date or time may be set using buttons provided on these popup windows 6610 and 6620.

Figure 67:
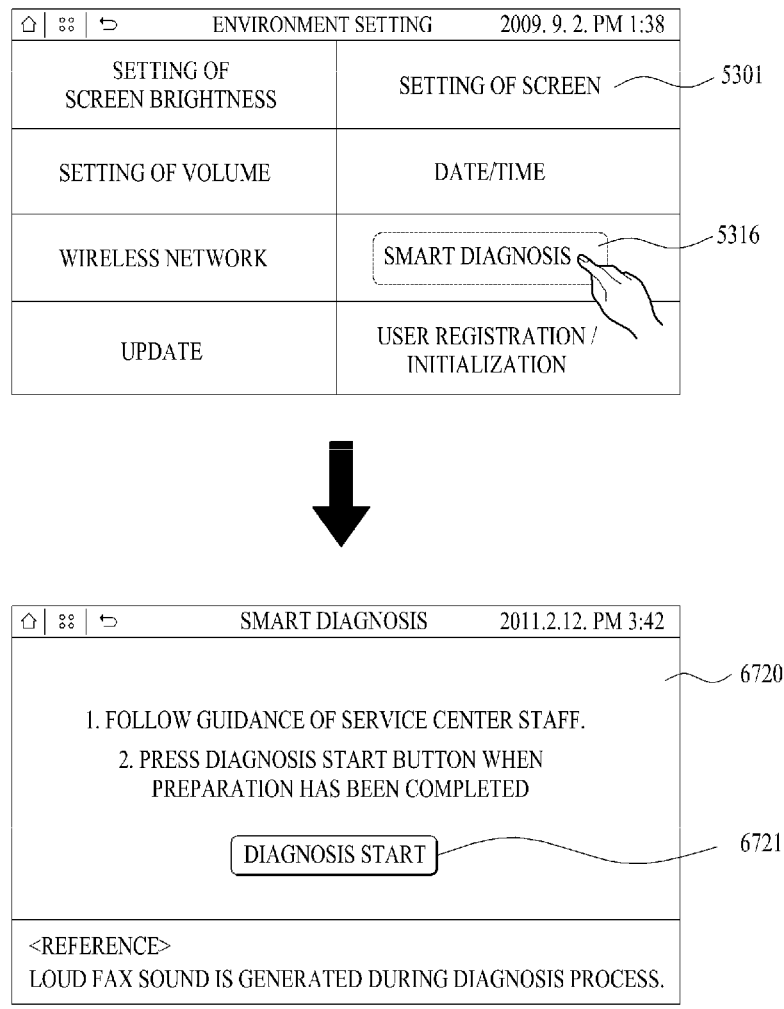
FIGS. 67 and 68 are views illustrating execution of smart remote diagnosis through a voice signal and the display in accordance with the present disclosure.

FIG. 67 is a view illustrating a process of executing smart diagnosis on the initial environment setting picture. Smart diagnosis is a diagnosis method which transmits a specific sound generated from the refrigerator as an audio signal to an NS center and judges whether or not the refrigerator is out of order using such an audio signal. For this purpose, when the user touches the smart diagnosis button 5317 on the initial environment setting picture 5301, a smart diagnosis guidance picture 6720 is displayed, and particulars followed by the user and a diagnosis start button 6721 are displayed on the smart diagnosis guidance picture 6720.

Figure 68:
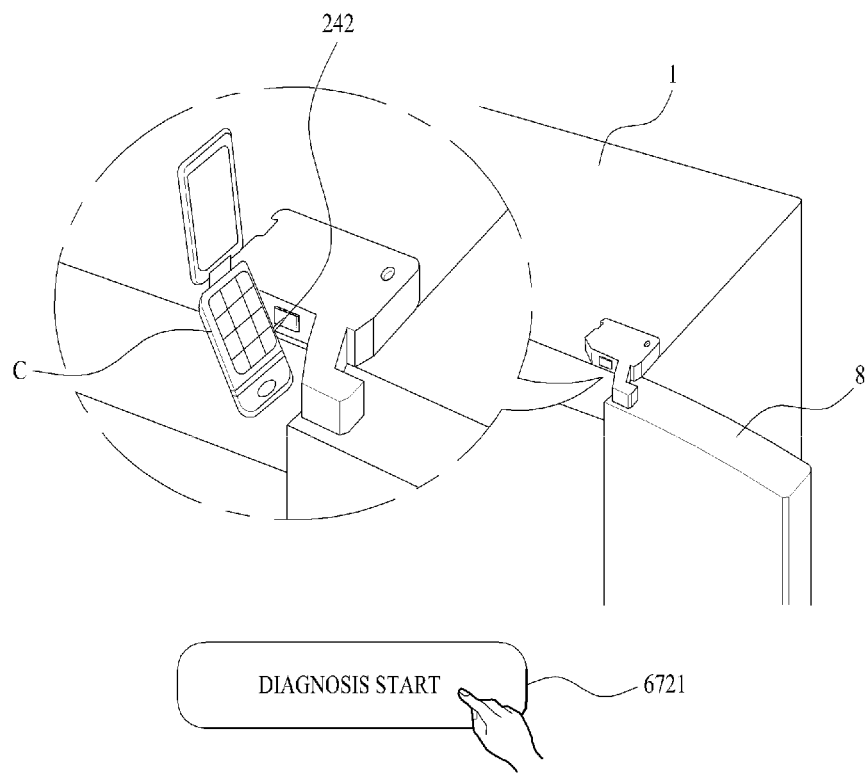

A method using smart diagnosis starts from opening of the door of the refrigerator and putting a cellular phone C on the hole of the speaker 242 located at the upper end of the main body of the refrigerator, as shown in FIG. 68. When such a preparation has been completed, the user touches the diagnosis start button 6721. When such a diagnosis mode is operated, an audio signal may be generated from the hole of the speaker 242, and remaining time taken to execute diagnosis may be displayed on the smart diagnosis guidance picture 6720.

When the corresponding remaining time has elapsed, a message notifying that audio signal transmission has been completed is displayed and the smart diagnosis guidance picture 6720 is automatically returned to the initial environment setting picture. When the audio signal transmission has been completed, the user receives an answer regarding a result of smart diagnosis from a consultant and takes measures, thereby judging whether or not the refrigerator is out of order and taking measures to cope with such a situation.

Figure 69:
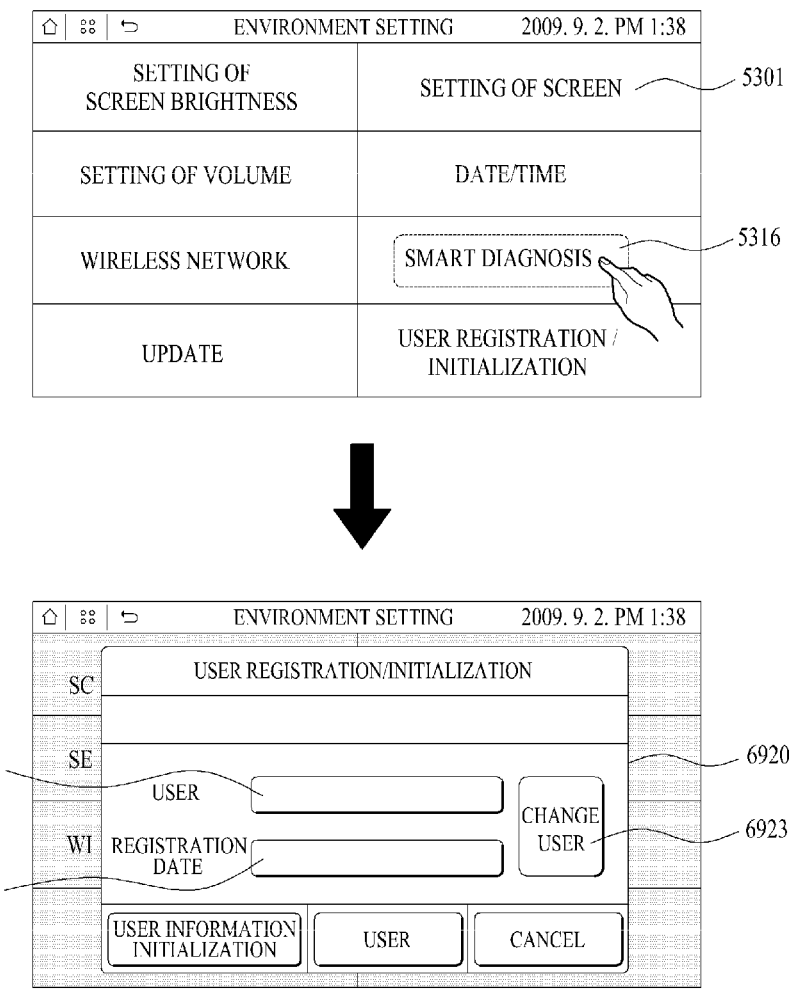
FIGS. 69 and 70 are views illustrating execution of user registration on the display in accordance with the present disclosure.

FIG. 69 is a view illustrating a process of registering a user through the initial environment setting picture 5301. When a user touches the user registration/initialization button 5318 provided on the initial environment setting picture 5301, a user registration and initialization popup window 6920 may be displayed. An ID input window 6921 and a password input window 6922 may be displayed on such a popup window 6920.

The user may input an ID and a password registered on a Website operated by a refrigerator manufacturer into the ID input window 6921 and the password input window 6922. Thereafter, when the user touches a new registration button 6923, if the input ID and password coincide with the registered ID and password, user registration is completed. The user registration and initialization popup window 6920 may then be switched to a popup window 701 on which an ID registration date 7003 and the registered ID 7002 are displayed, as shown in FIG. 70.

Figure 70:
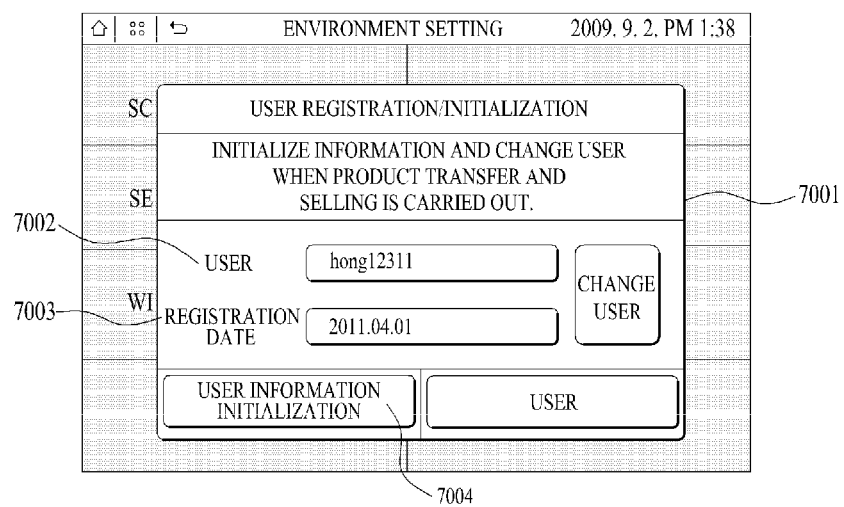

On the other hand, if user information is initialized, when the user touches a user information initialization button 7004 shown in FIG. 70, an initialization reconfirmation notification window may be displayed, and then when the user touches a confirmation button, the user information is initialized. When initialization of the user information has been completed, a message 'initialization completed' is displayed.

The user interface displayed through the above-described display of the refrigerator may be implemented through a touch screen of a wireless terminal. For example, the above-described user interface may be implemented by an exclusive remote controller provided with a touch screen or a smart phone provided with an application to control the refrigerator.

Hereinafter, a user interface configuration to control the refrigerator implemented in an application shape on a smart phone will be described with reference to FIGS. 71 to 79. Here, the smart phone may include a wireless communication unit to exchange information with external devices wirelessly, a touch screen for inputs, and a memory to store input and output information. Of course, the smart phone may include other elements in addition to the above elements. Hereinafter, the smart phone is referred to as a "wireless terminal", for convenience.

Figure 71A:
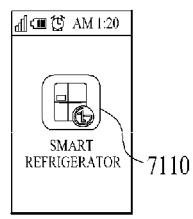
FIGS. 71A to 71C are views illustrating one example an application for remotely controlling the refrigerator in accordance with an embodiment of the present disclosure on a wireless terminal.
Figure 71B:
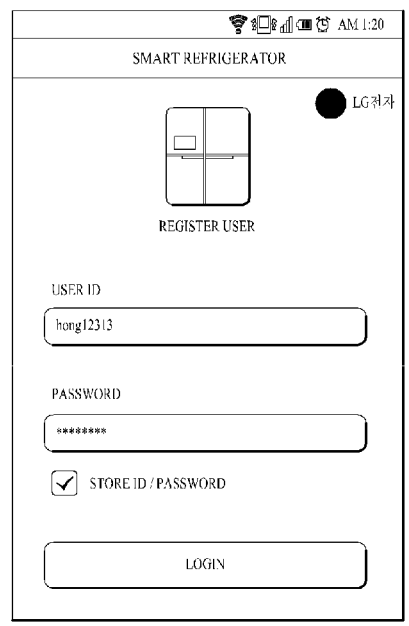
Figure 71C:
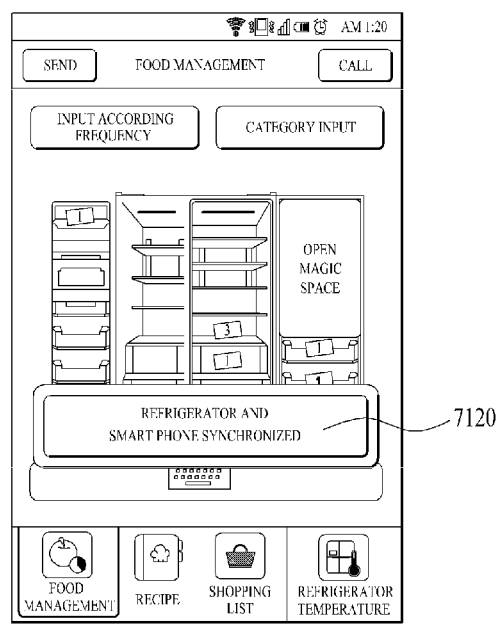

FIGS. 71A to 71C are views illustrating one example of display of an application to control the refrigerator in accordance with the embodiment of the present disclosure on a wireless terminal. If the application to control the refrigerator is installed on the wireless terminal, an icon 7110 executing a shortcut function of the corresponding application may be displayed on a background picture (home screen) or a main menu, as shown in FIG. 71A.

If the icon 7110 is selected, a log-in picture is displayed on the touch screen of the wireless terminal, as shown in FIG. 71B. An ID/password for log-in may be equal to or different from an ID/password set in the refrigerator. When log-in has been completed, an initial picture of the application may be displayed, as shown in FIG. 71C. If the wireless terminal is connected to the refrigerator through a server or is directly connected to the refrigerator and thus information (a shopping list, information of food objects, or etc.) of the wireless terminal is updated, i.e., synchronized with the refrigerator, a notification window 7120 notifying this fact may be displayed.

Figure 72:
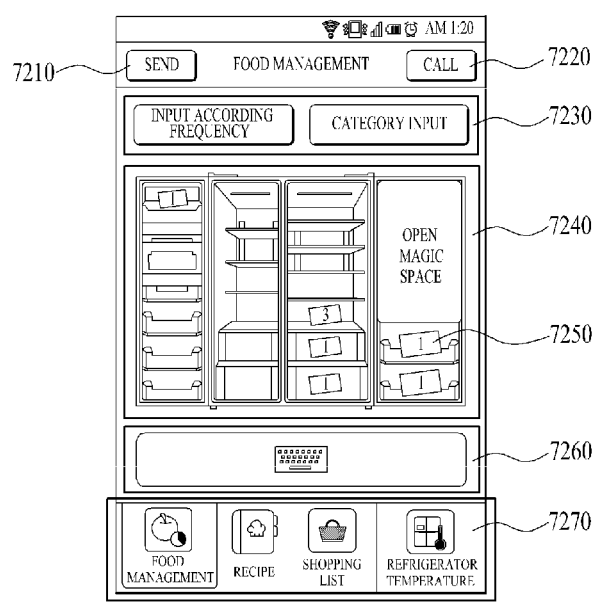
FIG. 72 shows a food management menu on the wireless terminal to control the refrigerator in accordance with one embodiment of the present disclosure.

FIG. 72 is a view illustrating one example of display of the food management menu of the application to control the refrigerator on the wireless terminal in accordance with one embodiment of the present disclosure. The arrangement of respective menu buttons or icons when the food management menu is displayed on the wireless terminal is similar to the user interface of the refrigerator described with reference to FIG. 7B. However, some menu buttons or icons may be omitted or changed to other shapes due to problems caused by the size of the touch screen of the wireless terminal.

In more detail, a sending button 7210 to send information on food objects to the refrigerator or the external server, and a calling button 7220 to call information on food objects from the refrigerator or the external server are arranged at the upper end of the food management menu.

An input button according to frequency and a category input button 7230 to specify food objects are arranged below the sending button 7210 and the calling button 7220. A graphic 7240 representing the inner shape of the refrigerator is displayed at the center of the food management menu, and an indicator 7250 indicating kinds or the number of food objects stored in a corresponding storage chamber if there is storage information on items stored in advance is displayed on respective storage chambers in the graphic 7240. A button 7260 to call a virtual keypad is arranged under the graphic 7240, and a menu button area 7270 to call respective menus, such as the food management menu, the recipe menu, the shopping list menu, and the refrigerator temperature menu, is arranged at the lower end of the food management menu.

Figure 73A:
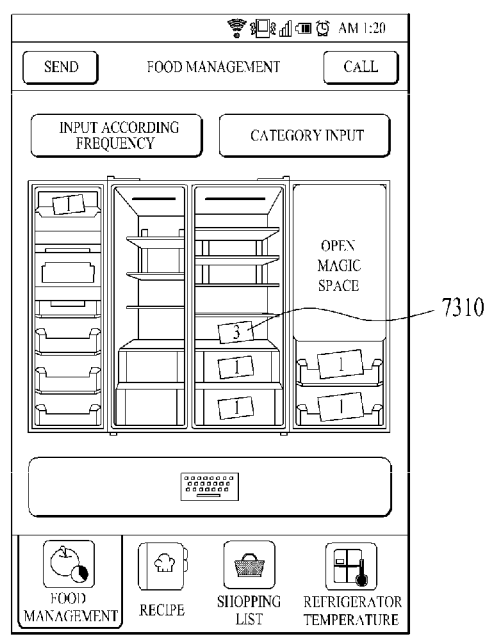
FIGS. 73A and 73B are views illustrating one example of a method of confirming information of food stored in the storage chamber through the food management menu of the application to control the refrigerator on the wireless terminal in accordance with an embodiment of the present disclosure.
Figure 73B:
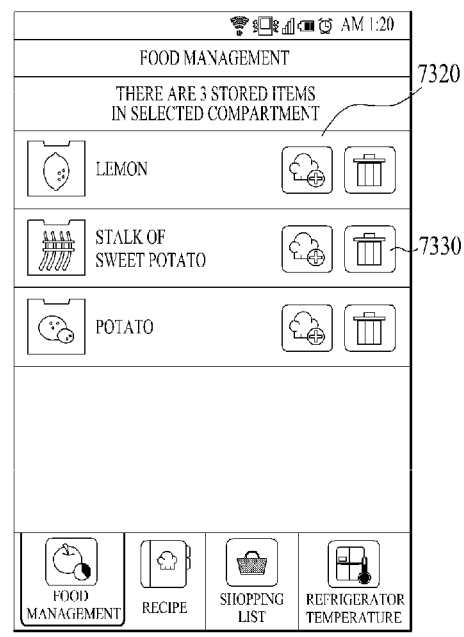

FIGS. 73A and 73B are views illustrating one example of a method of confirming or viewing information related to food objects present in the storage chamber through the food management menu of the application to control the refrigerator on the wireless terminal in accordance with an embodiment of the present disclosure. First, if an indicator 7310 indicating that 3 kinds of food objects are stored is selected, as shown in FIG. 73A, a list of icons of the food objects may be displayed, as shown in FIG. 73B. A button 7320 to add the corresponding food object as a recipe material and a button 7330 to delete the corresponding icon are arranged at the side of each of the icons.

Figure 74A:
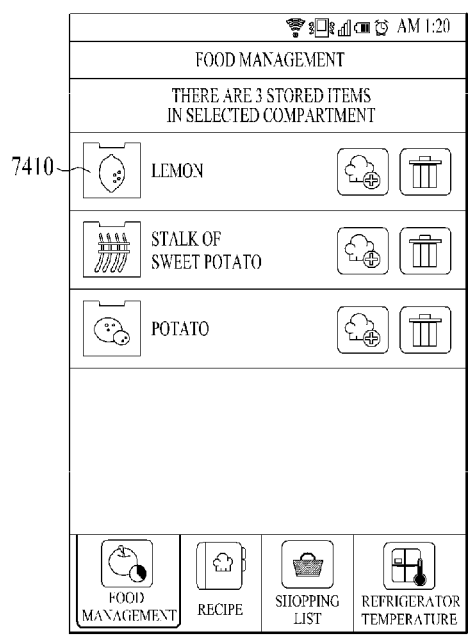
FIGS. 74A and 74B are views illustrating one example of a method of confirming detailed information of food stored in the storage chamber through the food management menu of the application to control the refrigerator on the wireless terminal in accordance with an embodiment of the present disclosure.
Figure 74B:
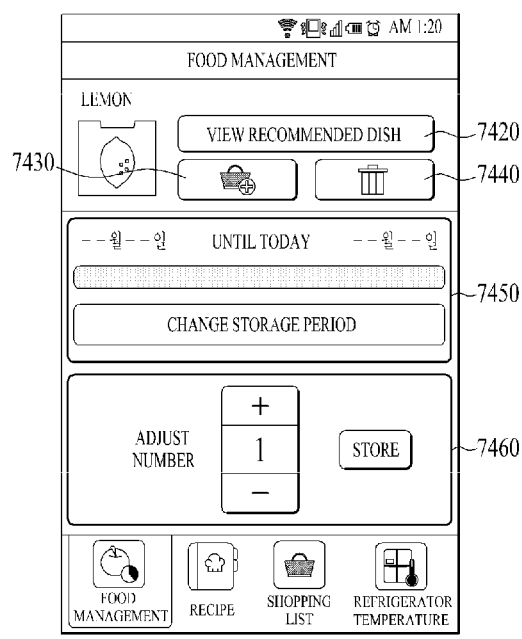

FIGS. 74A and 74B are views illustrating one example of a method of confirming detailed information on a food object in the storage chamber through the food management menu of the application to control the refrigerator on the wireless terminal in accordance with an embodiment of the present disclosure. It is assumed that FIG. 74A illustrates the subsequent process of FIG. 73B.

When a lemon icon 7410 is selected in FIG. 74A, a food object detailed information picture may be displayed, as shown in FIG. 74B. In more detail, a recommended recipe button 7420 to output recipes using the corresponding food object as a material, a shopping list addition button 7430 and a wastebasket button 7440 are arranged on the food object detailed information picture. A storage period change button 7450 to change the storage period of the corresponding food object and +/− buttons 7460 to adjust the number of the corresponding food object may be displayed below the above-described buttons. Detailed functions of the respective buttons are similar to those of the user interface, and a detailed description thereof will thus be omitted.

Figure 75A:
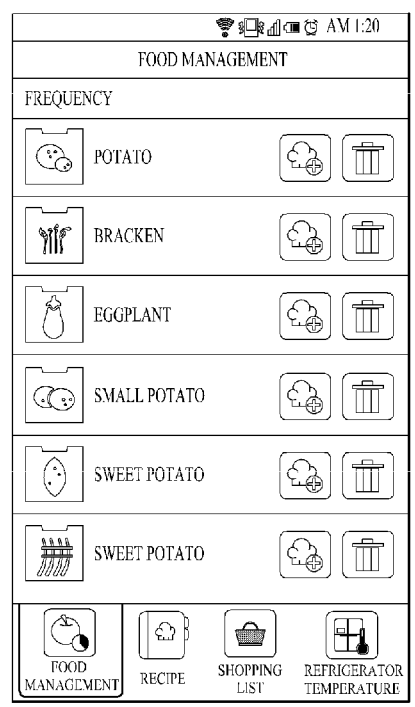
FIGS. 75A and 75B are views illustrating one example of a method of specifying a food object to be added through the food management menu of the application to control the refrigerator on the wireless terminal in accordance with an embodiment of the present disclosure.
Figure 75B:
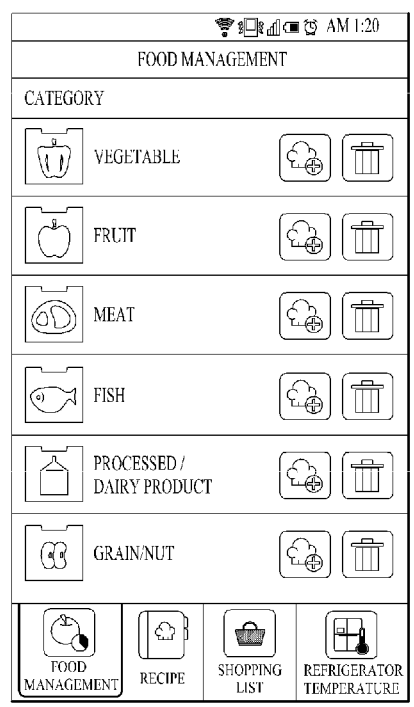

Next, specification of a food object will be described with reference to FIGS. 75A and 75B. FIGS. 75A and 75B are views illustrating one example of a method of specifying a food object to be added through the food management menu of the application to control the refrigerator on the wireless terminal in accordance with an embodiment of the present disclosure.

When the input button according to frequency of FIG. 72 is selected, the icons of the food objects aligned in order of decreasing input frequency may be displayed, as shown in FIG. 75A. Further, when the category input button of FIG. 72 is selected, icons corresponding to categories of the food objects may be displayed, as shown in FIG. 75B. Here, category classification may be equal to category classification described in the user interface of the refrigerator.

Figure 76:
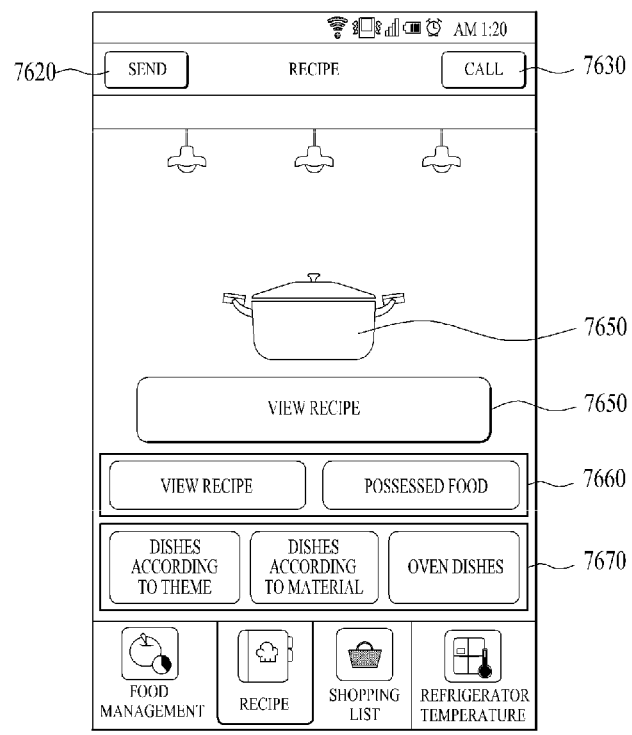
FIG. 76 is a view illustrating one example of a recipe menu configuration of the application to control the refrigerator on the wireless terminal in accordance with an embodiment of the present disclosure.

Next, a recipe menu will be described with reference to FIG. 76 and FIGS. 77A to 77D. FIG. 76 is a view illustrating one example of a recipe menu configuration of the application to control the refrigerator on the wireless terminal in accordance with the embodiment of the present disclosure. Here, the recipe menu may be called by selecting a recipe button 7610 from a menu button area provided at the lower end. A sending button 7620 to send recipe information to the refrigerator or an external server and a calling button 7630 to call recipe information from the refrigerator or the external server are arranged at the upper end of the recipe menu.

A cooking container icon 7640 to store a material which is a target object, the recipes of which are searched, is displayed below the sending button 7620 and the calling button 7630. If the cooking container icon 7640 is selected, a picture corresponding to the material area 2020 described with reference to FIG. 20 may be displayed entirely or a through a popup window.

A recipe view button 7650 to search for and output recipes using food objects added to the cooking container icon 7640 as materials is displayed below the cooking container icon 7640. Buttons 7660 to specify the food objects to be added to the cooking container icon 7640 are arranged below the recipe view button 7650. Concretely, a storage period button to confirm food objects, the storage period expiration dates of which are near and a possessed food button to confirm food object information are respectively displayed. Further, a button area 7670 to search for a recipe regardless of the food objects added to the cooking container icon 7640 is arranged at the lower end of the recipe menu.

Figure 77A:
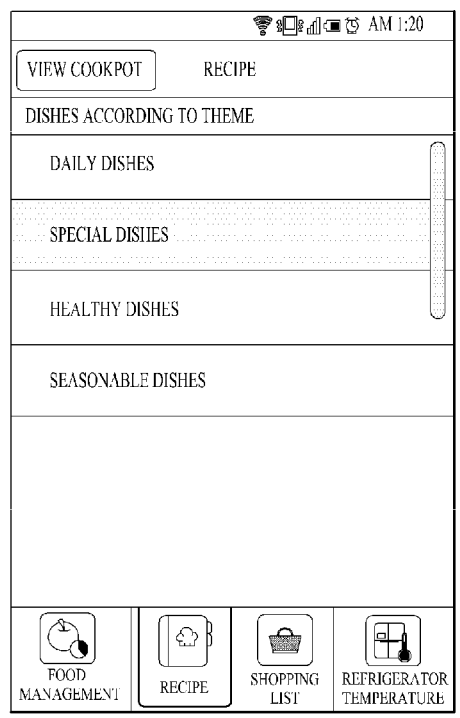
FIGS. 77A to 77D are views illustrating one example of a method of searching for a recipe by the application to control the refrigerator executed on the wireless terminal in accordance with an embodiment of the present disclosure.
Figure 77B:
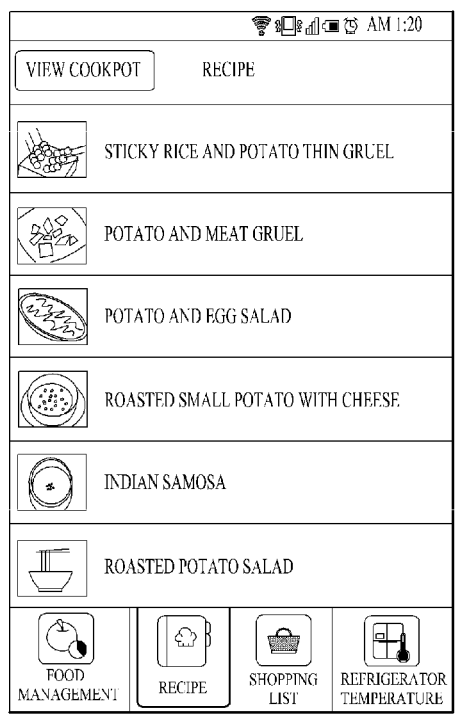
Figure 77C:
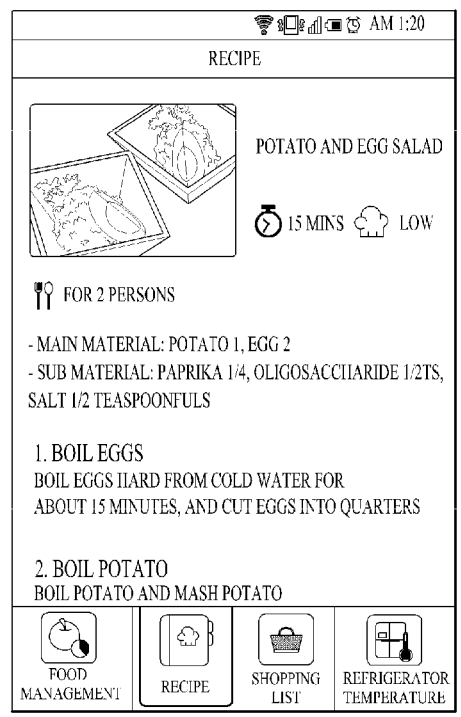
Figure 77D:
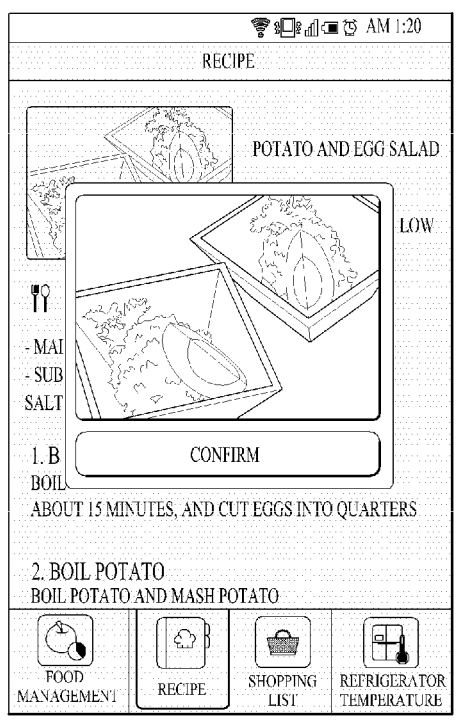

FIGS. 77A to 77D are views illustrating one example of a method of searching for a recipe by the application to control the refrigerator executed on the wireless terminal in accordance with an embodiment of the present disclosure. A screen image as shown in FIG. 77A may be displayed if a dish button according to theme is selected from the button area 7670 of FIG. 76. For example, when a special dish sub-theme from among 4 kinds of sub-themes is selected, a list of recipes included in the selected sub-theme may be displayed, as shown in FIG. 77B. Then, when a user selects potato and egg salad 7710, recipe detailed information is displayed, as shown in FIG. 77C. Further, when the user selects a thumbnail image 7720 of the corresponding dish, a popup window 7730 enlarged from the thumbnail image 7720 may be displayed, as shown in FIG. 77D.

Figure 78:
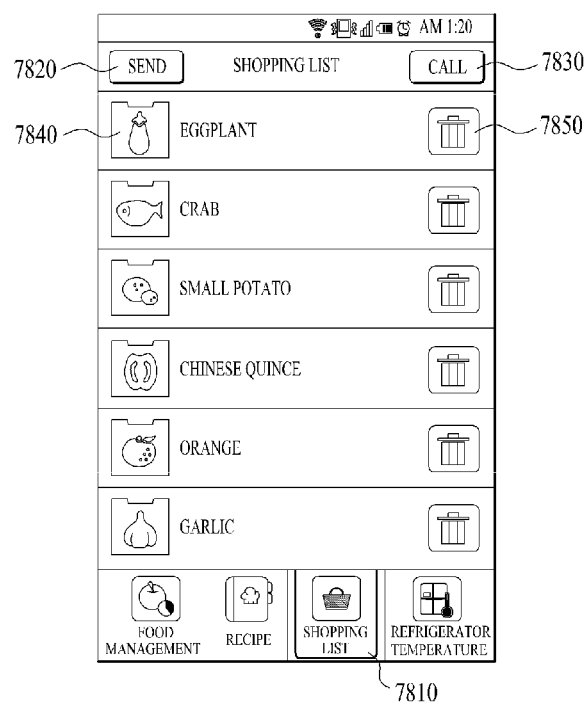
FIG. 78 is a view illustrating one example of a shopping list menu configuration of the application to control the refrigerator executed on the wireless terminal in accordance with an embodiment of the present disclosure.

Next, a shopping list menu will be described with reference to FIG. 78. FIG. 78 is a view illustrating one example of a shopping list menu configuration of the application to control the refrigerator executed on the wireless terminal in accordance with the embodiment of the present disclosure. Here, the recipe menu may be called by selecting a shopping list button 7810 from the menu button area provided at the lower end.

A sending button 7820 to send shopping list information to the refrigerator or the external server and a calling button 7830 to call recipe information from the refrigerator or the external server are arranged at the upper end of the shopping list menu. Icons 7840 corresponding to food objects added to the shopping list and wastebasket icons 7850 located at the right sides of the respective icons 7840 to delete the corresponding icons 7840 from the shopping list are provided below the sending button 7820 and the calling button 7830.

Figure 79:
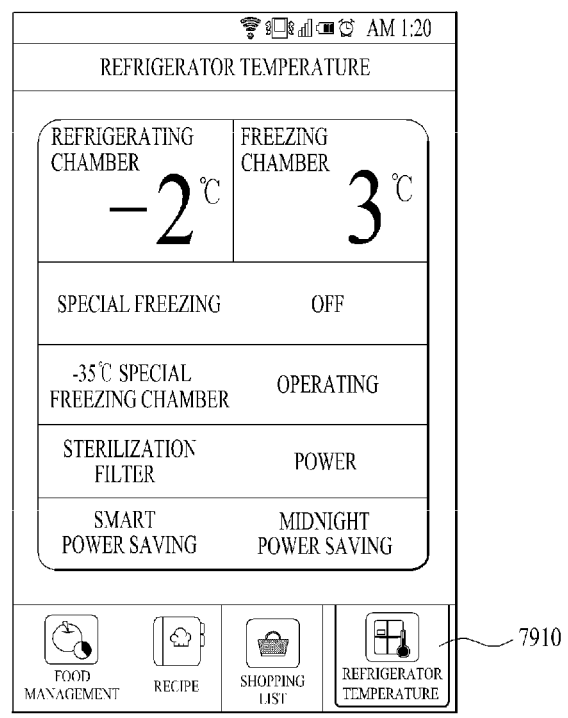
FIG. 79 is a view illustrating one example of a refrigerator temperature menu configuration of the application to control the refrigerator executed on the wireless terminal in accordance with an embodiment of the present disclosure.

Next, a refrigerator temperature menu will be described with reference to FIG. 79. FIG. 79 is a view illustrating one example of a refrigerator temperature menu configuration of the application to control the refrigerator executed on the wireless terminal in accordance with the embodiment of the present disclosure. Here, the refrigerator temperature menu may be called by selecting a refrigerator temperature button 7910 from the menu button area provided at the lower end.

Set temperatures of the respective storage chambers, i.e., the refrigerating chamber, the freezing chamber, etc., whether or not special freezing is activated, whether or not the special freezing chamber is operated, a set state of the sterilization filter and a set state of the smart power saving function may be displayed on the refrigerator temperature menu.

Information generated through operation of the above-described application (for example, shopping list information, food object information, etc.) may be directly sent to the refrigerator through the wireless communication unit provided on the wireless terminal, or be sent to the refrigerator via the server. Further, shopping list information, food object information, etc. stored in the memory 250 of the refrigerator may be directly called from the refrigerator, or be called from the refrigerator via the server, thus being conveniently called.

Further, in accordance with one embodiment of the present disclosure, the above-described application may be implemented as a code which is readable by a processor, in a medium in which a program is recorded. The medium readable by the processor may include a ROM, a RAM, a CD-ROM, a magnetic tape, a floppy disc, or an optical data storage device, and may be implemented in the shape of a carrier wave (for example, sending through Internet).

As apparent from the above description, a refrigerator having a display device in accordance with one embodiment of the present disclosure provides a user interface which may enable efficient access to the control functions of the refrigerator or display various pieces of information through touch operation. Further, the refrigerator may effectively manage information, such as storage positions and storage periods of the food objects and recipes made using the food objects as ingredients, through the user interface implemented on a touch screen provided on the refrigerator.

The refrigerator may easily adjust the temperature of a freezing chamber or a refrigerating chamber through a display. Further, the refrigerator may easily execute special freezing operation, i.e., rapid freezing operation of the freezing chamber, and special freezing chamber operation. Moreover, the refrigerator may enable control of the operation of a filter through the display, thus being capable of easily removing odors and bacteria from the insides of storage chambers. If replacement of a filter unit of the filter device is required, the display visually displays a filter unit replacement signal, thus being capable of inducing rapid replacement of the filter.

Further, since power saving operation is divided into a midnight power saving mode, a user power saving mode and an auto power saving mode, various power saving modes may be set according to user's selection. Moreover, power modes may automatically adjust based on electric rates which can reduce energy bills.

Further, since user's schedule management and memo management are easily carried out, and particularly, these managements are visually easily discriminated, user's convenience may be maximized. Further, setting of a wireless network or remote diagnosis of the refrigerator may be easily carried out through the display. Moreover, since recipes or firmware should be periodically updated, such updates may be carried out through a wireless network, or may be carried out through a storage device, such as an SD memory, as needed. Accordingly, update of information may be easily executed.

An embodiment may be achieved in a whole or in parts by a refrigerator that includes a body, at least one door, at least one storage area, a display for displaying a GUI having a first region for displaying an image of the at least one storage area and a second region for displaying a control interface, a memory having information for contents of the at least one storage area, a communication interface, and a controller for controlling the display. The controller may control a display of at least one icon for a type of food in the second region of the GUI and controls a display of one of the at least one icon in the first region of the GUI based on an input at the display, the at least one icon displayed in the first region of the GUI corresponding to the information for contents of the at least one storage area.

The controller may synchronize the information for contents of the at least one storage compartment with a mobile communication device through the communication interface. The input at the display may be a drag and drop input to drag the one of the at least one icon from the second region to the first region. The icons may be displayed in the second region based on at least one of a category of food or a frequency of use of the icon. The frequency of use of the icon may be based on a particular user or on information received from the server. Moreover, the image of the at least one storage area in the first region may be an image of the refrigerator, and wherein a selection of a region on the image correspondingly changes the image.

The refrigerator of this embodiment may further include a second storage area placed in the at least one storage area, the second storage area having a second door that is placed on the door of the at least one storage area. The second storage area may be accessible through the second door without opening the door of the at least one storage area. The at least one icon from the second region of the GUI may be dragged into an image of the second storage area in the first region of the GUI. The at least one icon may be configured to indicate a number of items present in a particular storage area.

The information for contents of the at least one storage area may include at least a name of the food, a quantity of the food, or a location of the food. The at least one icon corresponding to a type of food may be received through the communication interface from a server. The second region of the display may include an icon for generating at least one recipe based on the contents of the at least one storage compartment. The controller may generate the recipe based on an expiration date associated with the contents of the at least one storage compartment.

The second region of the display may include at least one icon for displaying a second GUI. The second GUI may include a first region for displaying at least one icon corresponding to the contents of the refrigerator, a second region for displaying at least one of the icons displayed in the first region of the second GUI, and a third region for displaying a list of recipes. The list of recipes includes as an ingredient food associated with the icons displayed in the second region.

The second region of the display may include at least one icon for updating the information for the contents of the at least one storage compartment. The second region of the display may include at least one icon for generating a shopping list based on the contents of the at least one storage compartment. The shopping list may be generated by dragging an icon for a type of food from the first region to the icon for the shopping list. The second region of the display may include an icon for setting an expiration date for food associated with the at least one icon displayed in the first region.

When one of the at least one storage area is selected on the display, the controller may apply a visual effect to distinguish the selected storage area from other storage areas. The visual effect is a change in color of the first storage space or a magnification of the first storage space. The first region of the GUI may include an indicia that indicates a quantity of a particular type of food or a number of different types of foods in the storage area. A plurality icons for one or more types of food may be displayed in each of a plurality of storage areas. When a number of icons in a storage area exceeds a predetermined number, a scroll bar may be provided to scroll the images of the plurality of icons in the storage area.

The plurality of icons may be displayed in an order based on an expiration date for food associated with each of the plurality of icons. The plurality of icons may be displayed in an order based on a date when food was added. The controller may be configured to generate a popup window for display when the at least one icon is dragged from the first region of the GUI to the second region of the GUI, the popup window having at least one field to input storage information associated with the dragged icon. The storage information may include at least one of a type of food, storage start date, expiration dates or a quantity of food.

In one embodiment, a refrigerator as broadly described and embodied herein may include a body, at least one door, at least one storage area, a display for displaying a GUI for managing contents of the at least one storage area, a memory having information for contents of the at least one storage area, a communication interface, and a controller for controlling the display. The GUI may include a first region for displaying at least one icon corresponding to the contents of the at least one storage area, a second region for displaying at least one of the icons from the first region, and a third region for displaying a list of recipes. Moreover, when one of the at least one icon is moved from the first region into the second region, the controller may generate the list of recipes based on food corresponding to the icons displayed in the second region.

In one embodiment, a refrigerator as broadly described and embodied herein may include a body, at least one door, at least one storage area, a compressor, a fan to circulate cold air in the at least one storage area, a display for displaying a GUI having a first region for displaying an image of the at least one storage area, a second region for displaying a target temperature for the at least one storage area, and a third region for displaying a control interface, a communication interface, and a controller for controlling the compressor and fan to regulate a temperature of the at least one storage area. The control interface in the third region may include a plurality of power profiles, and the controller may adjust the temperature based on a selected power profile. Moreover, the controller may adjust the target temperature for the at least one storage area based on electric rate information received through the communication interface.

In one embodiment, a refrigerator as broadly described and embodied herein may include a main body having storage chambers to store items, at least one door to open and close the main body, a display installed on one of the doors, and the display having an insertion slot into which a storage device is inserted and a display screen to display information, and a cover removably provided on the one door to cover a side surface of the display device provided with the insertion slot.

The display may include a housing that surrounds the display screen, and the insertion slot may be provided on a side surface of the housing. The one of the doors includes a front door panel that forms the front of the door, a rear door panel that forms the rear of the door, and a frame provided between the front door panel and the rear door panel to accommodate the display. The frame and the door panels may include openings that expose a side surface of the display at the insertion slot. The cover may be removably provided at the openings of the front door panel so as to selectively expose and cover the insertion slot.

The storage chambers may include a freezing chamber and a refrigerating chamber provided in parallel, the doors include a freezing chamber door and a refrigerating chamber door provided in parallel, the display device is provided on the freezing chamber, and the insertion slot may be provided on a side surface of the freezing chamber door, and the side surface of the freezing chamber door provided with the insertion slot is positioned opposite to a side surface of the refrigerating chamber door.

In one embodiment, a refrigerator as broadly described and embodied herein may include a display unit to display the inner shape of the refrigerator including a plurality of storage spaces, in a first area, a memory having storage information on stored items stored in each of the plurality of storage spaces, and a controller to display icons indicating at least one of kinds and the numbers of the stored items stored in each of the plurality of storage spaces of the inner shape of the refrigerator according to the storage information.

The controller, when a first storage space from among the plurality of storage spaces is selected by touch input through a touch screen, may provide designated visual effects to the first storage space so as to visually discriminate the first storage space from other storage spaces. The designated visual effects may include a change of the color of the first storage space and magnification of the first storage space at a designated rate.

The icons indicating at least one of the kinds and the numbers of the stored items stored in each of the plurality of storage spaces may include first icons and second icons. The first icons have a shape corresponding to each of the kinds of the stored items, and the second icons indicate the numbers of the stored items in numerals. The controller may display a predetermined number of the first icons in each of the plurality of storage spaces. If a larger number of the kinds of the stored items than the predetermined number are stored in the first storage space, the controller, when the first storage space is selected, may display at least one search direction icon to search for non-displayed first icons around the predetermined number of the first icons in at least one direction.

In this embodiment, the controller may select the predetermined number of the first icons in the order that the storage period expiration dates of the stored items are near. The controller may select the predetermined number of the first icons in the order of that the storage starting dates of the stored items start are late.

Moreover, the controller may display a second area including icons respectively corresponding to a plurality of stored items storable in the plurality of storage spaces on a touch screen. The controller may align the icons of the second area according to category or in order of storage frequency. The controller, if a third icon from among the icons of the second area is dragged to a second storage space from among the plurality of storage spaces, may display a popup window to set storage information on a stored item corresponding to the third icon on the touch screen. Moreover, the storage information may include at least one of kinds, storage starting dates, storage expiration dates and the numbers of the stored items.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
a main body including storage chambers to store items;
at least one door to open and close the main body;
a display installed on one of the doors, and the display having an insertion slot into which a storage device is inserted and a display screen to display information; and
a frame provided on the one door and accommodating the display inside of the door; and
a cover removably provided on the one door to cover a side surface of the display device provided with the insertion slot,
wherein the at least one door includes two doors provided in parallel with respect to each other, and
wherein the insertion slot is provided on one of the two doors so as to be opposite to the other of the two doors.

2. The refrigerator according to claim 1, wherein the display includes a housing that surrounds the display screen, and the insertion slot is provided on a side surface of the housing.

3. The refrigerator according to claim 2, wherein the one of the doors includes a front door panel that forms the front of the door, and a rear door panel that forms the rear of the door,
wherein the frame is provided between the front door panel and the rear door panel, and
wherein the frame and the door panels include openings that expose a side surface of the display at the insertion slot.

4. The refrigerator according to claim 3, wherein the cover is removably provided at the openings of the front door panel so as to selectively expose and cover the insertion slot.

5. The refrigerator according to claim 1, wherein
the storage chambers include a freezing chamber and a refrigerating chamber provided in parallel,
the doors include a freezing chamber door and a refrigerating chamber door provided in parallel,
the display is provided on the freezing chamber door, and
the insertion slot is provided on a side surface of the freezing chamber door, and the side surface of the freezing chamber door provided with the insertion slot is positioned opposite to a side surface of the refrigerating chamber door.

6. The refrigerator according to claim 1, further comprising:
a memory having information for contents of the at least one storage chamber;
a communication interface; and
a controller for controlling the display,
wherein the display displays a GUI for managing contents of the at least one storage chamber, and
wherein the GUI includes a first region for displaying at least one icon corresponding to the contents of the at least one storage chamber, a second region for displaying at least one of the icons from the first region, and a third region for displaying a list of recipes, and
wherein, when one of the at least one icon is moved from the first region into the second region, the controller generates the list of recipes based on food corresponding to the icons displayed in the second region.

7. The refrigerator according to claim 1, further comprising:
a compressor;
a fan to circulate cold air in the at least one storage chamber;
a communication interface; and
a controller for controlling the compressor and fan to regulate a temperature of the at least one storage chamber,
wherein the display displays a GUI having a first region for displaying an image of the at least one storage chamber, a second region for displaying a target temperature for the at least one storage chamber, and a third region for displaying a control interface, and
wherein the control interface in the third region includes a plurality of power profiles, and the controller adjusts the temperature based on a selected power profile.

8. The refrigerator of claim 7, wherein the controller adjusts the target temperature for the at least one storage chamber based on electric rate information received through the communication interface.

9. The refrigerator according to claim 1, further comprising:
a compressor;
a fan to circulate cold air in the at least one storage chamber; and
a controller for controlling the compressor and fan to regulate a temperature of the at least one storage chamber.

10. The refrigerator according to claim 1, wherein
the storage chambers include a freezing chamber and a refrigerating chamber provided in parallel,
the doors include a freezing chamber door and a refrigerating chamber door provided in parallel,
the display is provided on the refrigerating chamber door, and
the insertion slot is provided on a side surface of the refrigerating chamber door, and the side surface of the refrigerating chamber door provided with the insertion slot is positioned opposite to a side surface of the freezing chamber door.

11. The refrigerator according to claim 1, wherein the storage device comprises one of an SD memory card or a USB storage device.

12. The refrigerator according to claim 1, wherein the frame has a side opening connected with the insertion slot.

13. The refrigerator according to claim 1, wherein the frame has a front opening opposite to the front surface of the door.

14. The refrigerator according to claim 1, wherein the one door has an opening that exposes the display.

15. The refrigerator according to claim 14, wherein the opening is provided on a front surface of the one door.

16. The refrigerator according to claim 15, wherein the display includes a display screen comprising a touch screen to receive user inputs.

* * * * *